United States Patent
Koster et al.

(10) Patent No.: US 10,785,370 B1
(45) Date of Patent: *Sep. 22, 2020

(54) COMMUNICATION ATTEMPTS MANAGEMENT SYSTEM FOR MANAGING A PREDICTIVE DIALER IN A CONTACT CENTER

(71) Applicant: Noble Systems Corporation, Atlanta, GA (US)

(72) Inventors: Karl H. Koster, Sandy Springs, GA (US); Jason P. Ouimette, Berkeley Lake, GA (US); Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,592

(22) Filed: Oct. 9, 2019

Related U.S. Application Data

(63) Continuation of application No. 15/829,306, filed on Dec. 1, 2017, now Pat. No. 10,462,295.

(60) Provisional application No. 62/449,474, filed on Jan. 23, 2017, provisional application No. 62/435,555, filed on Dec. 16, 2016, provisional application No. 62/432,219, filed on Dec. 9, 2016.

(51) Int. Cl.
*H04M 3/51* (2006.01)
*G06N 7/00* (2006.01)
*G06Q 10/10* (2012.01)

(52) U.S. Cl.
CPC .......... *H04M 3/5158* (2013.01); *G06N 7/005* (2013.01); *G06Q 10/1093* (2013.01); *H04M 3/5175* (2013.01); *H04M 3/5183* (2013.01); *H04M 2203/256* (2013.01); *H04M 2203/558* (2013.01)

(58) Field of Classification Search
CPC . H04M 3/5158; H04M 3/5175; H04M 3/5183
See application file for complete search history.

(56) References Cited

U.S. PATENT DOCUMENTS

| | | | | |
|---|---|---|---|---|
| 9,203,964 | B1* | 12/2015 | Neuer, III | H04M 1/00 |
| 9,426,281 | B1* | 8/2016 | McDaniel | H04M 3/22 |
| 9,456,085 | B1* | 9/2016 | Perdue | H04M 3/5232 |
| 9,876,908 | B2* | 1/2018 | Segall | H04M 3/42059 |
| 10,115,131 | B2* | 10/2018 | Segall | G06Q 30/02 |

(Continued)

*Primary Examiner* — Nafiz E Hoque

(57) ABSTRACT

In various embodiments, a predictive dialer in a contact center is managed by a Communication Attempt Management System ("CAMS") that manages the total number of communications attempts, including voice calls, originated to an individual associated with an account within a period of time. In particular embodiments, a list comprising account data of a plurality individuals may be processed by the CAMS to identify those accounts which have exceeded a weekly limit on the number of allowable communication attempts and are not authorized to receive further communications in that period of time. The list is modified to reflect those accounts which have not exceeded their corresponding limit and are authorized to be contacted. The modified list is provided to the predictive dialer, which then originates a call to each account. The CAMS may then update each account to reflect each communication attempt made by the predictive dialer.

20 Claims, 22 Drawing Sheets

(56) References Cited

U.S. PATENT DOCUMENTS

| | | | | |
|---|---|---|---|---|
| 10,135,978 B1* | 11/2018 | Koster | ............... | H04M 3/5141 |
| 10,298,755 B1* | 5/2019 | Mandic | ............... | H04M 3/5158 |
| 2011/0116618 A1* | 5/2011 | Zyarko | ............... | H04M 3/5158 |
| | | | | 379/266.07 |
| 2018/0013891 A1* | 1/2018 | Charlson | ........... | H04M 3/42042 |

* cited by examiner

1810
List Processing Event #1

1. Get List From: *"Daily Mailing List"* From CRMS_system
2. When to Get: 7:00 a.m.
3. What to Do:
   - Process *"Daily Mailing List"* as Present CA List
   - Define Authorized Accounts as *"Scrubbed Daily Mailing List"*
   - Define Unauthorized Accounts as *"Daily Mailing List Exceptions"*
4. Where to Send:
   - Store *"Scrubbed Daily Mailing List"* in cache
   - Store *"Daily Mailing List Exceptions"* in cache
   - Transfer *"Scrubbed Daily Mailing List"* to Mail_system

1820
List Processing Event #2

1. Get List From: *"Scrubbed Daily Mailing List"* From cache
2. When to Get: After Completion of: LPE #1
3. What to Do:
   - Process *"Scrubbed Daily Mailing List"* as Present CA List
4. Where to Send:
   - Transfer *"Scrubbed Daily Mailing List"* to Email_system

1830
List Processing Event #3

1. Get List From: *"Daily_Exception_Email_List"* From Email_system
2. When to Get: After 5:00 p.m.
3. What to Do:
   - Process *"Daily_Exception_Email List"* as Past CA List
4. Where to Send:
   - Transfer *"Daily_Exception_Email List"* to Report_system

FIG. 18

COMMUNICATION ATTEMPTS MANAGEMENT SYSTEM FOR MANAGING A PREDICTIVE DIALER IN A CONTACT CENTER

CROSS REFERENCE TO RELATED APPLICATIONS

This application is a continuation of U.S. patent application Ser. No. 15/829,306, filed on Dec. 1, 2017, which claims the benefit of U.S. Provisional Patent Application 62/432,219 filed on Dec. 9, 2016; U.S. Provisional Patent Application 62/435,555 filed on Dec. 16, 2016; and U.S. Provisional Patent Application 62/449,474, filed on Jan. 23, 2017, wherein the contents of each are incorporated by reference for all that they teach.

BACKGROUND

It is common for large enterprises, such as banks or other financial institutions, to communicate with their customers, or potential customers, for a variety of reasons. For example, a customer of a bank may have various accounts with the bank. This may include a personal loan, an auto loan, one or more credit cards, a debit card, a boat loan, a mortgage on their primary home, a mortgage on a vacation home, etc. In addition, the customer may have checking accounts, saving accounts, investment accounts, etc. Thus, it can be expected that at one time or another, the bank will have to communicate with the customer separately for each of these accounts.

These communications can take various forms/channels. For instance, one common form/channel that is frequently used is a letter that may include periodic statements, notifications, etc. Another common form/channel that is frequently used in other circumstances is a telephone call. Accordingly, the customer may have a home, work, and/or cellular telephone number and the bank may maintain these numbers in their files. In other instances, the bank may use other forms/channels of communication such as emails, short message service ("SMS") texts, and faxes that may require the bank to maintain additional information in their files. Thus, it becomes evident that an enterprise may originate a number of communications with an individual, using a variety of forms/channels of communication (e.g., voice, letter, email, text, etc.) and for a variety of purposes (e.g., based on the nature and status of an account).

Typically, each account type handled by an enterprise for a customer can represent the operation of a separate, and often independently managed group within the enterprise. For example, a group originating mortgages in a bank may be organizationally separate from a group handling checking/savings accounts in the bank. Even within the area of loans, personal loans may be handled by a separate group from a group handling home loans, student loans, etc. Although these separate groups (e.g., departments/organizations) may be under the umbrella of a common enterprise, each group may maintain their own communication system for originating communications to the account holders, operating as a stand-alone system and designed to perform the requisite communications for that particular group independent from those communications originating from other groups. These separate groups and communication systems are sometimes referred to as "silos" since they represent their own, stand-alone departments/organizations, processes, and communication and information processing technologies. Thus, each independent group (e.g., department/organization) under the umbrella of a common enterprise may conduct their own operations and communications with account holders in a logically and practically separate manner. Further, each group may have different policies and regulations governing how they communicate with account holders, and this in turn may be reflected in different processing architectures.

However, from an account holder's perspective, all the account holder's separate accounts are associated with a common enterprise and as a result, the account holder may presume the common enterprise "knows" all the information associated with the account holder's separate accounts. Thus, the account holder may presume that when he or she receives a communication from the common enterprise in regards to one of the account holder's accounts, the enterprise is fully coordinated and cognizant with respect to all of the account holder's other accounts with the enterprise. That is to say, the account holder may not recognize that his or her separate accounts are handled by different groups under the umbrella of the common enterprise and therefore, are not necessarily coordinated with one another. However, this is frequently the case, particularly with large institutions, and in fact, various organizations may operate as separate legal entities under a common holding company in order to give the account holder the impression that he or she is dealing with one enterprise.

A challenge commonly faced by an enterprise comprising separate groups (e.g., departments/organizations) in communicating with account holders is that the communications are typically not coordinated in any manner. Therefore, an enterprise under these circumstances does not readily know which groups have communicated with an account holder on any given day, week, or other time period, particularly if the communication(s) involve separate accounts. Obviously, the account holder does readily know the specifics of how and when the enterprise communicated with him or her.

Since an enterprise comprising separate groups normally attempts to portray itself as a coordinated and cognizant institution for the account holder to deal with, there is often a 'disconnect' between the account holder's perceptions and expectations of the enterprise. For example, the account holder may have various accounts with the enterprise and may inform an employee in the home mortgages department that a cellular telephone number associated with a mortgage account has been replaced with another number. However, since the enterprise may not communicate with the account holder in a coordinated manner, it is quite possible that another department, such as the credit card department, may attempt to contact that account holder using the obsolete telephone number. Here, the account holder may expect the enterprise to act in a coordinated manner and have each department recognize the new number. However, that may not be the case in actuality and the enterprise may find it difficult to coordinate operations among the various departmental "silos" that should be using the new number.

Thus, enterprises comprising separate groups (e.g., departments/organizations) have a need to better coordinate and manage their communication attempts ("CAs") with account holders. There are several reasons why. First of all, the account holder expects this to occur. Second of all, proper coordination and management of CAs is less likely to result in errors or mistakes during communications between the enterprise and the account holder. Third of all, the enterprise is likely to provide better customer service by communicating in a coordinated manner and accordingly, affecting market share positively. Finally, regulations are being defined, or are defined, that mandate an enterprise to coordinate and manage their CAs with account holders.

For instance, some of these regulations are initially targeted at CAs related to collecting debts or otherwise servicing debt-related accounts. In these particular applications, the account holder is sometimes referred to as a "debtor" reflecting this situation. For example, regulations are emerging on how CAs may be directed to a debtor for purposes of servicing or collecting a debt for an account. While many of these regulations may facially exclude governing communications pertaining to certain types of accounts such as, for example, a savings account, (since such communications are not concerned with a debt) these regulations do govern communications pertaining to credit card accounts, student loan accounts, mortgage accounts, personal loan accounts, and other debt-oriented accounts. Thus, many of these regulations provide enterprises comprising separate groups with ample reasons to better coordinate and manage their CAs.

Furthermore, many enterprises may find it desirable from a customer service perspective to coordinate and manage CAs across all types of accounts, regardless of whether the communications pertain to debts. For example, if a customer indicates a desire to avoid receiving telephone calls in the morning because he or she works a night shift, an enterprise may find it desirable to coordinate and manage all telephone calls placed to this customer regardless of the reason for the calls and which groups in the enterprise are placing the calls.

However, with that said, coordinating and managing CAs to targeted individuals can be difficult. Many communication management systems ("CMS"), i.e., the systems that generate actual communications for particular channels, are designed to operate in a stand-alone manner. For instance, an enterprise sending checking account statements to account holders may use a printing/mailing system that is completely separate from that used to send mortgage statements. In addition, not all communication management systems have the same technical capabilities. For example, such systems are designed without appropriate interfaces to check whether a CA would exceed a threshold, and are not designed to be configured to make such checks before originating a CA. Thus, retrofitting such systems is not merely modifying the software, but may require a fundamental redesign of their operation and require additional hardware.

Furthermore, individuals administrating these systems are often in separate groups, and these separate groups may be governed by different policies and regulations as to how and when communications may occur. As a result, devising an approach to coordinate and manage CAs among these disparate and distinct communication management systems, as well as devising an approach to accommodate the different technical capabilities of systems and policies and regulations governing groups, has proven difficult and challenging.

Thus, a need in the art exists for facilitating the coordination and management of CAs directed to individuals using different forms/channels of communication and/or different communication management systems. Furthermore, a need in the art exists to enable the coordination and management of CAs among disparate and distinct communication systems, while also accommodating the different capacities of these systems and policies and regulations governing groups using these systems. Furthermore, there is a need for such systems to be flexible, to allow variations in different CA profiles with respect to how, when, and the frequency an account may be contacted. It is with respect to these considerations and others that the disclosure herein is presented.

BRIEF SUMMARY

A Communication Attempt Management System ("CAMS") is provided herein that facilitates the coordination and management of communication attempts in the contact center of an enterprise. In particular embodiments, the CAMS manages communication attempts ("CAs") directed to an individual, who is an account holder of a financial enterprise, and in some embodiments, who may be a debtor. Thus, in various embodiments, the CAMS can be used to manage and coordinate CAs originating from a contact center involving various channels of communication related to an account associated with a debtor. Further, in various embodiments, the CAMS manages and coordinates CAs from a predictive voice dialer in a manner that is consistent with various policy, regulatory, or statutory requirements that limit CAs to a debtor that may be defined by the enterprise or by an external regulatory agency. In particular embodiments, the CAMS tracks on a periodic basis CAs made by a predictive dialer and one or more SMS texting system, email systems, and postal mailing systems that are used to communicate with an account holder (e.g., debtor).

In various embodiments, the CAMS is a separate processing system from the one or more communication management systems ("CMSs"). A transfer of information between the CAMS and the one or more CMSs is executed to regulate the CAs made by the CMSs to the debtor. In particular embodiments, an administrator may be involved to coordinate transfer of call attempt information between the CAMS and the one or more CMSs. While in other embodiments, the CAMS operates in cooperation with the one or more CMSs without the direct intervention of an administrator. Further, the CAMS can be configured to autonomously retrieve, process, and provide the results of CAs to one or more external systems. Furthermore, in various embodiments, the CAMS is not necessarily a separate processing system from a CMS, but instead is integrated with the CMS as a single system.

This Summary is not to be used to limit the scope of any claims herein, or in any non-provisional patent application claiming priority to this provisional patent application.

BRIEF DESCRIPTION OF THE SEVERAL VIEWS OF THE DRAWINGS

Reference will now be made to the accompanying drawings, which are not necessarily drawn to scale, and wherein:

FIG. 1 illustrates one embodiment of a prior art contact center, for which the concepts and technologies disclosed herein can be applied to.

FIG. 18 illustrates actions associated with a List Processing Event defined by an administrator according to various embodiments.

DETAILED DESCRIPTION

Figure 1:
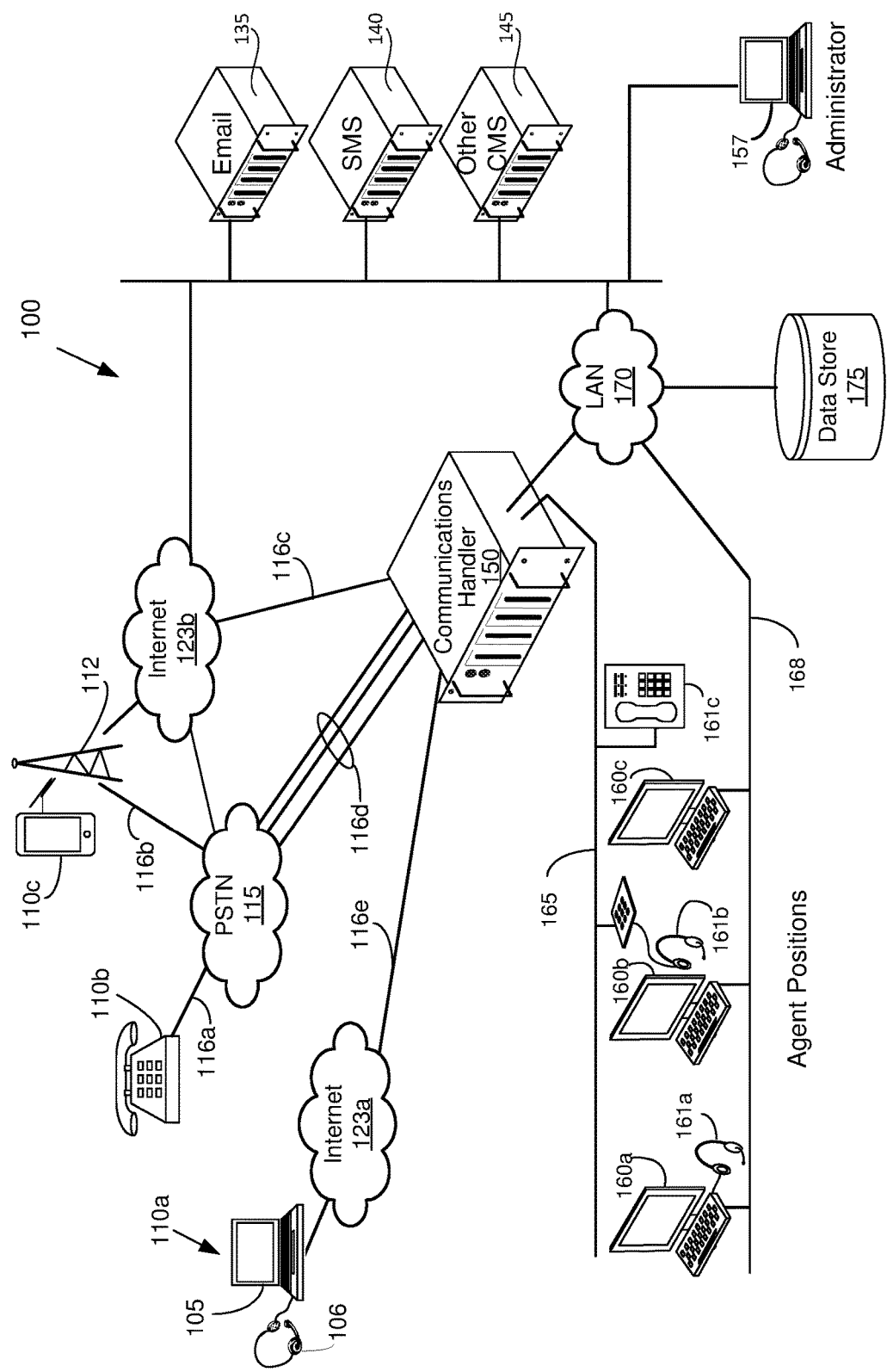

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The embodiments of the invention are discussed herein in the context of managing CAs to an individual who has an account with a financial enterprise or institution, in which the individual is referred to as an "account holder." In instances where the account involves a loan or debt of some type, the individual or account holder may be referred to as a "debtor." A person to whom a CA is directed to is referred to as a "targeted party" or "targeted individual." As will be seen, the targeted party is not always an account holder, but may be a potential customer or someone who knows the whereabouts of the account holder in cases where the account holder is also a debtor.

With that said, those of ordinary skill in the art can readily appreciate the applicability of various embodiments of the invention in other applications in which it is desired to contact an individual in a coordinated manner across various channels of communication for a variety of purposes. Therefore, while a typical application is for a business enterprise or institution in a financial sector to coordinate CAs with its account holders (customers) or potential account holders (potential customers), the concepts and technologies disclosed herein can also be applied for many other business applications for other types of institutions. Furthermore, those of ordinary skill in the art can readily appreciate managing and coordinating CAs can also be applied in other contexts besides business dealings, such as academic institutions, social institutions, charitable institutions, etc. For example, a university considering admission of a prospective student in various colleges in the university may have a need to manage and coordinate communication attempts with that individual across the various colleges or departments. Thus, the scope of the invention is not limited to use by financial enterprises or in the context of business dealings and should not be construed as so unless dictated by the claims.

High Level Context Regarding the Application of the Concept and Technologies

A contact center can be considered as a communication hub in which various forms of communication are originated for an enterprise. A contact center may employ various technologies, such as specialized equipment for making automated or computer managed telephone calls, texts, emails, letter generation, etc.

FIG. 1 illustrates one embodiment of a contact center architecture 100 that may be used in accordance with the various technologies and concepts disclosed herein. The contact center shown in FIG. 1 may process voice calls and non-voice communications that are inbound-only, outbound-only, or a combination of both (sometimes referred to as a "blended" contact center). Although many aspects of contact center operation may be disclosed in the context of voice calls, the contact center may process other forms of communication such as, for example, facsimiles, emails, text messages, video calls, and chat messages.

Since the contact center may handle communications originating from a party, or initiated to a party, the term "party," "user", or "customer" without any further qualification, refers to a remote person associated with a communication processed by the contact center, where the communication is either received from or placed to the party. Thus, use of the term "calling party" or "originating party" refers to a party originating the communication to the contact center and is not intended to limit the concepts to only inbound voice calls, unless the context dictates such. Similarly, the "called party" refers to a party to whom communications from the contact center are directed to and is not intended to limit the concepts only to outbound voice calls, unless the context dictates such.

Depending on the embodiment, inbound voice calls may originate from (or outbound calls may be originated to) parties using a variety of different phone types. For instance, a party may handle a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from (or be directed to) a mobile phone device 110c, such as a smart phone, tablet, or other mobile device, which wirelessly communicates with a mobile service provider ("MSP") 112.

The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols, such as SIP or H.323 protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology, but could refer various VoIP communication channels.

Voice calls may also originate from (or be directed to) a party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of Internet Protocols ("IP") and facilities may be used to convey voice calls.

The term "telephone call" as used herein is generally synonymous with a "voice call" unless indicated otherwise. Further, the term "telephone call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of the two-way connection.

In another example, a call may be put on hold, and a portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. In certain contexts, which will be made explicit, the call may encompass communications other than voice, for example, text, email, video chat, facsimile, etc. However, unless stated otherwise, a call is a voice call.

In various embodiments, inbound calls from calling parties to (or outbound calls from) the contact center may be received at a communications handler 150, which could be, in one embodiment, an automatic call distributor ("ACD"). In particular embodiments, the communications handler 150 may be a specialized switch for receiving and routing inbound calls under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming call over contact center facilities 165 to phone device used by an available agent. Depending on the embodiment, the facilities 165 may be any suitable technology for conveying the call, including but not limited to a local area network ("LAN") 170, wide area network ("WAN"), ISDN, or conventional TDM circuits. In addition, the facilities 165 may be the same or different from the facilities used to transport the call to the communications handler 150.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, typically provided via a computer monitor. This is used to convey information to the agent about the calls, and the agent may interact with the communications handler using a mouse or other pointing device in conjunction with their computer display.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. The workstation may also communicate this login information to the communications handler 150. This allows the contact center (including the communications handler) to know which agents are available for handling calls. In particular embodiments, the communications handler 150 may also maintain data of an agent's skill level that may be used to route a specific call to the agent or group of agents having the same skill level. The communications handler may also know what type of channels and how many channels the agent can handle. In particular instances, if a suitable agent is not available to handle a call, the communications handler 150 may queue the call for the next available agent. As can be expected, various algorithms may be employed to process calls in an efficient manner.

In various embodiments, the communications handler 150 may place a call (either an inbound or outbound call) in a queue if there are no suitable agents available, and/or it may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components, such as the data store 175, to retrieve or provide information for processing the call. In other configurations, the IVR may be used to only provide announcements.

Depending on the embodiment, the interaction between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, the facilities associated with the LAN 170 may be used.

In addition to receiving inbound communications, including, for example, voice calls, emails, text messages, and facsimiles, the contact center may also originate communications to a called party, referred to herein as "outbound" communications. In some embodiments, the communications handler 150 may be a dialer, such as a predictive dialer, that originates outbound calls at a rate designed to meet various criteria. The predictive dialer may then connect an agent at a workstation with the outbound call via a call leg after the remote party answers. Similar to the other components within the contact center architecture 100, depending on the embodiment, the dialer may comprise one or more software modules executing on a processing device hardware platform.

In various embodiments, the communications handler 150 is typically configured to dial a list of telephone numbers to initiate outbound calls. Thus, in some embodiments, the communications handler 150 may include functionality for originating calls, and if so, this functionality may be embodied as, or integrated with, a private automatic branch exchange ("PBX" or "PABX"). Further, in other embodiments, the communications handler 150 may directly interface with voice trunks using facilities 116*c*, 116*d*, and 116*e* to the PSTN 115 and/or Internet providers 123*a*, 123*b* for originating calls. In some embodiments, the communications handler may only handle voice calls, and so may be referred to as a call handler. Further, some call handlers may only originate voice calls, such as a predictive dialer.

After the calls are originated, a transfer operation by the communications handler 150 may connect the call with an agent or to a queue, or in some instances the IVR. In various embodiments, the communications handler 150 may make use of one or more algorithms to determine how and when to dial a list of numbers so as to minimize the likelihood of a called party being placed in a queue while maintaining target agent utilization.

The contact center may also receive or originate non-voice communications, such as email messages. The email messages may be sent or received by a user using, e.g., a smart phone 110*c* or a computer 105, which are conveyed by the Internet 123*a*, 123*b* to an email server 135 in the contact center. The email center may provide the email messages to the communications handler 150, which then queues the email messages to the appropriate agents. Similarly, the contact center may also receive or send an SMS or text messages. The text messages may be sent or received by the user using a smart phone 110*c*. The text may be sent by the MSP 112 over the Internet 123*b*, which are received by an SMS gateway server 140. Once received, the texts are provided via the LAN 170 to the communications handler 150 where the texts are then queued for the appropriate agents. With respect to chats sessions, the customer may access a web site in a chat server (not shown) using a computer 105, and request a chat session. This establishes the chat session using the chat server, which communicates the session to the communications handler 150 that queues the appropriate agent for the chat session.

Those skilled in the art will recognize that other architecture alternatives exist for accomplishing the exchange of chat, text, and email messages. For example, any of the email servers 135, SMS gateway 140, or other CMS components 145 could be integrated into the communications handler 150. Other embodiments may require interaction with various other components with various service providers. For example, the origination of an SMS text can occur by sending an email to an external service provider that interworks the contents as an SMS text. Further, other types of non-voice messages could be exchanged, and may involve additional elements, such as fax servers, social media web sites, etc. Any communication element that originates to a party from a component, such as a call handler, email service, fax server, etc., can be called a communication management system ("CMS") and is generically shown as a separate component 145 in the diagram in FIG. 1.

As will be discussed in greater detail, an incoming voice communication may be received directly at the communications handler 150, or at one of the servers/gateways if non-voice. The server/gateway will then inform the communications handler 150 of the particular communication session. The communications handler 150 will then determine which agent is authorized and available to handle the communication, and thereafter appropriately coordinate any response message. In one embodiment, the communications handler 150 uses a common scheme for allocating a communication session to an agent. In other embodiments, different schemes could be used. For example, incoming voice calls can be allocated to agents on a round-robin basis, but incoming emails can be allocated on a least-number-served basis, while chat sessions can be allocated to the first available agent based on seniority.

An administrator's computer 157 may be used by an administrator to impact the agent authorization and selection procedures, which may involve configuring the various servers/gateways and the communications handler 150. As will be seen, the administrator may also manage other components disclosed herein for managing the communication attempts directed to a party. The administrator may have access to various data structures (as discussed herein) for defining what types of communication channels an agent may handle and how many. Thus, the administrator has the ability to adjust the 'mix' of channel types that agents may handle. This can be done for various reasons, including to account for day-to-day variations in an agent's work ability. For example, an agent with a sore throat may be able to handle non-voice communications, but may request to not handle any voice calls for a shift.

Although a number of the above components may be referred to as a "server," each may be also referred to in the art as a "computing device," "processing system", "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Those skilled in art will recognize FIG. 1 represents one possible configuration of a contact center architecture 100, and that variations are possible with respect to the protocols, facilities, components, technologies, and equipment used. For example, various algorithms and queuing arrangements may be defined to efficiently process and/or place calls.

High Level Summary of One Embodiment of Rules Governing Communication

Communication attempt policy rules used in a contact center, whether based on internal policies, federal or state regulations, ("Rules") relevant to the operation of various embodiments of the CAMS define the Rules and limits regulating communication with a debtor. These may originate from an external regulatory agency (such as the Consumer Financial Protection Bureau), be defined by the business enterprise itself, or a combination thereof. In general, the Rules may be defined to regulate communication for all channel types with a consumer, individual, debtor, or other end user. The Rules may govern not just voice calls, but also govern texts, emails, mail, etc. In some instances, the Rules may mandate coordination across all communication channels with respect to the frequency of communications with debtors. Hence, various embodiments of the CAMS provide the means to coordinate CAs across all of these communication channels, including CMSs. Certain aspects of the Rules may include:

a) Frequency of Contact with Debtor. The number of CAs per account may be regulated on a weekly basis. This number is dependent on whether a "confirmed consumer contact" ("CCC") has been established or not. Prior to establishing a CCC, no more than a total of 6 CAs are allowed per week to a single account of a debtor, with no more than a total of 3 CAs allowed per week to any one telephone number or address of the debtor. After a CCC has been established, the limits are reduced to a total of 3 CAs per week to a single account of a debtor, with no more than a total of 2 CAs per week to any one telephone number or address of the debtor. These limits may be exceeded if the debtor has consented to allow a greater number of contacts. It is noted that various embodiments of the CAMS are not limited to using the values indicated in the Rules. However, for sake of this disclosure, these values are used to illustrate the concepts described herein.

b) Frequency of Contact with Third-Party Accounts. Third-parties may be contacted in order to ascertain a debtor's location, assuming the debtor's location is unknown. Prior to establishing a CCC with a debtor, no more than a total of 6 CAs are allowed per week to a third-party, with no more than a total of 3 CAs allowed per week to any one telephone number or address of the third-party. Once a CCC has been established, no more CAs are allowed to the third-party for purposes of locating the debtor, since the debtor has been located.

c) Time/Place/Manner Restrictions. CAs cannot typically be placed outside a window of 8:00 a.m. to 9:00 p.m. The time of a CA is when the attempt occurs, not when the communication is received. Consequently, an email or SMS text cannot be sent outside of the allowable window. (In various embodiments, this limitation does not apply to postal mailings, as the origination time is presumed to be the time the letter is deposited with the postal service or carrier.) Debtors may indicate specific inconvenient times (and presumably inconvenient communication channels) within these windows. Certain default locations are designated as inconvenient locations per se, which include: medical facilities; houses of worship; funeral homes; and daycare facilities. A debt collector must cease communication upon learning that the debtor is in one of these locations and should not originate communications if it is known the debtor is in one of the locations. Use of a debtor's work email is prohibited for communicating with the debtor, unless the debtor consents to using it.

d) Consent. A debtor may provide consent to receive communications in a certain manner. This may include receiving communications on a particular channel outside default calling windows or locations. Consent from a debtor in any form does not automatically pass from one debt collector to another, if the account servicing is transferred to another debt collector. Each debt collector must obtain consent anew for an exception to any default limitation. Thus, consent provided by a debtor to be called by a first debt collector after 9:00 p.m. cannot be relied upon by a subsequent debt collector. In addition, a debtor can revoke consent, as well, for receiving communications, and a debtor's revocation of consent and indication of inconvenient times do automatically pass to a subsequent debt collector. In essence, some information regarding the management of communication attempts automatically flows through one debt collector to another, and some does not. In general, to the extent that the consent or indication favors the debtor, it does pass from one debt collector to the next, but to the extent that the consent of indication favors the debt collector, it does not pass from one debt collector to the next.

e) Miscellaneous. Provisions are considered for the Rules for collecting debt from a military service member (e.g., unique inconvenient times/locations) and decedents (no sooner than 30 days after death) as well as communicating with a "personal representative" of a descendent. However, no specific provisions are detailed. It is presumed that any such rules will be treated as similar to debtor-specified inconvenient times/places/channels.

Terminology

Unless the context dictates otherwise, the following terms are to be given the following meanings hereafter:

Advisory Query (related to Advisory Query Mode)—a query in which a Communications Attempt Repository ("CAR") is not updated. Such a query is essentially considered a "what-if" query that answers the question of "what would be the result if this query were to be processed, but without actually processing the query?" Reference to a "query" without any qualifier is presumed not to be an "advisory query" or a query processed in an advisory query mode of operation. Processing an advisory query is said to be occurring in an advisory query mode.

Account—a correlated set of financial information maintained by a business for an individual or business. For instance, an account could pertain to one or more credit cards issued to a debtor, a mortgage, loan, etc. If multiple sub-accounts are to be associated with a debtor, then such is indicated within an account identifier. An account may be associated with a debt for the purposes of this disclosure unless stated otherwise or dictated otherwise by the context. While an account may be associated with an entity such as a business, for purposes of illustration herein, an account is presumed to be associated with an individual. However, nothing provided in this disclosure prohibits the use of the concepts described herein from being applied to an account associated with an entity such as a business. Thus, "debtor" could be an individual or business.

Account Holder—an individual or business associated with an account, typically at a financial institution. An individual may also be referred to as a "debtor" in instances when the account is associate with a debt. Note that communications made in conjunction with an account does not necessarily mean that the communications are made to the account holder.

Account Identifier—information that identifies an account.

Account Communication Limitations ("ACL")—rules impacting how communications may be limited. This may be one of either:
a) Account Communication Restrictions ("ACR")—state, federal, or enterprise restrictions impacting when/how a CA can occur with respect to a given day.
b) Account Communication Preferences ("ACP")—an individual, debtor, or enterprise preferences as to when/how a CA may occur. This may be preferences regarding times, days, or channels used.

Examples of ACL limitations include:
a) TOD—time-of-day restrictions indicating when a CA may occur within a given day.
b) DOY—day-of-week restrictions indicating whether a CA may occur on a given day.
c) Channel Type—a type of medium used to communicate such as, e.g., voice, text, email, letter, fax, etc.
d) Communication Contingency—a type and status of an earlier CA that may limit when/how a subsequent CA may occur. For example, if a first voice call is not answered, then a subsequent call may be made later that day, but not sooner than 2 hours after the first voice call.

Address—(1) an identifier of a destination of a particular channel type for a recipient for a particular channel type. For instance, an address may be the telephone number for a voice telephone call. The same is true for a SMS text and a fax. The address for an email is an email address. (2) The address for a postal letter is the mailing address. Based on the context, it should be clear whether the term "address" is generic and applies to a communication channel (including postal letters), as opposed to specifically referring to a postal address. To avoid confusion, a qualifier may appear to limit the application to various channels. For example, a "postal address" refers to an address specific for delivery of a letter, whereas "address" can refer to any channel type.

Communication Attempt ("CA" or "attempt")—an attempt to communicate with a targeted party. A CA may be tracked by the CAMS and in addition, may be connection-oriented or connectionless in nature. For connection-oriented CAs, such as a voice phone call, the attempt of the connection itself, e.g., making the phone call, is considered an attempt even if the call is not answered, is redirected to a voice mail service, or is answered, but not by the intended party. For connectionless CAs, such as sending a letter or a SMS text, the sending of the communication is a CA even if it turns out the communication was not delivered to the destination or reviewed by the targeted party.

Communication Attempt Calendar ("CAC" also simply "Calendar")—a GUI representation of a portion of the CAR. Typically, the CAC is limited to CA information associated with an account for a particular time period.

Communication Attempt Instance ("CAI")—a specific occurrence of a CA. Also referred to as an "instance of a CA."

Communication Attempt Repository ("CAR")—the data structure storing CA instances in the CAMS and/or other communication attempt occurrence data. A subset of this data is used for generating the Communication Attempt Calendar.

Communication Attempt Tuple ("CAT")—in one instance, it is information for a CAI returned in response to a query of a particular account. A "tuple" is a structured set of information, frequently with multiple instances contained therein.

Communication Channel (or "channel")—A communication format or medium that may include, e.g., voice, text, fax, email, letters, etc.

Channel Type—the format of a communication channel. Frequently, this is used interchangeably with "communication channel," but in some contexts the "channel type" refers to the particular media. Examples of channels include: voice channel, email, SMS text, fax, letter (postal mailing), etc.

Communication Management System ("CMS")—a system that originates communication attempts using one or more channel types. For instance, in particular embodiments, the CMS may comprise a system for originating communications on a single communication channel (channel type), e.g., an email system, a texting system, a voice calling system, etc. While in other embodiments, the CMS may comprise an integrated system that originates communication attempts on multiple channel types (e.g., an integrated text and email system).

Debtor—a person having debts (monies owed) associated with one or more accounts.

Communication Attempt Management System ("CAMS")—a system that manages and authorizes communication attempts, such as to a debtor. In various embodiments, the CAMS does not initiate communications itself, but manages and authorizes communications initiated by one or more CMSs. In addition, the CAMS in various embodiments comprises the Communication Attempt Management Platform ("CAMP"), the Account Communication Limitations ("ACL") database, and the Communication Attempt Registry ("CAR"). Although the concepts and technologies of the CAMS is illustrated in this disclosure for managing and authorizing CAs for debt collection purposes, the CAMS can be used to manage and authorize CAs for other (non-debt collection) purposes. In some contexts, reference to the CAMP is synonymous to the CAMS, in that the primary processing capability of the CAMS is provided by the CAMP.

List—a number of records, having a similar structure, such as a calling list, email list, etc. May also be called a "communications list" or "contact list." A list having a single common channel type may be further referred to as, e.g., a "mailing list" or a "calling list."

List Query—a query for processing information typically involving a plurality of accounts. If the query pertains to a single account, it is typically referred to simply as a "query" (see below), whereas if multiple accounts are involved, it may be referred to as a "List Query."

Query—a request to process information associated with one or more particular accounts. There are various types of queries, such as:
  a) A query to read account information, typically CA related information. The CA information returned may be none, one, or more CA tuples. Other information may include, e.g., CCC status.
  b) A query that includes information sufficient to identify an account to be accessed, e.g., debtor/account/channel type/address/date or time period information.
  c) If a query for an account cannot be updated or successfully processed, the account may be included on an exception list, along with a reason as to why a CA could not be initiated for that account. Various reasons may include: weekly attempts exceed (either per channel type or aggregate); a live communication has already been obtained for the week; a debtor is deceased; a CCC has been established (relative to attempts to third parties); an inconvenient time/channel/day/location; etc.
  d) A Basic Query involves processing information about an account, such as a CA instance, with minimal application of Rule information in order to process the account information. For example: a Basic Query could ask: how many CAs occurred for a given account during a time period?
  e) An Enhanced Query involves processing information about an account that requires application of a Rule (either an enterprise defined Rule or an external Rule) in order to return a result. For example: how many violations occurred for an account during a time period? Such a query may require not only knowing when CAs were made, but also applying a Rule that defines what constitutes a violation. Another example of an enhanced query that requires application of an external rule is: what is the most effective channel to use to communicate to an account during a particular time period? Answering such a query requires knowing what CAs were made to that account, which channels are available to use, and which channel is more effective.
  f) An Advisory Query is a query that is processed in a manner so as to not affect an actual update to the CAR. This is indicated in the query itself in some form, such as via a flag or other form of indicator, called the Advisory Processing Mode indicator ("APM"). If the APM indicates the query is an advisory query, then the account processing is essentially performed as "What would happen if the CAR were updated?" as indicated in the query. The typical result is to return what, if any, violations would occur if the CAR had been updated, but without actually updating the CAR. Thus, an advisory query is useful to ascertain what would happen if a query or list is processed, without actually updating the CAR.
  g) An Account Update Query (a.k.a. an "update query", or simply a "query" without any qualifier) is indicated when the APM does not indicate an advisory query. It is processed so that the CAR is updated, and any associated results (such as violations) are returned. Usually, a "query" is presumed to be an update query unless it is qualified as being an advisory query. The various forms of queries can also be indicated as advisory queries and be processed in an advisory query mode.

Types of Queries include:
  a) PAST-CA—a query that requests processing an indication of a CA that has occurred in the past.
  b) PRESENT-CA—a query that requests processing an indication of a CA that is presently occurring or is planned to occur shortly.
  c) SCHEDULED-CA (a.k.a. "Reserved-CA", "Future-CA")—a query that requests processing an indication of a CA that is planned or scheduled to occur at some point in the future.

Re-Presentment (a.k.a. "Number Re-Presentment")—a process of re-attempting communication to an address for a particular communication channel, typically on a voice channel and during the same day (or processing cycle) as an earlier attempt. In various embodiments, the determination of whether to re-attempt communication depends on the outcome of a prior CA to that same number. For example, a CA may be made by a dialer to a number, and the attempt may have reached a busy signal or there was no answer. The dialer may be configured to re-attempt communication to that same number later in the day. In some embodiments, this "re-presentment" may occur by the CMS (e.g., dialer) without an additional, explicit querying from the CAMS. The subsequent CA may be referred to as a "contingent CA" since it depends on the status of an earlier CA.

Redirection Indicator ("ReDI")—an indicator that may be included in a query that indicates which entity (or entities) the output or the response should be directed to. For example, an administrator may submit a query for processing and the redirection indicator may indicate the results are to be provided a) back to the administrator and b) to a CMS. In some embodiments, the results provided to an entity (e.g., the CMS) may be slightly modified, but convey the same account-related information. Such modification may be made because the response to a query may include some protocol elements used by a first entity (e.g., the query sender) to correlate the response with the query and the protocol elements are not recognized, or needed, by another entity. This capability can be used to avoid having to have an administrator submit a list for processing, receive the results, and then having to transmit the results to a CMS for originating CAs.

Reservation—this is an action updating the CAR that writes information about a scheduled-CA (e.g., in the future). A reservation is synonymous with "scheduling." The CA is not indicated in the CAR as having actually occurred when the future time occurs. The purpose for reserving a CA is so that it can be used to determine whether an earlier CA is allowed, given that a scheduled-CA is expected to occur at some future time. That is, the purpose for reserving a CA is so that it can be used to answer the question of whether an earlier CA would cause a subsequent violation. For example, a rule may prohibit more than two CAs on a given channel to an account in a week and a CA may have occurred on Monday on a given week for an account using a specific channel type. If a reservation for a scheduled-CA is made for that account for Friday of the same week using the specific channel type, then requesting permission to make a CA on Wednesday using the specific channel type would be denied because doing so would cause the CA on Friday to be a violation. Hence, the request on Wednesday is denied to preserve the ability to send the scheduled-CA on Friday. However, when Friday occurs, the reserved CA does not indicate that the CA actually occurred, but allows a CA to occur without causing a violation. (This aspect can be overridden, though.)

Rule: one of the rules regulating or controlling CAs to a targeted individual, typically a debtor. When used with a lower case ("rule"), it could be a rule promulgated by the enterprise or some other authority; when used in upper case, it could be a federal agency regulation.

Targeted Party (a.k.a. Targeted Individual)—an individual to whom a CA is directed. The targeted party may be an account holder, a debtor, or neither. For example, the targeted party may be an individual who may know the location whereabouts of a debtor.

Third Party Entity ("3PE")—an entity, component, or system that is not the CAMS. A third party entity could be, e.g., a CMS, Customer Relationship Management System, database, etc. The reference to "third party" does not imply any type of ownership relationship of that entity relative to the CAMS.

Update—a query that writes CA information in the CAR associated with a particular account.

Violation—a condition in which a CA during a given time period for a given account violates a Rule, policy, rule, or an ACL. A violation occurs when a number of CAs for an account during a time period exceeds an allowed limit, or threshold, for that time period. Violations may be classified as "major" or "minor." Generally speaking, a major violation is typically a violation of a Rule or statute and a minor violation is typically a violation of a customer preference or a policy of the enterprise (rule).

Overall Architecture

Figure 2A:
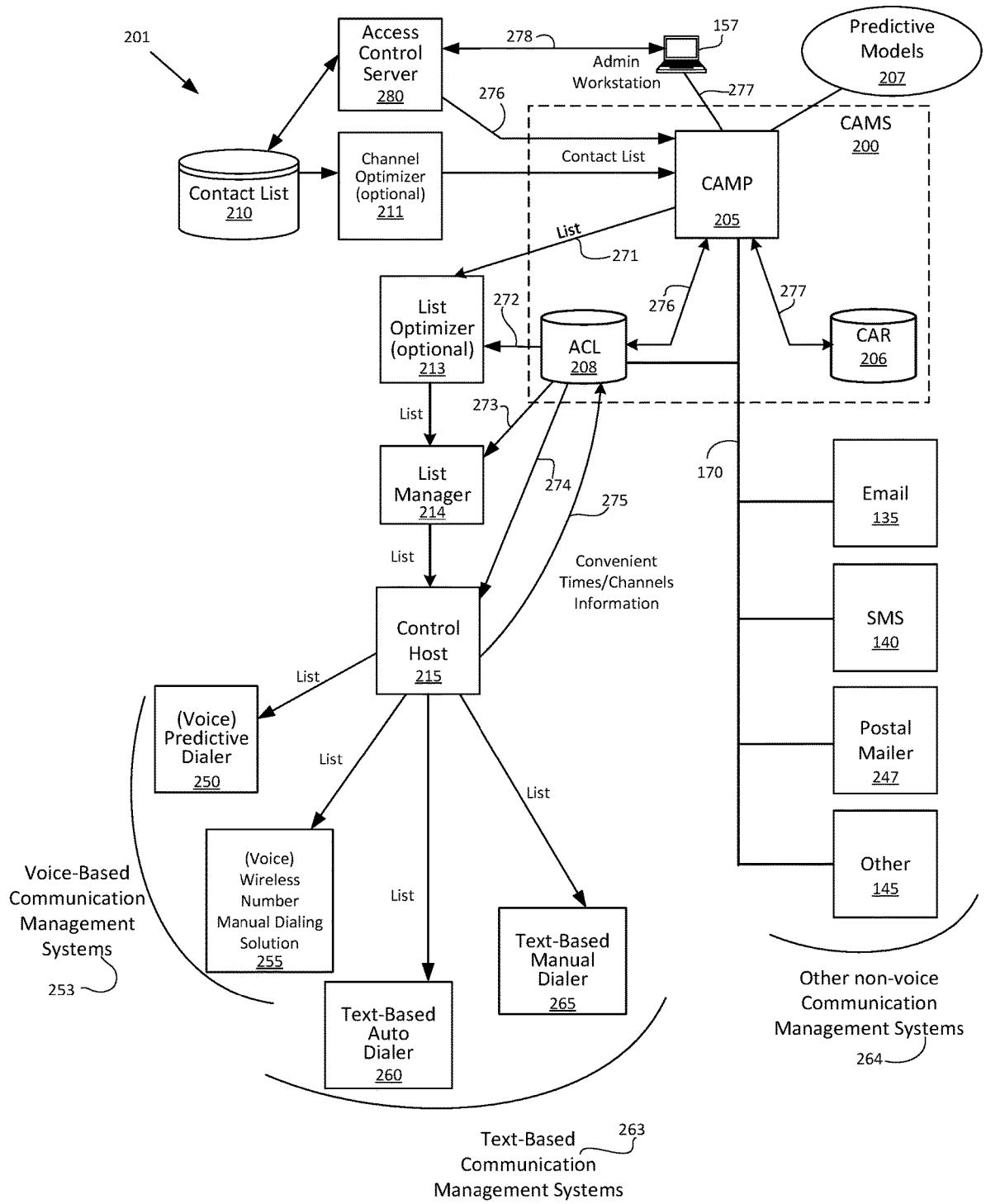
FIG. 2A illustrates a high level architecture of the CAMS in relationship to other contact center components according to various embodiments.

A high level architecture 201 of the CAMS 200 in relation to other CMSs and other contact center components is shown in FIG. 2A. In various embodiments, the CAMP 205 can be thought of as the processing portion of the CAMS, that is the "brain" of the CAMS. Depending on the embodiment, it is considered a specially-configurable computer processing platform configured for implementing the concepts and technologies disclosed herein or is a generally-configurable processing system that is specially configured for implementing the concepts and technologies disclosed herein. Generally speaking, the combination of the CAMP 205, the ACL database 208, and/or the CAR 206 is referred to as the CAMS 200. Because the processing function of the CAMS is provided by the CAMP 205, referring to the CAMP 205 or CAMS 200 in various contexts is effectively interchangeable, if the context is primarily intended to refer to the processing functionality.

In various embodiments, the primary function of the CAMS is to coordinate and manage CAs across various communication channels and CMSs. For example, prior to a period of time (such as a work day), a list of records may be supplied from some type of component such as a contact list data store 210 that is to be contacted during the period of time. Here, each record may represent an account. In particular instances, the contact list may include records that are to be contacted using a specific channel of communication such as telephone calls, emails, or SMS texts. However, in other instances, the contact list may not be specific to a particular channel of communication and the list may be provided to a channel optimizer 211 that determines the best channel of communication to use in contacting each record (account) on the list. In addition, the channel optimizer 211 may segregate the contact list into sub-lists of records for each channel of communication to be used to contact the records found in the contact list.

At this point, the contact list (or individual sub-lists) may be provided to the CAMS 200 and the CAMP 205 checks each record in the contact list against the CAR 206 to determine whether a CA can be made to the record without resulting in a violation. If not, then the CAMS 200 may disregard the record from the list. However, for the allowable records, the CAR 206 may be updated to reflect the CA to be made to the record during the period of time.

Further, the allowable records may be provided to a list optimizer 213 in particular embodiments where the CAs involve one or more voice-based CMSs or text-based CMSs. Here, the list optimizer 213 may prioritize the records with respect to the CAs to be made for the records based on time and likelihood of a successful outcome resulting in making the CA to each of the records on the list. For example, the list optimizer 213 may prioritize the allowable records based on what time of the day the CA (a phone call) should be made to a particular record that provides the best likelihood of reaching the intended party (having the intended party answer the phone call).

Furthermore, the allowable records may be provided to a list manager 214 in particular embodiments that coordinates with one or more CMSs at placing the CAs for the records. That is to say, the list manager 214 manages the delivery of records to a CMS in a coordinated effort to help achieve business objectives for CA efficiencies and effectiveness, while optimizing resources. In this respect, the list manager 214 may provide records in small batches to a control host 215 that directs one or more CMSs to originate CAs.

Thus, depending on the embodiment, the CMA's coordination and management of CAs involves tracking the number of CAs, updating the number of CAs in the CAR 206, and/or determining whether a CA will result in a violation (e.g., exceed some threshold limit on the number of attempts allowed during a time period, such as during a week). To this extent, the CAMS coordinates CAs on non-voice channels CMSs 264 that are not typically coordinated by contact centers today. With that said, various non-voice communication systems 135, 246, 247, 145 are illustrated in FIG. 2A, although a contact center may only make use of a subset of these systems to actually communicate with parties. Each of these, namely the email system 135, the fax system 246, the postal mailing system 247, and other systems 145, may be generically referred to as a communication management system ("CMS") that manages outbound communications, typically for a particular channel type.

In various embodiments, the CAMS tracks CAs to various account holders on a periodic basis, such as, for example, on a weekly basis that occurs over a calendar week beginning on Sunday or Monday. Thus in this example, the number of CAs for each account is "zeroed out" or reset to zero at the beginning of each week. In other embodiments, the periodic basis may be defined differently, such as the last 7 days from the current day. However, for purposes of illustration, the concepts and technologies are discussed herein using a periodic basis of a calendar week beginning on Sunday.

Continuing on, in various embodiments, information on CAs is recorded in a registry known as the CAR 206 and this information includes CAs that have occurred, will occur, or are planned to occur for a given account. The CAR may organize a number of CAs for each account on a periodic basis, such as for a week. The number of CAs may be presented in a format that shows their channel type, and whether a particular CA resulted in a violation (e.g., a threshold limit was exceeded). In particular embodiments, the information recorded in the CAR 206 for an account can be presented in a human readable form referred to as the Calendar. Although the CAR 206 is shown as a database repository in FIG. 2A, the CAR 206 in other instances can be a data structure that is integrated with the CAMP 205 so that no physical distinction is readily evident.

Moving on, the CAMS in various embodiments coordinates and manages CAs with other components/systems by tracking and/or authorizing CAs with respect to those components/systems. Typically, the CAMS does not itself originate communications or directly control the other components/systems (although it may do so in some instances), but provides authorization information to these components/systems (the CMSs), which do then originate the communications. For instance, a CMS may be a voice call handler system ("CHS") that originates telephone calls and the CAMS may provide this CHS with authorizations to make CAs for various accounts. However, in other embodiments, the CAMS may be integrated with one or more CMSs that do originate communications. For instance, in some embodiments, the CAMS may have an integrated CHS for making voice calls and/or an integrated CMS for sending emails. For simplicity of illustration, the concepts and technologies are presented herein assuming the CAMS is a distinct and separate component from the CMSs.

As mentioned, the CAMS typically conveys information to a CMS as to whether a CA to an account is, or is not, authorized to occur. For instance, in particular embodiments, the CAMS may convey information indicating a CA is not authorized for a specific account or the CAMS may convey information removing the account altogether from a list of accounts the CMS is to process CAs for. In the former case, the CMS is presumed to respect the indication received from the CAMS and not make a CA for the account. In the latter case, the CMS is devoid of information on the account so that a CA is not made by the CMS for the account.

As for tracking CAs, two main approaches are generally used for conveying tracking information about a CA for an account depending on the embodiment. The first approach is conveying tracking information separately on individual accounts, while the second approach is conveying tracking information jointly on multiple accounts (essentially a 'batch' process). However, regardless of the approach used, the functions associated with requesting and conveying the tracking information for an account are the same.

For instance, in particular embodiments, the CAMP 205 includes an application program interface ("API") or other suitable interface known to those skilled in the art configured to submit or receive queries to or from various components for information on one or more specific accounts. For example, a CMS may originate a query to the CAMS as to whether a particular CA can occur for an indicated account. Here, the CAMP 205 receives the query via the API and accesses the CAR 206 to gather information to ascertain whether the CA can occur. In addition, the CAMP 205 can query information on CAs made for one or more accounts via the API from a CMS and update the CAR 206 to reflect the CAs made for the one or more accounts based on the information received back from the CMS.

Furthermore, an administrator may make use of a graphical user interface ("GUI"), such as one or more webpages supported by a web server to submit queries to the CAMP 205 regarding information on one or more accounts. Here again, the CAMP 205 receives the query via the API from the web server and facilitates the administrator's ability to view or update the CAR 206 for desired accounts, as well as review information on CAs for desired accounts made visible on the Calendar through the GUI.

In particular embodiments, the web server may also provide various login support and other administrator-oriented functions for accessing and managing the Calendar, hence the server may be referred to as an Access Control Server ("ACS") 280, although the ACS may not be limited to only controlling access by a user. Thus, under the approach using an API, the CAMP 205 may receive and/or convey information to or from a CMS and/or a management system (e.g., in the form of the ACS controlled by an administrator). In addition, the CAMP 205 may receive and/or convey information from other external systems via the API such as a reporting system, management enforcement system, etc.

The second approach the CAMS may make use of to receive and/or convey information is similar to the API, but uses a "batch mode" interface that receives and/or conveys a file or list having multiple accounts. Specifically, a list comprising a plurality of records may be received by and/or conveyed to the CAMS for a plurality of accounts. The fundamental core functions performed by the CAMS on each account in the list is typically the same as those functions performed by the CAMS on a single account using the API. However, the batch query interface is geared to processing large numbers of accounts. The lists received or conveyed via the batch query interface are generically referred to as a "communication list" or "contact list" (or simply "list"), and if the list has records pertaining to a single channel type (e.g., voice calls), then the list may be referred to as a "calling list", "mailing list," "email list," etc. to reflect the associated channel involved.

Generally speaking, the batch mode capability can be used in various embodiments when interfacing to a CMS, an ACS, or to some other administrative system, similar to the query-based API. In fact, in some embodiments, the same API interface may be used to receive queries for a single account as well as list queries for a plurality of accounts. Further, the functions performed for a given account are typically the same as the set of functions that can be performed on a plurality of accounts indicated in a list. Thus, depending on the embodiment, a single interface may handle queries for a single account versus for a list, or different interfaces may be used.

Types of Updates

Conceptually, the CAMS receives different types of communication lists representing past, present, or future (a.k.a., scheduled) CAs. Typically, each list is associated with a specific communication channel (e.g., email, postal mail, etc.). While it is possible to have a list with different types of communication channels indicated (a non-homogeneous list), it is conceptually easier to describe the operation in the context of a homogeneous list. In some instances, a list may be provided to the CAMS to effectively "scrub" it. That is to say, a list may be provided to the CAMS to process each record against corresponding account data in the CAR 206, and potentially update the CAR 206. The output from the scrubbing process may then be provided to the appropriate entity designated to receive the response, typically the entity initiating the query to have the list scrubbed.

The purpose for scrubbing a list may be varied. For instance, one purpose may be to update the CAR 206 to reflect CAs that were actually generated by a CMS. For example, the CAMS may send/receive a list of Present-CAs associated with an email system 135, a fax system 246, a postal mailing system 247 or some other system 145. Frequently, each time the CAMS receives a list, the CAM scrubs the list by updating the CAR 206 accordingly and the result may then be provided to the corresponding CMS to generate CAs.

As briefly mentioned, FIG. 2A illustrates a number of non-voice communication management systems (handling different channels) 264 that a CAMS may interface with and a debt collector, for example, may use to communicate with debtors. Generally speaking, the postal mailing system 247 and email system 135 channels may be the only channels initially used by a debt collector to communicate with debtors, in addition to voice calls. A fax channel is not normally or frequently used for debt collection purposes, but this channel illustrates how the CAMS can coordinate with other non-voice based communication channels. Further, a debt collector's use of SMS texts may be relatively infrequent as compared to the use of voice calls and letters, but SMS text usage is expected to grow when considering the cultural aspects of certain population segments, i.e., the so-called "millennials."

In various embodiments, voice-based communication CMSs 253 may include a control host (or simply "host") 215, a telephony component such as a predictive dialer 250, and a wireless number manual dialing solution 255. Together, the control host 215 and the predictive dialer 250 may form a call handler, or a communications handler 150. In other embodiments, the host and dialer are integrated and are only shown as a predictive dialer. In particular embodiments, the host 215 may direct the predictive dialer 250 to originate calls upon command and/or may maintain CAs and calling window compliance information for voice calls. Accordingly, the CAMP 205 may be provided with the CAs and/or calling window compliance related information so the CAMP 205 can maintain the official tallies for such information.

In particular embodiments, the wireless number manual dialing solution 255 may be similar to a solution such as the ones described in U.S. Pat. Nos. 8,989,814 and 9,036,811, of which the contents of each are incorporated by reference for all that they teach. In addition, the wireless number manual dialing solution 255 may also cooperate with the control host 215 so that the control host 215 can also maintain call attempt information based on calls originated by an agent using the wireless number manual dialing solution 255. In some instances, it may be possible that the same telephone number is attempted by both the predictive dialer 250 and the wireless number manual dialing solution 255 at different times under different conditions. However, regardless of the dialing mode or equipment used, each telephone call originated to a telephone number is considered a CA.

The text-based communication CMSs 263 provides a similar capability for sending SMS texts in a compliant manner. The text-based autodialer 260 may provide SMS "blasting" in a compliant manner whereby texts are sent to a plurality of telephone numbers in a list in a rapid manner. Each of these text-calls is made within the allowable calling window of the each account, and CAs of text calls are coordinated along with voice calls. A text-based manual dialer 265 allows individual SMS texts to be sent by an agent in a Telephone Consumer Protection Act ("TCPA") compliant manner to a debtor, similar in some respects to the voice-based wireless number manual dialing solution 255 (which also involves human intervention on each call attempt). The text-based manual dialer 265 again complies with the calling window and call attempts regulations. In particular embodiments, the components of the text-based manual dialer 265 may be similar to the solution found in pending U.S. patent application Ser. No. 15/352,656 filed on Nov. 16, 2016 and entitled "Originating Calls in a Contact Center Either in a Voice Dialing Mode or a Text Dialing Mode," the contents of which are incorporated by reference for all that they teach. In general, if a debt collector does not use SMS to communicate with debtors, then this communication system is not deployed and there is no interaction with the CAMS.

Finally, in various embodiments, the host 215 may coordinates CAs for voice calls (both predictively dialed and manually dialed) as well as for text calls (both "blasted" and individually sent). In particular embodiments, the host 215 is considered the system of record ("SOR") for managing voice call and text call attempts, however the attempts are reported to the CAMS so that it can maintain an accurate record of CAs. However, if an enterprise has a contact center that uses a separate SMS communications system, then the CAs can be tracked by the CAMS in a similar manner as with the non-voice communication systems.

In the particular embodiment shown in FIG. 2A, the host 215 is not aware of any CAs made by CMSs using other channels such as email, fax, or postal mailing systems 135, 246, 247. Instead, the CAMS is considered the SOR for the overall CAs made to accounts using these other CMSs and relies on the host 215 to be the SOR for voice and text calls. Consequently, the host 215 informs the CAMS of voice/text call attempts that actually occurred. Therefore, even for components where the dialer/host maintains call attempt information, the CAMS system can be used for coordination of information of the dialer with other non-voice channels. Thus, merely because one form of a CMS may manage its own CA information does not preclude the CAMS from being used to further manage CA information for that CMS and other CMSs. Those skilled in the art will recognize other combinations may be deployed using the principles disclosed herein.

CAMS Overview

Figure 2B:
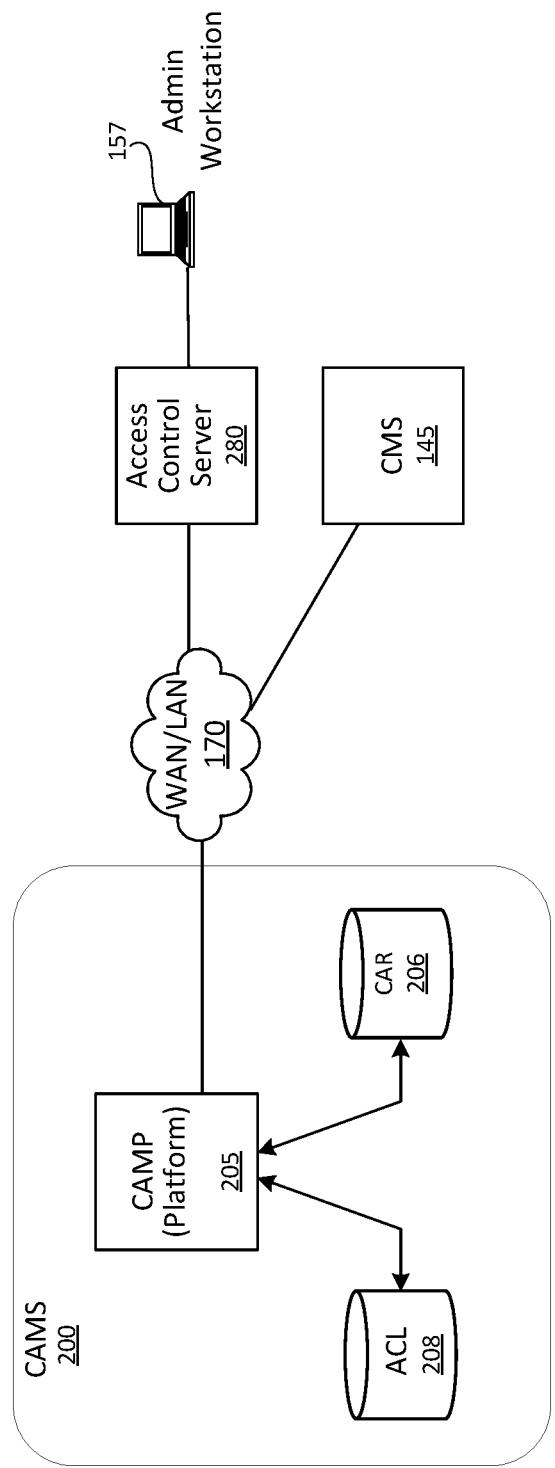
FIG. 2B illustrates a high level architecture of one embodiment of the CAMS with respect to a communication management system and an access control server.

FIG. 2B shows additional details of the CAMS 200. It comprises the CAMP 205 that serves as the processing core of the system, and manages the CAR 206, which can be thought of as a database of CA information, and the ACL 208. The ACL 208 maintains various account communication limitations information, as will be seen. Although the CAR and ACL are depicted in FIG. 2B as separate databases, the physical implementation may be integrated with the CAMP 205 in various embodiments. In addition, the CAR 206 and ACL 208 may be housed in a common database or in different processing systems altogether. Those skilled in the art will recognize in light of this disclosure that a variety of physical and logical architectures are possible, and FIG. 2B depicts only one of such architectures of the CAMS. This representation is chosen in part to facilitate illustration of the principles and technologies.

In various embodiments, the CAR 206 is a registry (e.g., a data store) of the CAs for each account including when they occurred and what channel type was used. The data structure of the CAR 206 may vary, and typically stores sufficient information to identify when a CA occurred, to whom it was directed (including which account of the debtor), channel type, outcome, and the nature of the CA. Other information on CAs may be recorded in the CAR 206 such as, for example, when changes to a CA record are made, by which entity, by which queries, etc. Depending on the embodiment, further information may be recorded in the CAR 206 such as, for example, whether additional restrictions on communications are maintained for a particular debtor/account.

In various embodiments, the ACL 208 is a database of account communication limitations comprising various restrictions and/or preferences that impact when CAs may occur with respect to debtors/accounts. For example, the ACL may maintain preferred channels of communication, preferred times, or other restrictions. In particular embodiments, the CAMP 205 itself does not necessarily require access to the ACL 208 to process a particular query for updating the CAR 206 for an account. However, information in the ACL 208 may be required by the CMS to properly originate a communication, and the CMS may be informed by the CAMP 205 of the existence of ACL data for a given account. In some instances the CAMS may inform the CMS of the information and the CMS may obtain the address of an appropriate database storing the ACL 208. While in other instances, the CAMS may retrieve the information from the ACL 208 and provide it to the CMS. Either way, the CMS obtains the needed information to ensure a communication that is originated is aligned with the limitations.

The CAMS is shown as interfacing with a LAN or WAN 170 in order to have connectivity with external systems in a contact center. In the embodiment shown in FIG. 2B, two external systems are shown: a CMS 145 and an ACS 280. In various embodiments, the CMS 145 is a system that originates CAs, and may be provided with a list of accounts to contact by the CAMS, an administrator, and/or some other contact center system (not shown). In some instances, the administrator may first "scrub" a list of potential accounts by submitting the list to the CAMS via the ACS 280 that allows the administrator to access the CAMS via a workstation 157.

Depending on the embodiment, the ACS 280 can perform a number of functions necessary to accommodate a user, such as ensuring appropriate security, login procedures, user interfaces, and data formatting. For instance, in some embodiments, the ACS 280 provides a suitable GUI for an administrator to use. The ACS 280 can interact with the CAMS in a similar fashion as does a CMS 145. For example, the CAMS can validate an entity it is communicating with, regardless of whether that entity is a CMS 145 or the ACS 280. (Thus, some of the functions performed by the ACS 280 may also be required in the CMS 145.) Once access and the entity's identity is validated, the CAMS may expect to receive various queries for updating and/or reading the CAR 206 for one or more accounts. These queries are largely the same in structure and function regardless of whether they originate from the CMS 145 or the ACS 280. In some instances, however, it is possible to configure an interface at the CAMS that distinguishes and limits the functions that can be invoked from one external entity versus another external entity.

For example, an administrator may submit an email list via the ACS 280 to the CAMS to be scrubbed, and the list of allowable accounts that can be contacted is returned by the CAMS to the ACS 280. That query may include a command instructing the CAMS to also provide the list of the allowable accounts to an email system. Such functionality avoids the administrator from then having to separately send a copy of the list of the allowable accounts to the email system. Thus, the CAMS may allow queries from the ACS 280 to specify a copy (or slight variation) of the response sent directly to a CMS 145. However, the CAMS may not allow such a query from a CMS 145 to command the CAMS to direct a copy of a response to a query to another CMS 145.

In particular embodiments, the ACS 280 may manage administrator logons and various levels of authority of users based on the users' logins. For instance, the ACS 280 may allow a low level administrator or agent to invoke some functions in the CAMS, whereas the ACS may allow a higher level administrator with "super user" privileges to invoke all functions in the CAMS. Further, the ACS 280 may also facilitate an administrator retrieving lists from other contact center systems and format retrieved lists in preparation for submission to the CAMS to avoid the CAMS from having to perform this function.

Further, in various embodiments, the ACS 280 may utilize any number of protocols and procedures for interfacing with an administrator's workstation. For instance, in one embodiment, the ACS 280 may use a HTTP or other web-based protocol to interact with the workstation. In addition, the ACS may also communicate with the CAMP 205 via an API, port, or other means known to those skilled in the art. It is possible that the CAMP 205 may utilize different protocols or interfaces for receiving queries from the ACS 280 as opposed to the CMS 145. Furthermore, different protocols may be used for queries directed to a single account versus queries directed to a plurality of accounts. In the latter case, a list may be transferred that requires different mechanisms compared to a query directed to a single account. For instance, a query for a single account may include the account identification, whereas a query for a plurality of accounts may further identify a list and include a location where the list can be found. The CAMP 205 may then retrieve the list using various protocols, such as FTP, that may not be appropriate or necessary when initiating a query for a single account.

Figure 3A:
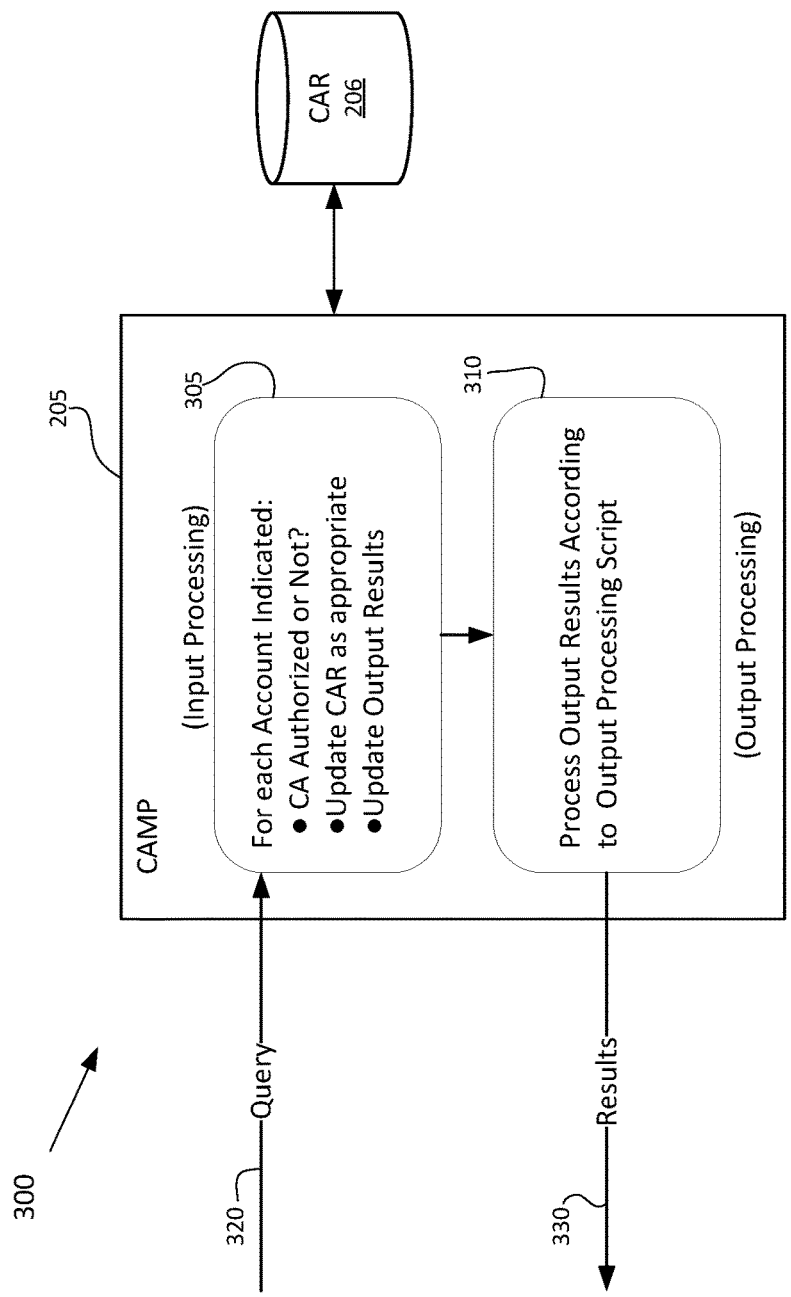
FIGS. 3A and 3B illustrate one embodiment of processing aspects of the CAMS.
Figure 3B:
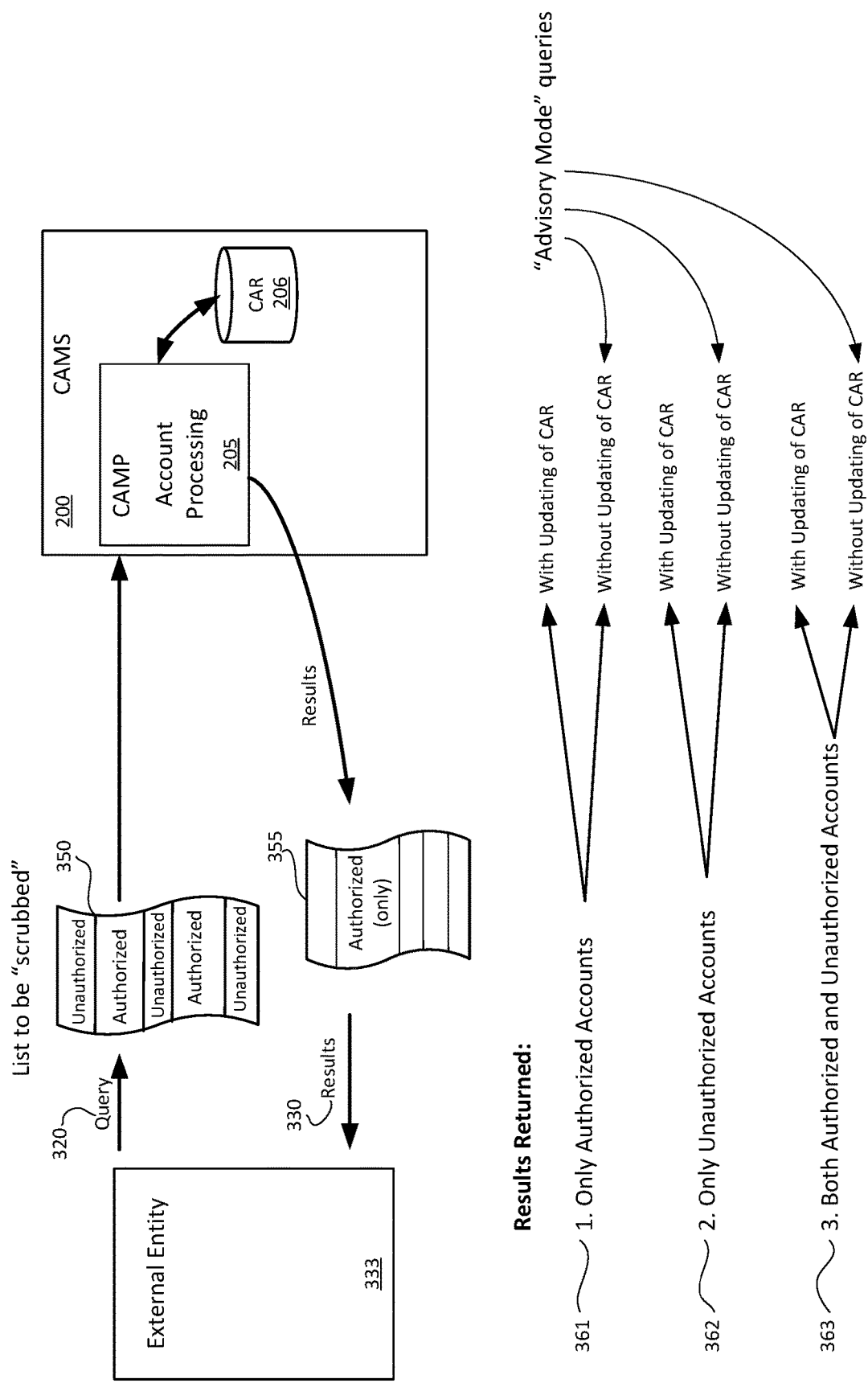

FIGS. 3A-3B—Processing Overview

FIG. 3A provides a high level overview of how queries received by the CAMS can be processed according to various embodiments. A main function of the CAMP 205 is to receive and process queries for managing communication attempts. Depending on the circumstance, a query may identify one or more accounts (either directly or by using a pointer or other identifier to indicate where a list of the accounts can be found). In this instance, each query 320 is processed by a query input processing module 305 that produces results of the query by examining the function to be performed for each account in the query, performing the function for each account in the query, determining whether the CAR 206 is to be updated, and storing the results of the query. In addition, the query results are processed by a query output processing module 310 in particular embodiments by applying an output processing script indicating how the results 330 are communicated.

The processing of accounts by the CAMS is illustrated in FIG. 3B. In this figure, an external entity 333 is shown. This may be a customer relationship management system ("CRM"), CMS, administrator, or some other processing system interfacing with a contact center or an information processing system of an enterprise. The external entity submits a query 320 to the CAMS comprising a list of accounts 350 to be "scrubbed." That is to say, the external entity provides the CAMS 200 with a list having various accounts that may or may not be authorized for initiating a communication. The CAMS receives the query with the list (or a pointer to a list to be retrieved), and processes each account accordingly. Here, the various accounts identified in the list 350, unbeknownst to the external entity, may or may not be authorized to have a particular communication originated to them.

In various embodiments, the CAMS returns a result 330 to the external entity identifying those accounts in the list that are authorized to have the particular communication originated to them. For instance, in particular embodiments, the results may be returned in a modified list 355 that comprises only those accounts that are authorized. Thus, the term "scrubbing" can be thought of as removing the accounts from the list that are not authorized.

Depending on the embodiment, the external entity 333 may request the CAMS to provide different types of output in the results. For instance, the external entity may request the CAMS to provide only the accounts that are authorized to be contacted 361, only the accounts that are not authorized to be contacted 362, or both 363. In the example shown, the resulting list 355 represents only the accounts authorized to be contacted. Accordingly, the results can be provided by the CAMS as a list of the accounts or as information that can be used by the external entity to retrieve the list of accounts. In addition, the external entity may request the CAMS to provide separate results to one or more separate entities.

Further, in particular embodiments, the external entity can request the CAMS to process a query in an "advisory mode." In this mode, the CAMS processes the query without updating the CAR 206. Thus, the advisory mode makes it possible to submit a list for processing to identify those accounts on the list that may be contacted without updating the CAR 206. The results of such a query are normally only current for that moment in time, as subsequent updates to the CAR 206 may reflect subsequent CAs made to those accounts. However, the use of the advisory mode can serve as a check to confirm whether one or more accounts are authorized to be contacted at any given moment in time.

As evident from FIG. 3B, a query can be used to update the CAR 206 and return those accounts which are authorized to be contacted, or a query can be used to check which accounts are presently authorized to be contacted without updating the CAR. Similar queries can request only those accounts which are not authorized, or request both authorized and non-authorized accounts. In the latter case, two separate files could be returned, or a single file that includes a flag indicating which records are authorized or not.

Figure 4:
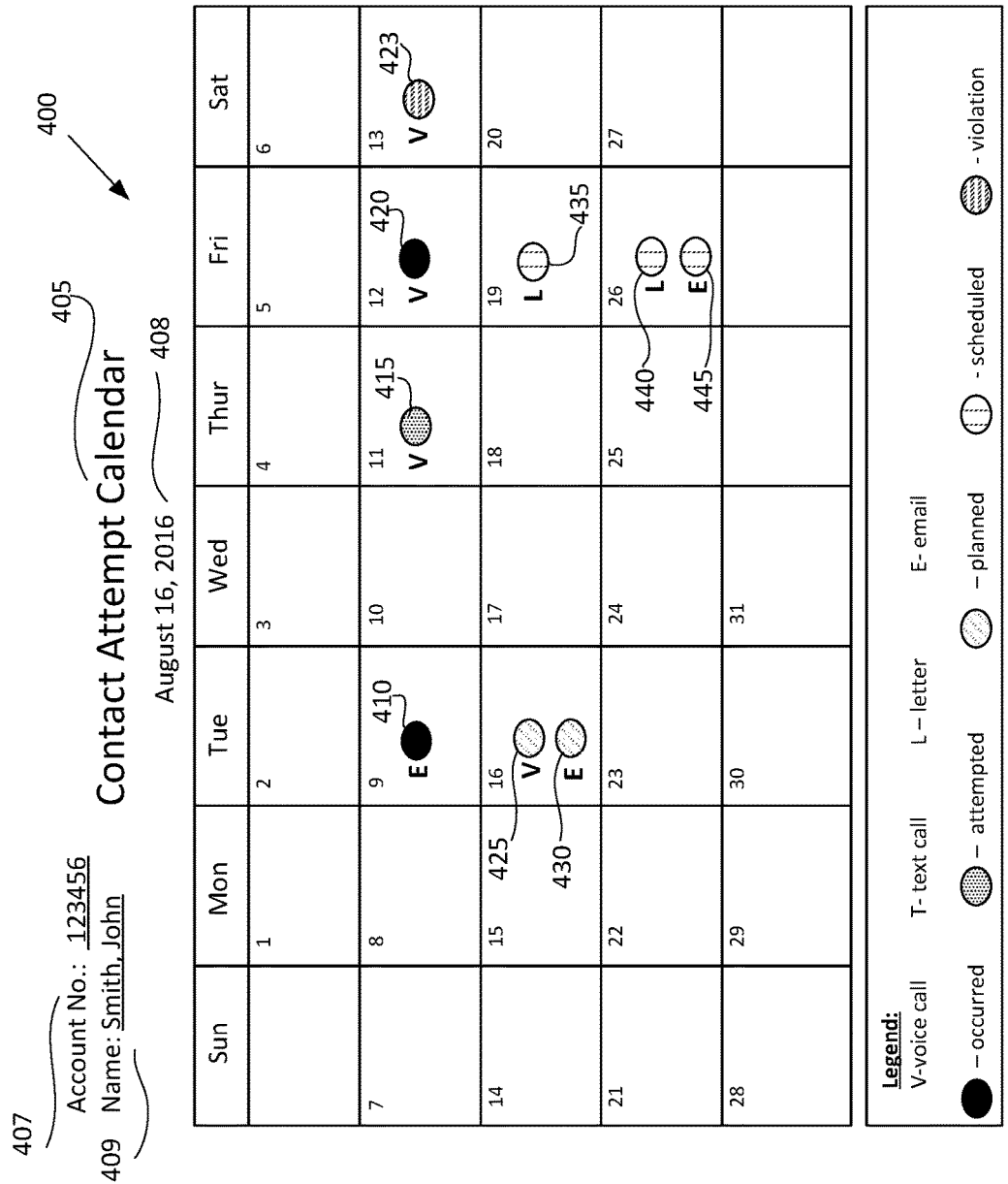
FIG. 4 illustrates one embodiment of a graphic user interface icon known as a Calendar illustrating the occurrence of various communication attempts associated with an account.

Calendar—FIG. 4

The "Calendar" refers to a visual representation of CAR data formatted for presentation to a human. The Calendar displays past, present, and/or scheduled (i.e., future) CAs for a given account. In addition, the Calendar usually indicates a channel type and whether a violation occurred or will occur as a result of a particular CA. A Calendar directed to an account for a debtor may have CAs indicated as:

a) having actually occurred, (e.g., a Past Attempt);
b) about to occur (e.g., a Present Attempt); or
c) planned to occur (e.g., a Scheduled Attempt or Future Attempt).

In various embodiments, the Calendar is generated and presented as a graphical calendar icon to an administrator's computer via the ACS 280. The Calendar may be formatted to reflect a time period, such as for a given week, or a series of weeks (i.e., a month). In addition, the Calendar may indicate specific CAs for an account using a Calendar graphical user interface ("GUI") format.

Typically, the Calendar is not generated for presentation to a CMS or other computer processing system, since a CMS does not need to have CAR data presented to it in a human readable format. However, the contents of the data may be largely the same. Each CA is indicated as one of the above types. In addition, in particular embodiments, violations that occur for an account are indicated in some manner.

Furthermore, the Calendar can be configured in various embodiments with respect to what information is presented and in what format. Thus, in particular embodiments, an administrator is able to select a particular week or day on the Calendar to focus on further detailed information for that particular week or day. Here, a selection by the administrator may result in displaying a new window to an administrator with further details regarding a communication, such as the time sent, disposition of the attempt, etc.

One embodiment of a Calendar 400 is shown in FIG. 4 to illustrate the concept. The purpose of the Calendar 400 is to provide succinct information in a human readable format regarding the CAs made, about to be made, or planned to be made in the future for an account. The Calendar shown reflects a given date 408 for which the information is valid, the name of the Calendar 405, the account number 407, and account name 409. The embodiment shown in FIG. 4 only serves as one example of how a Calendar icon can be organized; other variations in the format, presentation, and structure are possible. It is possible that there are different "views" of the information, such that different calendar formats and contents are generated. For example, a view emphasizing violations, channel types, or frequency of contacts may be generated.

In the embodiment illustrated in FIG. 4, each communication instance is indicated by a letter corresponding to the channel used for the CA and a patterned icon 410, 420, 423, 425, 430, 435, 440, and 445 corresponding to the nature of the CA. This particular format of the information presented on the Calendar is date-sensitive as it may depend on the current date 408. Any days prior to the current date reflect CAs that actually occurred on those days (i.e., in the past). That is say, there cannot be any active "planned" or "scheduled" CAs for a past date since these type of attempts can only be depicted with respect to the present and the future based on the current date. However, it is possible in some instances to show when a CA was scheduled for a past date.

For instance, the Calendar may show a scheduled CA for a past date that represents a CA that had been scheduled but did not actually occur. Further, the voice attempts 415, 420, 423, and 425 shown on the embodiment of the Calendar shown in FIG. 4 are qualified to reflect the outcomes of the voice attempts. A solid black fill pattern 410, e.g., indicates a right party contact ("RPC") occurred whereas a hatched pattern 415 reflects that no RPC occurred. Voice calls are slightly different from other communication channels in that an attempt may be made without success (e.g., without achieving a RPC) and additional outcome information may be obtained by talking with a targeted party.

In contrast, sending a text, email, or letter is presumed to have been successful and any response may be deemed a separate communication. If certified mail delivery is considered as a separate channel, then additional information about the delivery outcome can also be conveyed for this channel. Similarly, for a fax communication channel, the outcome of the delivery attempt(s) can also be indicated. Similar outcomes of delivery attempts may be possible with other channels. In various embodiments, when a fax transmission involves various 'redials' prior to a successful transmission, the various redials may be counted as separate CAs or excluded with only one CA recorded.

As shown in the above example, the CA icon 423 to the debtor on August $13^{th}$ was in violation (shown with a horizontal striped pattern) of the maximum of 3 attempts per week as well as having more than 2 attempts per week for a single channel. Past CAs, shown here with a solid fill pattern, a polka dot pattern, or a horizontal striped pattern, may be referred to as a "Past-CA." The CAs indicated on the date of August 16 425, 430 are shown in a diamond pattern, since they are being attempted on the current day (the Calendar is displayed assuming the current day is August 16). Each of these attempts may be referred to as a "Present-CA." The CAs indicated as occurring beyond August 16, e.g., 435, 440, and 445 (which are in the future) are shown in with a vertical stripe pattern, as they are scheduled to occur in the future and each is referred to as a "Scheduled-CA." Thus, the contents and presentation of the Calendar information is a function dependent on the current day.

Further information could be indicated as to whether a Past-CA did, in fact, occur on the day it was scheduled. This could be indicated as a "conversion" of a scheduled CA into an actual CA. Other indications (not shown) could provide further information as to what campaign each attempt was associated with. For example, an administrator could place a cursor over a CA on a given date and this could cause further information to be displayed on a pop-up window, showing the purpose of the communication. Thus, if a Scheduled-CA was shown on the Calendar, hovering over that icon could show which campaign is associated with that Scheduled-CA. Such information may allow the administrator to further investigate as to why that campaign had to schedule that communication and whether it can be changed.

List Processing

The CAMP 205 in various embodiments is configured to receive and process queries pertaining to a debtor's account, which typically involves either reading or writing information to the CAR 206. While processing fundamentally occurs on a specific-account level, queries may be received by the CAMP 205 for an individual account or for a plurality of accounts (e.g., a contact list, also sometime referred to herein as a "batch mode" type of operation). For purposes of illustration, the list processing functions are used to illustrate the core account processing aspects, however it should be understood these account level processing aspects that can occur for each account in a list of accounts can also occur for an individual account indicated in a query, and vice versa. That is to say, any account level processing functions that can be carried out to process a list of accounts can also be carried out to process a single account.

Typically, lists are provided to the CAMP 205 in the expectation of being processed that day or the next day. This period of time is referred to as a "processing cycle." The exact duration of a processing cycle may vary, but generally covers a 24-hour period of time, or some subset thereof. Because CAs are managed on a daily basis, the processing cycle is typically considered to be a calendar day. In various contexts, it will be evident as to whether a processing function refers to a current processing cycle (i.e., the current day), a prior processing cycle, or a following processing cycle.

In various embodiments, a number of fundamental account processing functions involves updating the CAR 206 for an account during a current or upcoming processing cycle. Generally, there are three types of queries that update the CAs maintained by the CAR 206 for an account, processing a list of accounts essentially performs the function on each account individually, and in the order they are found in the list. The three types of fundamental account processing functions and associated data are:

1) Scheduled Communication Attempts ("Scheduled-CAs"). These are CAs that are planned (scheduled) for the future (e.g., beyond the current processing cycle). Scheduling a CA is sometime referred to as "reserving" a CA.
2) Present Communication Attempts ("Present-CAs"). These are CAs planned for the current processing cycle (e.g., in the present).
3) Past Communication Attempts ("Past-CAs"). These are CAs that have occurred prior to the current processing cycle (e.g., in the past).

As will be evident, in various embodiments, there is a correlated function for processing an account with respect to each type of data/query. For instance, in particular embodiments, "Scheduled-CA data" is processed using a "Scheduled-CA Update Account" function, and is conveyed in a "Scheduled-CA query." Thus, these phrases (e.g., "Scheduled-CA") may be used as nouns or adverbs to reflect processing or other activities associated with that specific form of list. Similar examples can be presented for "Past-CA" and "Present-CA." For example, to "perform a Past-CA update" can mean to perform the process of updating the CAR 206 to reflect past occurrences of CAs for a list of accounts in a Past-CA list.

1) Scheduled Communication Attempts

A "Scheduled-CA" (a.k.a. "Scheduled Attempt") may be used by a debt collector to schedule the sending out of a communication to a debtor in the future, without the possibility of that future communication causing a violation or being blocked because it would cause a violation at the time when it is sent in the future. The effect of reserving a CA on the Calendar for a future date is to guarantee availability for sending that communication on that date. Essentially, scheduling a CA "consumes" one of the allowable CAs for that account during that week.

Depending on the context, the phrase "Scheduled Communication Attempts" or "Scheduled-CAs" may be used as a noun to identify, for example, a list of accounts to be processing accordingly. Similarly, the phrase "Scheduled-CA" may refer to a single account to be processed so as to reserve a scheduled attempt. However, the phrase "Scheduled-CA" may also be used as an adverb, referring to the function of processing data for an account in the corresponding manner (e.g., scheduling a future communication attempt on the CAR 206).

For example, the processing of Scheduled-CA data can be used when a debt collector is required to send a letter on a certain date to an account. If the mailing is required by regulation, then the debt collector will want to ensure that sending the letter on the intended date will not be blocked because of a prior voice/text call made during the week to the debtor prior to sending the letter. Otherwise, sending the letter on the intended date could result in a violation of exceeding an allowable limit of communications to the debtor. Thus, scheduling the CA on the Calendar reserves the opportunity to mail the letter, ensuring the letter can be sent on the required date without being blocked and without causing a violation.

It is possible that a Scheduled-CA query cannot be processed because of prior existing Scheduled-CAs for that week (e.g., there are already 3 reservations for that account for that week). If so, then an exception condition (i.e., reflecting a violation) may be generated and the response to the query may be reported to the originator of the query. Depending on the embodiment, the Scheduled-CA can be reserved up to some defined period of time such as, for example, 30 days in the future. Thus, in an embodiment configured to allow scheduling CAs up to 30 days forward, a reservation for a CA on an account is limited to being no more than 30 days in the future from the current day.

2) Present Communication Attempts

A "Present-CA" reflects an expectation that the account will be contacted in the current or next processing cycle of a communication system. Generally speaking, a processing cycle in various embodiments refers to the cyclical processing of lists by a communication system. For instance, in a call center, the processing cycle may be the daily processing of a calling list to originate calls. While in a postal-based mailing system, the processing cycle may be the generation of letters for mailing each day. Typically, the processing cycle occurs once each day (e.g., during a 24 hour period). In various embodiments, the effect of processing a list of accounts for Present-CAs is that:

1) The CAR 206 is first checked for each account to see if the CA can be made without causing a violation (i.e., determine whether there is an available CA opportunity).
2) If the CA is not allowed, then an exception is recorded and the CAR 206 is not updated to reflect the CA occurred. (In some embodiments, an override indication may exist that allows updating the account.) An exception file may be updated/generated indicating the accounts that could not be contacted.
3) If the CA is allowed, then the CAR 206 is updated to reflect the CA has or is about to be made. Essentially, the Present-CA is converted to a Past-CA in the CAR 206 by the end of that processing cycle.

The Present-CA updating function can be thought of as performing a "check before sending" function. That is, a list of Present-CAs can be checked in various embodiments to ensure a CA can be made to each account before making the communication. Assuming the accounts can be contacted, then the list can be processed by the appropriate CMS. Typically, the processing of a Present-CA list occurs during the current or next processing cycle and this leads to the CMS generating the CAs during the current or next processing cycle.

For example, if the Present-CA list is for voice calls, then the list represents accounts that are expected to be called in the current or next processing cycle (e.g., today or tomorrow). Quite often, a contact center will process a list late in a day for processing the next day. In other cases, the list may be generated in the early hours of the morning, and then processed later that day. In other cases, a list may be generated (e.g., for an email communication) the same day as sent. However, it is possible that not all numbers on the calling list will, in fact, be contacted during that processing cycle. The list may have been too long, or other circumstances may impact the ability to contact the accounts. For instance, if the calling list is to be provided to the List Optimizer 213, then it may be unlikely that the entire list will be processed by a dialer 115 in the next processing cycle. Frequently, it is not until the next processing cycle (i.e., the next day) that a list of the exceptions are identified, and then used to update the CAR.

As for non-voice communications, such as in the case of a mailing list, the communication list represents a list of letters that are to be mailed at the next opportunity. Thus, in various embodiments, one may assumed that every account on the list will be processed (e.g., all letters will be sent out for each account listed) for non-voice communications lists. If this assumption is not correct, then a process flow similar to the voice dialing list may be followed.

Thus, in various embodiments, the distinction between a Scheduled-CA List and a Present-CA List is that the former represents CAs planned for current processing that are expected to occur in the future, whereas the latter are CAs that did (or are about to) occur. Each Present-CA for each account updates the CAR 206 if no violation occurs, and this update automatically converts to a (actual) Past-CA once the current processing cycle passes.

However, with that said, there is a possibility that not all accounts on the Present-CA list given to a CMS will be processed by the CMS (particularly for a voice list) over the current processing cycle. Thus, in some instances, corrections may be required to keep the CAR 206 accurate. For example, the CMS may know which accounts were attempted and which were not. Perhaps not all telephone numbers were manually dialed, or a printer ran out of paper (or broke down) and therefore not all accounts were contacted as originally planned. Therefore, if the CMS failed to make a CA for an account, the CMS flags that account so that the CAR 206 can be updated and kept accurate. This can be accomplished by submitting a correction list to the CAR 206. Depending on the embodiment, the CMS may send this list autonomously to the CAMP, the CAMP may request it from the CMS, or the administrator may manually retrieve the list from the CMS and send the list to the CAMP. Thus, in some instances, processing a Past-CA update function can delete (i.e., to initiate a correction), as well as insert, a CA in the CAR 206.

3) Past Communication Attempts

A "Past-CA" reflects a CA that actually occurred, typically in a prior processing cycle, and thus is used to update the CAR 206 with a past attempt. Such a CA can be thought of as performing an "Update after Sending" function. In other words, the CAR 206 is only updated after the CMS has actually performed the CA and originated a communication.

A risk of using this approach is that an intervening communication may have caused the CA to be in violation. For example, in various embodiments, a common application of a Past-CA account updating function is to reflect CAs that actually occurred, but which may not have been updated in the CAR 206 as having occurred. For example, a CMS may send emails without submission of a Present-CA list, and then after the emails have been sent, a list of Past-CAs is provided to the CAMS to update the CAR 206. It is possible that some of the accounts being updated will result in a violation.

In another example of why this list may be used, a third-party vendor may generate mailings for a debt collector. The vendor receives a list of mailings from the debt collector that the vendor should generate and send. This list is not in any way processed by the CAMS at this point, but represents an existing process used by the debt collector for mailing letters. The vendor sends out the mailings and then provides the debt collector with a confirmation list of the letters that were actually sent. The debt collector then uses the confirmation list to generate a Past-CAs list that is provided to the CAMS. In turn, the CAMS then updates the CAR 206, regardless of whether the letters were allowed or not to be sent or not, because the letters were, in fact, sent. Thus, this may be a useful migration path to allow existing communication systems (i.e., "legacy" communication systems) and legacy processes to be used, even though these existing procedures may allow prohibited communications to occur. This also offers a useful transitional capability to allow the CAR 206 to be kept reasonably current. Because it is expected to be difficult to modify systems which are not presently capable of interfacing with the CAMs, this approach is particularly advantageous for allowing legacy equipment to be managed by a CAMS.

Continuing with the above example, the debt collector could have instead taken the mailing list, and prior to giving it to the third party vendor, submitted the mailing list as a Present-CAs list to the CAMS. In turn, the CAMS would identify the accounts for which mailings are authorized and update the CAR 206 accordingly. The debt collector would then update the mailing list to remove the accounts prohibited from receiving a mailing and then provide the mailing list to the third party vendor so that the vendor only receives the remaining authorized accounts. Such a process would result in the vendor sending letters to accounts without causing any violations and the CAR 206 would be current in accurately reflecting the accounts that were contacted via the mailing.

Thus, another common application of a Past-CA account updating function is to correct the CAR 206 to remove a CA that was on a Present-CA list, but did not occur as anticipated. Recall that if the account is authorized to be contacted, the CAR 206 is updated to reflect a CA was in fact made for the account based on the assumption the CA will occur (or has occurred) in the current or next processing cycle. However, if the CA did not actually occur for the account for some reason, then a Past-CA list can be submitted for processing to update the CAR 206 to reflect the CA was never made. Essentially, the Past-CA account updating function can be thought of as incrementing the CAR 206 by a negative value (or simply decrement the value) to remove the CA indication. For this to occur in particular embodiments, the CA indicated in the Past-CA list must match an existing Present-CA indication for the account (e.g., it must indicate a CA with the same channel type and be directed to the same account/debtor). Further, when decrementing a CA, the date should be indicated and there should be an indication of a CA on that date in the CAR. Otherwise, an exception condition arises.

Figure 5A:
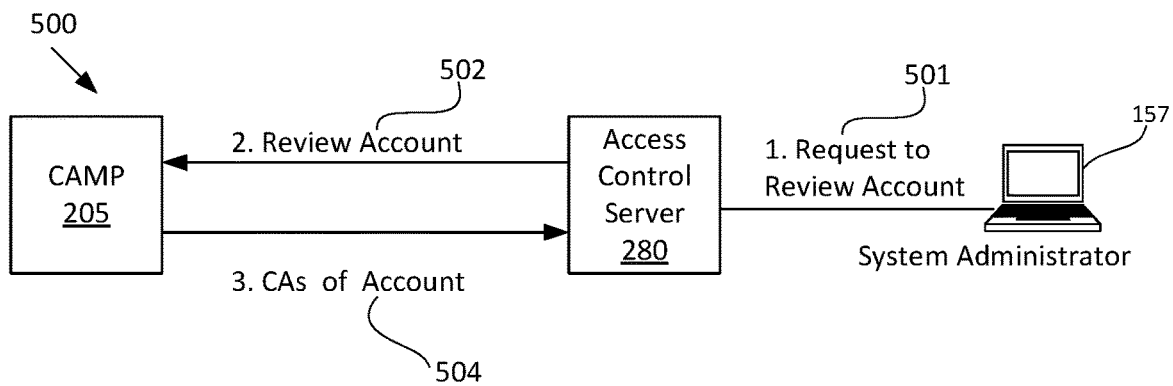
FIGS. 5A-5C illustrate various embodiments of message flows involving the CAMS and other components.

FIG. 5A—Processing an Account CA Review

In various embodiments, a simple account related function that can be performed is when the CAMP 205 receives a basic query to read the registered CAs for an account(s) for purposes of reviewing that account. Such a function involves the CAMP 205 receiving a query message identifying the debtor/account and a time period such as, for example, a beginning and end date or a date identifying a specific day or week. In some instances, the request may also limit the information to a specific channel type and/or address.

Here, the information returned form the CAMP 205 may include a series of CA instances that may indicate the date, time, channel type, and/or outcome (if appropriate) of the CA for the indicated account. In some embodiments, the information may be returned using a CA tuple, wherein each tuple represents a CA instance and its status (i.e., whether it was a violation or not). While in other embodiments, the recipient of the query may apply further information to determine the status of a CA.

Depending on the circumstances, the request may be a query for a single account or for a list of accounts. For instance, in FIG. 5A, the FIG. 500 shows that a system administrator may use a computer 157 to request a review of a particular account to an ACS 280 in step 1 501. The ACS 280, in response, is shown as originating a query for a single account from the request received from the system administrator in step 2 502. In this instance, the ACS 280 provides the system administrator with a suitable GUI for collecting the appropriate information and formatting the request in the appropriate protocol. The ACS 280 then submits the request as a query to the CAMP 205, which in turn retrieves the appropriate information from the CAR 206 and returns the information to the ACS 280 in step 3 504. In various embodiments, the ACS 280 may format the returned information to generate a suitable human readable icon, such as the Calendar shown in FIG. 4. Thus, the process flow in FIG. 5A is typical of a use case where an administrator desires to verify, inspect, or review a particular account. For example, the administrator may be addressing an instance where a potential violation occurred, and desires to review CAs for a particular account to understand what occurred.

In other instances, the request may not come from an administrator, but from some other contact center component. For example, a report generator system may use the read query to obtain information about the CA attempts made to various accounts for the current week. Here, the report generator system may retrieve and analyze the information to generate appropriate reports. Thus, the use of a report generator system can "offload" the report generation functionality from the core CAMP 205 processing, although in other embodiments the report generation could be integrated into the CAMP 205. However, the use of a report generator system may be desirable to develop custom reports without having to define such capabilities in the CAMP 205.

Figure 5B:
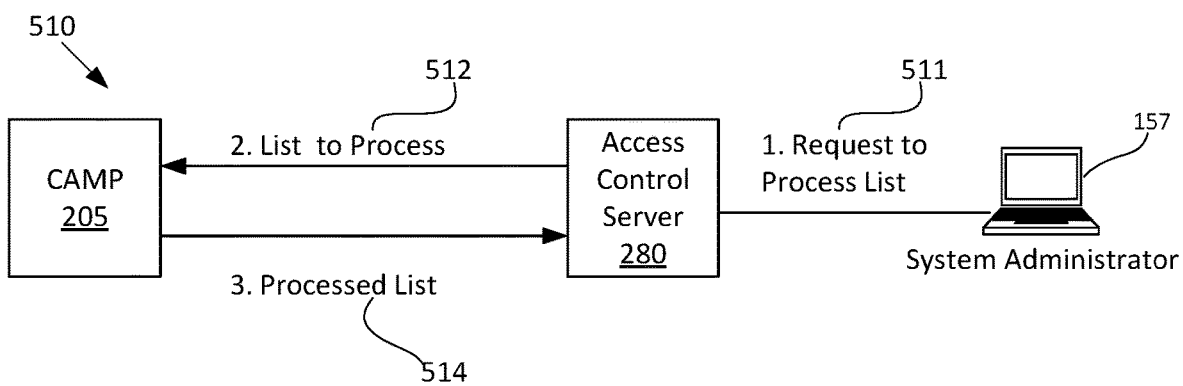

FIG. 5B—Administrator Submitting List for Processing

FIG. 5B shows an architecture 510 where a system administrator's computer 157 is submitting a list for processing via an ACS 280 to the CAMP 205 and receiving a response. Accordingly, in various embodiments, such a process flow has a wide variety of applications such as, for instance, where manual intervention is required for a CMS system that is not yet modified to communicate with the CAMS.

The high level process flow shown in FIG. 5B involves the system administrator requesting in step 1 511, the submission of a list via the ACS 280 to the CAMP 205 in step 2 512, for various reasons, and the CAMP 205 returning information to the administrator via the ACS 280 in step 3 514. One relatively simple application for performing this process flow is when an administrator needs to update the CAR 206 for a CA that actually occurred. For example, the administrator may submit a Past-CA list to the CAMP 205 for processing via the ACS 280. Here, the list indicates past CAs that have been initiated by some CMS. Hence, the CAMP 205 updates the CAR 206 regardless of whether or not a communication that was performed resulted in a violation, since in fact, the communication did occur.

As described elsewhere, this process flow can be useful for when a legacy CMS, not capable of communicating with the CAMP 205, originates CAs to accounts on a stand-alone basis. Here, the CAMP needs to be informed of the CAs performed by the legacy CMS, but since the legacy CMS is not capable of communicating with the CAMP, an administrator may take the legacy list and submit it to the CAMP via the ACS 280 to update the CAR 206. This can be described as a "manual work-around process." Frequently, the format of the list may have to be processed, or obtained from a CMS or other external system, for ingestion into the ACS and then after formatting, submitted to the CAMP.

In addition, another application of this process flow may involve the system administrator submitting a Present-CA list in an "advisory query mode" to "scrub" the list to identify which accounts can be safely contacted, but without actually updating the CAR 206. The administrator may process the results to eliminate those accounts that cannot be safely contacted, and send the resulting list to a CMS to then contact those accounts that can be contacted. Depending on the embodiment, the CAMP 205 may return the original list with only those accounts authorized, only those accounts not authorized, or both. This allows the administrator to prepare and check a list, before sending that list to the CMS to originate communications.

Still, another application of this process flow may involve the CMS reporting failures and/or successes from processing the accounts in a list, and the failures and/or successes are then submitted by the system administrator as a manual work-around by submitting a Past-CAs list to the CAMP 205 to update the appropriate accounts. Thus, the process flow shown in FIG. 5B could be used to ascertain which accounts on a list can be contacted so that those accounts could be sent to a legacy CMS to make CAs for the accounts, and then the same process flow could be used to update the CAR 206 to reflect that the communications actually did occur.

In other instances, the system administrator could submit a Present-CAs List to the CAMP 205, but not in an "advisory query mode," which results in the CAMP 205 updating the CAR 206 for those accounts that are allowed to be contacted and reporting back those accounts that cannot be contacted because doing so would cause a violation. The administrator could then submit the list of allowable accounts to a legacy CMS that then make CAs for the accounts. In these instances, if all the CAs occurred for the allowable accounts, then no follow up correction is required. However, if the CMS was not able to make all the CAs for the allowable accounts, then a Past-CAs list could be submitted to the CAMP 205 to update the CAR 206 and maintain its accuracy. This is another example of a manual work-around process.

Lastly, another application of the process flow should in FIG. 5B may involve a system administrator reserving future CAs for one or more accounts. Thus, in these instances, the administrator may submit a list of Scheduled-CAs to the CAMP 205 to ensure the CAR 206 reflects the scheduled instances of CAs for the identified accounts in the list.

Figure 5C:
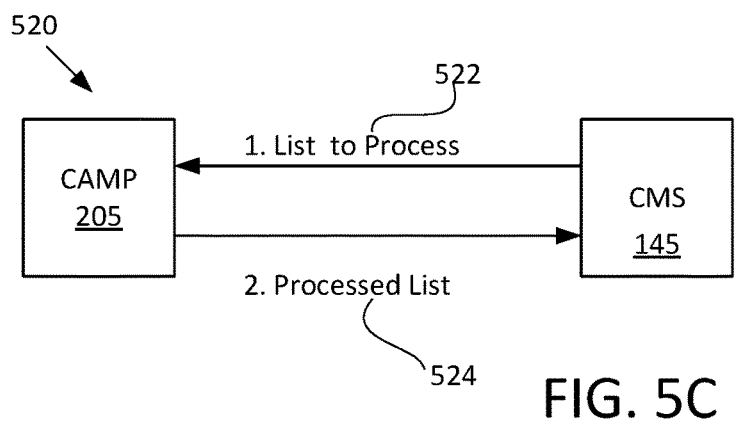

FIG. 5C—Processing a Past-CAs List

Accordingly, in various embodiments, the combination of the ACS 280 and system administrator can be replaced with a system component in a contact center. For instance, in FIG. 5C, the architecture 520 shows the ACS 280 and system administrator has been replaced with a CMS 145 and here, the process flow represents how the CMS 145 can interact with the CAMP 205 (as opposed to the administrator). According to various embodiments, the process flow shown in FIG. 5C requires the CMS to be configured to interact with the CAMP 205. Thus, the CMS is not a legacy system. Furthermore, the CMS may be modified in particular embodiments to receive a list to generate CAs from a legacy CMS and submit the list to the CAMP 205.

Thus, the high level process flow shown in FIG. 5C involves the submission of a list via the CMS 145 to the CAMP 205 in step 1 522, for various reasons, and the CAMP 205 returning information to the CMS 145 in step 2 524. For example, the CMS may be a letter generating system in particular embodiments that receives a list of accounts to generate letters. Once the letter generating system has originated the letters, the system may be configured to then submit a list of the accounts the letters were generated for to the CAMP 205 as a Past-CAs list to ensure that the CAR 206 reflects the CAs. In other embodiments, the letter generating system may first submit the list as a Present-CAs list to the CAMP 205 prior to generating and mailing the letters. In this case, if the letter generating system does not generate and send all of the letters (e.g., due to a malfunction), then the letter generating system may submit a Past-CAs file to the CAMP 205 identifying the letters that were not sent so that the CAR 206 can be updated accordingly.

Figure 6:
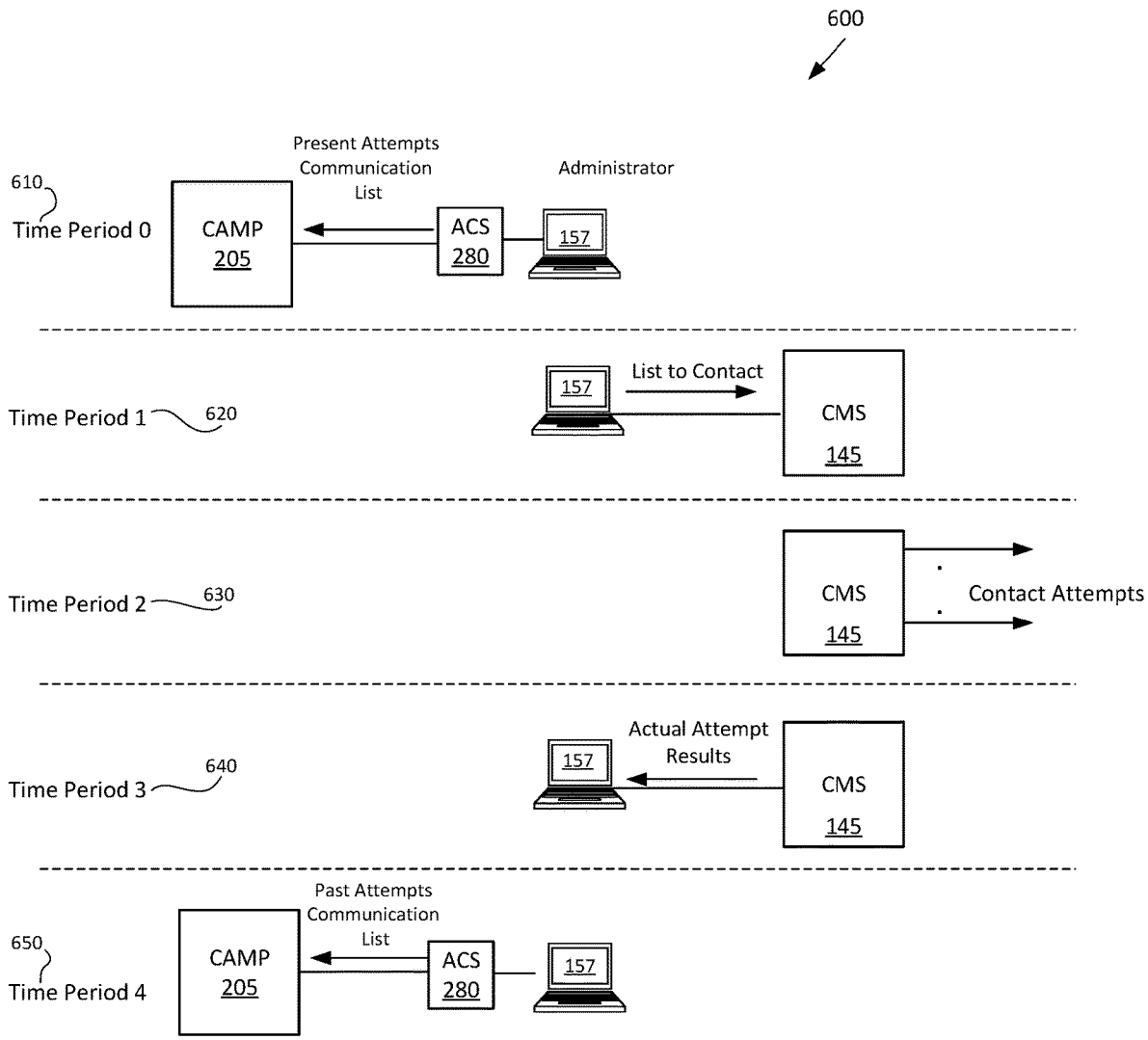
FIG. 6 illustrates one embodiment of a process flow for interacting with the CAMP.

FIG. 6—"True-Up" Example

Depending on the circumstances, the above-discussed examples may necessitate a need to perform a "true-up." A "true-up" refers to a post-communication reconciliation of CAs. For instance, the above-discussed examples may be performed to reconcile CAs that were intended to occur in a given list with the CAs that actually occurred for that list. The "true-up" process is shown in greater detail in FIG. 6. This process 600 may begin as shown in time period 0 610 where the administrator via the ACS 280 sends a Present-CAs list to the CAMP 205 indicating the accounts that are going to be immediately contacted. Next, in time period 1 620, the administrator's computer 157 (or some other system) sends the list of accounts that the CMS 145 is to contact.

In time period 2 630, the CMS makes the CAs, and the CMS presumably tracks which accounts on the list the CMS has successfully attempted a communication. There are various reasons and situations that can occur where the entire list of accounts is not processed. For example, a calling list may be submitted to a dialer, but only a portion of the list is processed during the processing cycle. A list of email addresses may be sent to an email system, but several emails may have been returned as "undeliverable" or a temporary network failure may prevent sending emails for all of the addresses on the list. Or, a mail processing system may receive a list of addresses to generate letters for, but ink/paper was depleted in the printer before all the letters were sent for each address on the list. The time taken to initiate the CAs for the various accounts can vary based on factors such as the number of accounts on the list, the channel type, facilities deployed, etc. For example, a large number of emails may be able to be sent in a very short manner, whereas the same number of calls may typically take more time or more communication facilities to originate.

In time period 3 640, a list of the actual attempt results is returned to the administrator. Depending on the embodiment, the list may be generated by the CMS or by the administrator from records/logs maintained by the CMS or other systems. In some instances, the administrator may format the list of results so as to create a Past-CAs list that is sent to the CAMP 205 in time period 4 650. Once the CAMP 205 processes the Past-CAs list, those accounts that a CA was supposed to have been made, but was not, are updated by the CAMP 205 in the CAR 206. This "true-up" allows the CAMP 205 to accurately maintain correct CA information for each account in the CAR 206.

Although the example shown in FIG. 6 illustrates the administrator sending the Past-CAs file to the CAMP 205, in other embodiments the CMS may send the Past-CAs list directly to the CAMP 205. Doing so can avoid manual intervention of the administrator.

Format of Past-CAs List

Depending on the embodiment, the format of the Past-CAs list may depend on whether a CA value for an account is being incremented or decremented. For example, turning to FIG. 6, the processing of the Present-CAs list in time period 0 610 updated each of the corresponding accounts, indicating a CA has occurred (even though they have not, in fact, actually occurred.) When the "true-up" occurs in time period 4 650, the Past-CAs list comprises those accounts which were supposed to have a CA made for them, but which did not. Since these accounts were indicated as having been contacted in the CAMS based on being on the Present-CAs list, the indication of the CA in the CAMS should be decremented.

Accordingly, in various embodiments, the Past-CAs lists can include those accounts that a CA was not made and thus, the CA in the list reflects a negative value to decrement or remove a CA (e.g., a "−1") from the CAR 206. This essentially decrements the number of CAs indicated for those accounts that incorrectly reflect a CA was made. Thus, in particular embodiments, the Past-CAs list is a "negative list" to update the indicated accounts. However, the number of CA's indicated for an account cannot be negative in some embodiments. Thus, if the number of CAs is zero during a processing cycle, decrementing the value for that processing cycle is not allowed. Doing so represents an error condition.

In other embodiments, the CAMS may process a list that does not reflect CAs were made for the accounts. For example, if an Advisory Query of a list was submitted in time period 0, then none of the indicated accounts in the list would be updated in the CAR 206. However, after CAs were made for all the accounts in the list, each of the accounts would be identified in time period 4 using a Past-CAs list as a "positive list" reflecting a positive value (e.g., a "+1") for each account. Such a list would increment the CAs for each account to true-up the CAMS in light of what actually occurred.

Accordingly, in various embodiments, it is possible to have a completely positive value Past-CAs list, a completely negative value Past-CAs list, or a mixed value Past-CAs List. A positive value is used when the account was not updated prior to originating the CA. A negative value is used when the account was updated prior to attempting to originate the CA but the CA did not occur. A list of mixed values can be used to reflect both situations (or can be used to update the CAMS after two separate updating attempts previously occurred).

Figure 7:
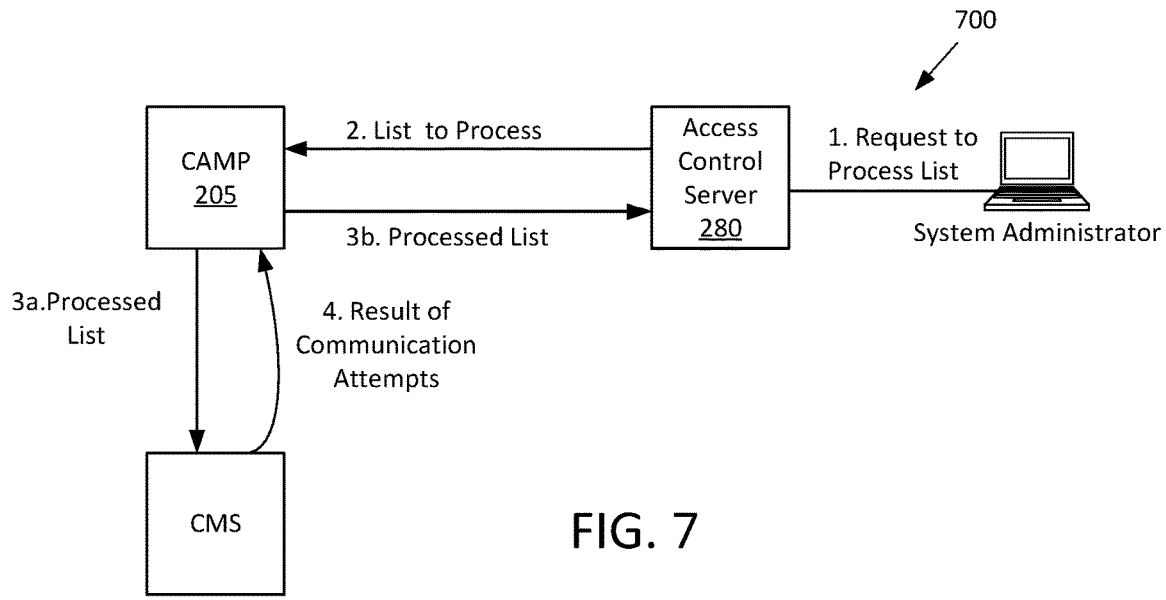
FIGS. 7-11 illustrate different embodiments of process flows for processing a query.

FIG. 7—Redirection of CAMP Output Comprising Processed Lists

As mentioned, the response or output of a query is normally sent by the CAMS to the originating entity of the query. However, the output can also be sent or copied to another or different entity in various embodiments. FIG. 7 shows a process flow 700 used when an originating source, such as the system administrator, submits a list for processing, where the submission may indicate directly or indirectly that the output of the processed list is to be provided not only to the administrator, but also to a another entity such as a CMS that is to originate the communications. Such processing can avoid the system administrator from having to receive the resulting list and then turning around and sending it to the intended CMS.

The process begins with the administrator using a computer 157 to request a list be sent in step 1 710 via the ACS 280 to the CAMP 205 in step 2 720. The CAMP 205 then processes the list, and the output is shown in steps 3A 730 and 3B 740 as being provided to both the administrator via the ACS 280 and the CMS 145. No particular order is implied or required by the labeling of the steps as 3A 730 and 3B 740. Since the CMS has a copy of the accounts authorized to be contacted, there may not be any need for the system administrator to receive a copy. Thus, the CAMS may merely provide the output to the indicated CMS. Accordingly, in various embodiments, the output may be provided to one entity and then another with minimal delay.

Once the CMS has made the CAs for the accounts on the processed list, the CMS provides the results of the CAs to the CAMP in Step 4 750. For instance, such a result may be provided when the CMS is a voice dialing system, such as a predictive dialer or a manual dialing system. In this instance, the calling list provided to the CMS for call origination may not be processed in its entirety by the CMS. That is, it is possible that some call records on the calling list never resulted in call originations (e.g., CAs). The CMS provides information to the CAMP 205 indicating which attempts actually occurred (or did not occur) via a Past-CAs list. This ensures the CAMS remains accurate.

In addition, in particular embodiments, the CAMP 205 may need to know the outcome of the CA for each account. For instance, the CAMP 205 may need to know the outcome of the CA for each account when voice calls are placed to the accounts so that if a right party contact occurred on a voice call for a particular account, then the CAMS can set the Confirmed Consumer Contact ("CCC") flag for that account. Such may also be the case with respect to non-voice communications where the CAMP 205 may also set a CCC flag for an account involving a non-voice communication (e.g., a CCC for email, fax, mail, text, etc.) when a present CA is recorded for an account or when a confirmation is received that a CA actually occurred for the account.

In various embodiments, when the CAMP 205 sends a copy of the response output to an entity other than the requesting entity, the structure of the response may be slightly modified. For example, the response to the originating entity may have one protocol structure, while the protocol structure to the copied entity, e.g., a CMS, may be slightly different. This may be because the entity originating the query is expecting a particular structure in the response, while the entity receiving the copy is not. Thus, a variety of protocols may be employed in order to transfer the information to the various entities receiving a copy. For example, the copied entity e.g., a CMS, may be provided with a URL or other address by the CAMP 205 from which the CMS retrieves the information from the CAMP. In other embodiments, a file transfer protocol could be used to transfer a response to one entity, but not the other.

Figure 8:
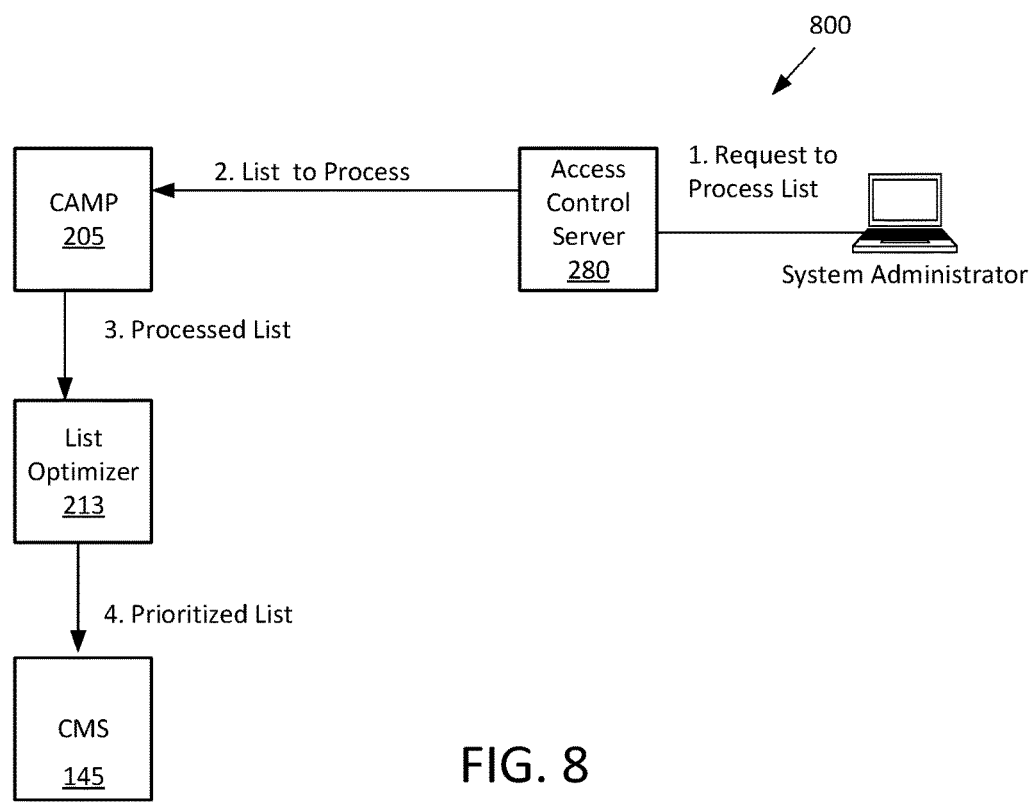

FIG. 8—Processing of CAMS Output by Non-CMS Entities

FIG. 8 is intended to show, in part, a modification of the process flow shown in FIG. 7. Again, the process begins with the administrator using a computer 157 to request a list be sent in step 1 810 via the ACS 280 to the CAMP 205 in step 2 820. However, in this process flow 800, the CAMP 205 does not provide a copy of the processed list of accounts to the administrator, but only to a third entity in step 3 830, which in this case is not a CMS. Here, the example of the non-CMS entity is a List Optimizer 213 that may be a system such as CallTech™ or OnQ™ available from the Noble Systems Corporation. The CMS may provide the output to the indicated entity, even though the CAMP 205 may not necessarily know the functions performed by this entity (e.g., whether it is a specific type of CMS or some other system). However, in many instances, the CAMP 205 not knowing the function of the indicated entity is not material to the operation of the CAMP 205.

In this particular architecture, the List Optimizer 213 may prioritize the list of accounts on an hourly basis, and send the appropriate hourly version of the prioritized list to the CMS for each hour in step 4 840. The priority reflects the order in which the CAs should be made to the accounts. This optimization increases the likelihood that a particular contact will be successful. Recall that a communication attempt is counted, regardless of whether the attempt reaches the right party or not. Thus, to maximize the effectiveness of communication attempts, it is desirable to make such attempts at times in which the right party is likely to be reached. Furthermore, the List Optimizer 213 may also receive contact disposition data from the CMS, and provide feedback to the CAMP 205 in the form of CA results (in lieu of the CMS providing such feedback).

Figure 9:
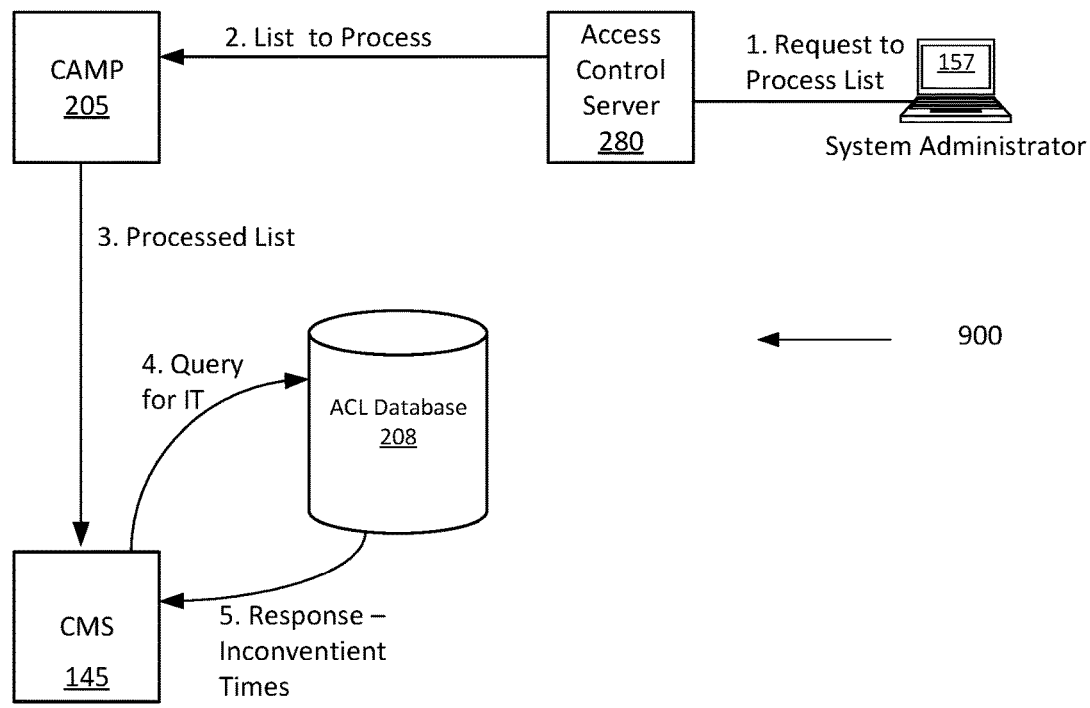

FIG. 9—Accounting for Inconvenient Times

In various embodiments, a CMS may be responsible for originating CAs during a processing cycle while taking into account any "inconvenient times" that may be associated with an account holder. "Inconvenient times" ("ITs") refer to any account holder communication preferences that modify when communications can be sent to the account holder during a day. For instance, a debtor may indicate that he prefers to receive voice calls no earlier than 1:00 p.m. and not between the hours of 5 and 6 p.m. In many instances, failure to adhere to these times is considered a minor violation of a regulation or a policy of the enterprise.

In particular embodiments, a CMS may be made aware of the existence of such preferences via a flag that is included in the account information in the contact list provided to the CMS. In some instances when the flag has been set identifying the existence of such preferences, the CMS is expected to query a database such as, e.g., the ACL database 208, to determine how to schedule the communication. In some embodiments, the CAMP 205, when processing the list, may insert the flag as appropriate, before sending the list to the CMS.

For operational purposes, it is preferred in various embodiments that the CMS receive the processed list early enough in the processing cycle so that timely access to applicable ITs can be made by the CMS to schedule the CAs. Providing the CMS with access to any applicable ITs early in the processing cycle for all relevant accounts before originating communications allows the CMS to develop a schedule that takes into consideration all the accounts that may have ITs limitations. However with that said, in particular embodiments, the CMS may instead query the IT information in real-time, although this may lead to the CMS delaying the communication. In addition, in some embodiments, another component besides the CMS, such as a List Optimizer, may perform the query and use the IT information to prioritize and order the accounts to identify when the CAs should occur. Again, such practice may allow a complete schedule to be developed for the CMS prior to the CMS attempting to contact the accounts.

FIG. 9 provides an embodiment of a process flow 900 that takes ITs into consideration. The process begins in step 1 910 with the system administrator using a computer 157 to request a list to be processed. Next, the ACS 280 provides the list to the CAMS in step 2 920. In this example, the list is provided by the administrator via the ACS 280 to the CAMP 205. This could be, e.g., a Present-CAs list. After processing the query to determine which accounts are authorized to receive a CA, the CAMP 205 sends the authorized accounts to the CMS in step 3 930. The CMS then initiates a query to the ACL database 208 in step 4 940 to ascertain additional ITs details regarding the accounts indicated in the list as having ITs limitations. The ACL database 208 responds with the details in step 5 950. Depending the embodiment, the query in step 4 940 may be initiated for all accounts having limitations before any of the accounts are processed for originating a CA, or the query in step 4 940 may be initiated for each account as encountered. In other embodiments, a query may be made for a fixed number of accounts (e.g., 16, 32, 64, 128, or 256 accounts to be processed).

Generally speaking, in various embodiments, it is not within the functionality of the CAMP 205 to access the ACL database 208 to development an optimal schedule for the CMS. However, it is possible that another component, such as a List Optimizer 213 (see, e.g., FIG. 8), may be involved in particular embodiments that receives the list and accesses the ACL database 208 to develop an optimized schedule of the accounts for the CMS to use.

Figure 10:
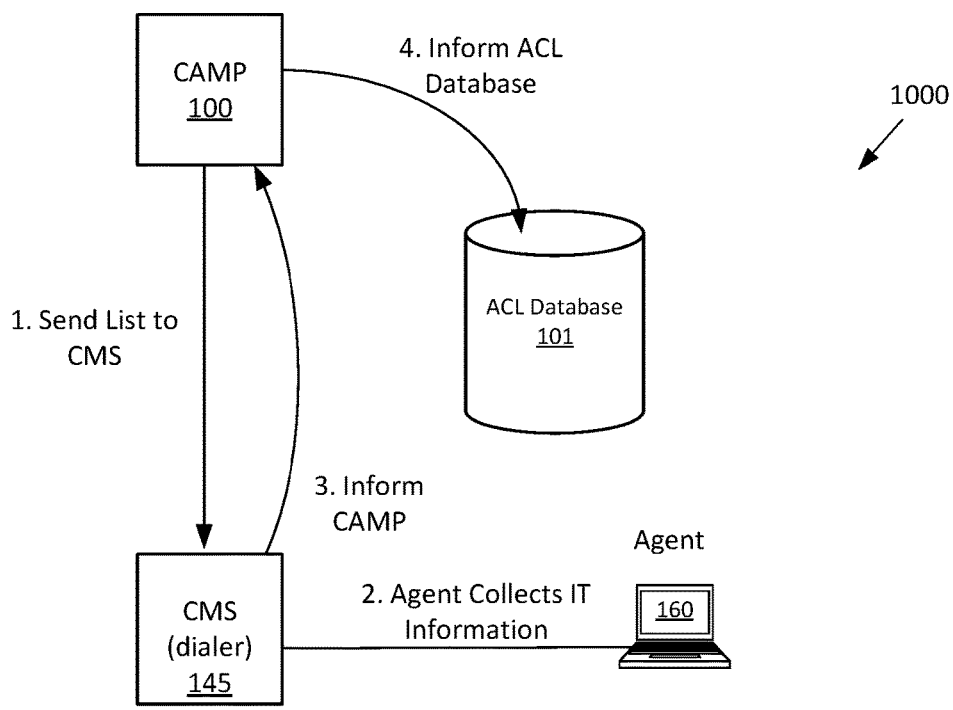

FIG. 10—Population of Inconvenient Times Info

FIG. 10 illustrates a process flow 1000 for populating ITs information into the CAMS according to various embodiments. Depending on the embodiment, the ITs information may be obtained in various ways. For instance, in one embodiment, the ITs information may be obtained from documentation obtained from a prior debt collector when the debt was transferred to the current debt collector. While in another embodiment, the ITs information may be obtained from the debtor directly during a phone call between the debtor and an agent, where the debtor verbally indicates certain inconvenient times. The information may be communicated using other channels and methods, including different channels from which the IT pertains to. Depending on the embodiment, the agent may then enter this information directly in the ACL database 208 or provide it to the CMS (which in this example may be a predictive dialer or a manual wireless number dialing system). The CMS then sends the information to the CAMP 205 and the CAMP 205 updates the ACL database 208 to reflect the information. The CAMS may be notified so that the account record can be flagged as having associated ITs information that can be done in real-time or in a batch-mode at the end of the day.

The process illustrated in FIG. 10 begins with the CAMP 205 sending a list to be processed to the CMS in step 1 1010. A particular account found in the list is not flagged as having any ITs information. However, the CMS processes the account and originates a voice call for the account in which the called party speaks with an agent 160 and provides ITs information during the call. At the end of the call, the agent dispositions the call indicating the appropriate ITs in step 2 1020. In turn, the CMS 145 (which may be a dialer) informs the CAMP 205 of the ITs in step 3 1030. The CAMP 205 then stores the ITs information in the ACL database 208 so that the account is identified properly as having ITs associated with the account in step 4 1040. Thus, the next time the CAMP provides a list to the CMS, that account will have a flag indicating that ITs information exists for this account.

Figure 11:
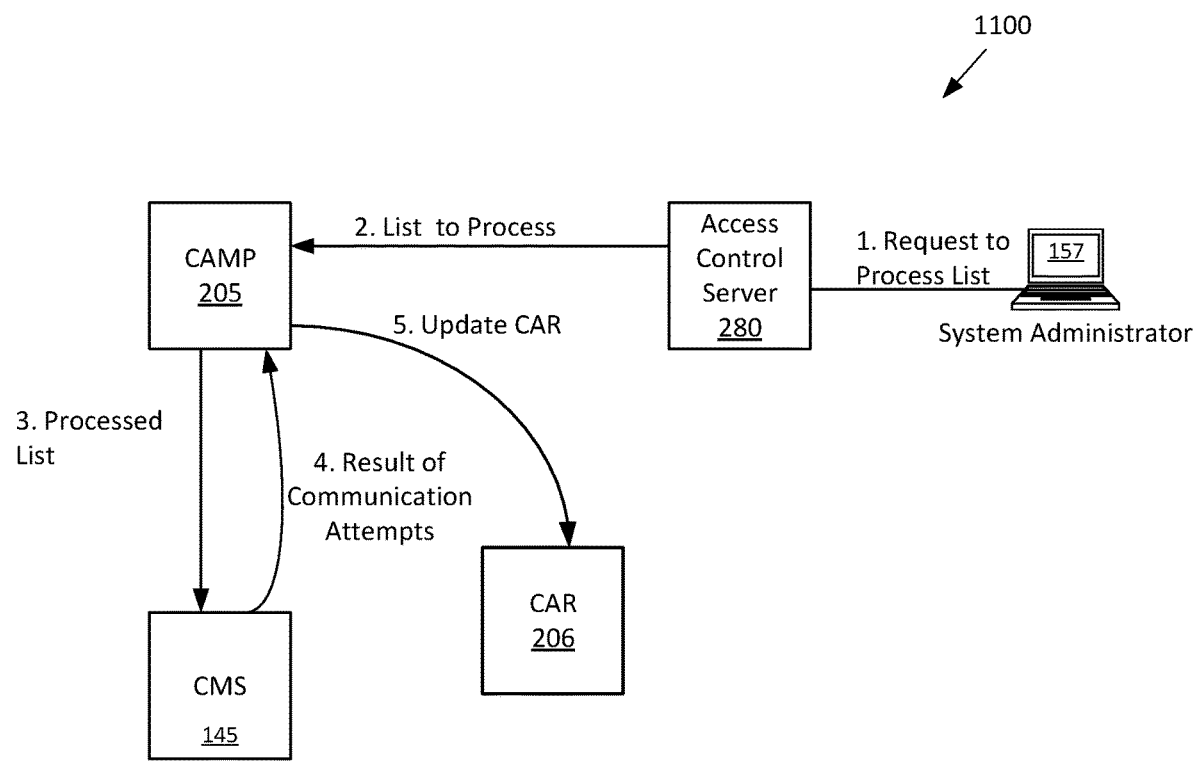

FIG. 11—Providing Communication Attempts Results Back to the CAMS

The CMS processes a contact list for the purpose of originating communications to each contact listed. For various reasons, the CMS may have to provide feedback to the CAMS as to the outcome of this processing. For example, in the case of a voice calling list, the CMS may not have processed each account in the calling list. Or, a CA resulted in a right party connect, which means that confirmed consumer contact (CCC) has been obtained for that account. If not otherwise noted, the CAR must be updated to reflect that contact with the debtor has been accomplished. Thus, in various embodiments, the CAMS needs to know the proper status of whether an account holder has been contacted, and if so, the CMS needs to inform the CAMS when this occurs.

One embodiment 1100 of this process flow is shown in FIG. 11, in which an administrator, via the ACS 280 in step 1 1110, submits a list for processing to the CAMP 205 in step 2 1120. The query includes an indication to send the results back not only to the administrator, but also to an indicated CMS 145. Thus, the CAMP 205 generates a response comprising the processed list to both the ACS 280 and the CMS 145 in step 3 1130. For sake of illustration, assume that the query is to process a list of Present-CA accounts, and the CMS is configured to generate the CAs to those accounts in response to receiving the processed list from the CAMP 205.

Here, the CMS may have encountered a number of CAs which resulted in right party contacts, e.g., the account holders were reached, which means that a confirmed consumer contact has occurred. In addition, the agents may have obtained various communication preferences from the account holders (e.g., inconvenient times/channels information). This information comprising the results of the communications is then provided as feedback to the CAMP 205 in step 4 1140. In this way, the CAMP 205 is kept current as to the CCC status, whether the attempts actually occurred, inconvenient times information, etc.

The CAMP 205 then uses that feedback information to update the CAR 206 in step 5 1150 for each account with respect to whether the attempt did/did not occur, whether there is a change in the CCC status, and whether any other communications preference information is to be updated in the ACL database 208 for the account. In this manner, the CAMS can ensure subsequent processing of a query involving the accounts is performed in an accurate manner.

The CMS's CA results may be conveyed to the CAMP 205 in different ways and at different times according to various embodiments. For instance, in one embodiment, the CMS provides the update in step 4 1140 for each account record processed in the list. While in another embodiment, the CMS provides the update in step 4 1140 in real-time to the CAMP 205 every time a fixed number of accounts or records are processed. For example, an update could be sent for every 32 or 128 records processed. While still in another embodiment, the CMS provides the update in step 4 1140 to the CAMP 205 on a periodic time interval, such as every minute or five minutes. Finally, it is possible that the CMS may send a single update (e.g., a file) in step 4 1140 comprising the results at the end of the processing cycle or after the CMS completes processing of the list. The results may include all accounts in the list with a corresponding status, only those accounts in the list contacted, or only those accounts from which an unexpected outcome occurred. Regardless of how the CMS provides its updates, as along as the updates are provided in various embodiments, the CAMP 205 is able maintain an accurate and current status for the accounts.

Processing Flows

Figure 12:
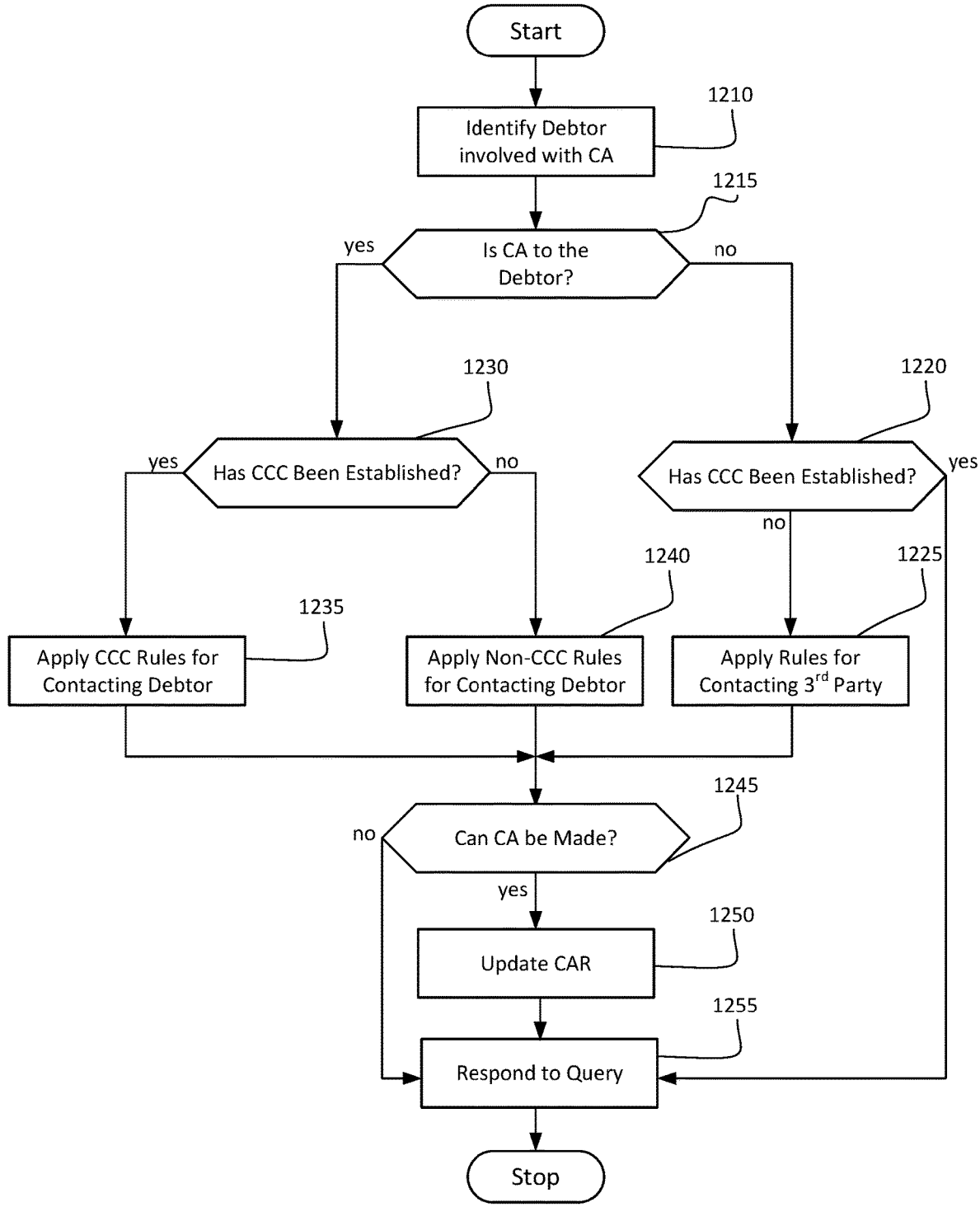
FIG. 12 illustrates one embodiment of a process flow for processing a query in the CAMP based on whether prior contact has occurred.

FIG. 12—Determining Context of a CA—Debtor or Third Party?

Many of the above-discussed process flows illustrate the CAMS processing a query to update an account that implicitly involves a CA for contacting a debtor by using an address of the respective communication channel presumed to be associated with the debtor. However, in many instances, the CAs managed by the CAMS do not necessarily involve communications directly to debtors. For instance, a CA may be directed to a targeted party who is a third party and is not the account holder or debtor. Further, a CA may be directed to an address that is not known to be associated with a debtor. In a debt collection context, it is common to service an account by first calling a likely associate of the debtor to ascertain the whereabouts of the debtor. Therefore, although this communication is in conjunction with servicing an account of a debtor, the communication is not made with respect to contacting the debtor directly. Thus, various embodiments of the invention involve invoking the proper procedures depending on whether the CA is directed to the debtor himself, or to a third party who may provide the whereabouts of the debtor.

One embodiment of a process flow performed by the CAMS for ascertaining which rules to use for a particular query received by the CAMS is shown in FIG. 12. Turning to FIG. 12, the process begins with the CAMP 205 first determining a debtor (or a debtor's account) associated with a CA identified in the query in operation 1210. Next, the CAMP 205 determines whether the CA is directed to the debtor personally in operation 1215. In many instances, the CAMS receives a query that pertains to a CA that is directed to contacting the debtor personally. However, in some instances, the CAMS may receive a query that pertains to a CA that is not directed to the account holder (the debtor) but instead is directed to a targeted individual who is a third party. For example, the CA may be directed to a targeted individual who may have a potential relationship with the debtor and who is to be contacted to attempt to obtain information about the whereabouts of a debtor. Thus, even though the communication is not directed to the debtor, it does (indirectly) relate to the debtor.

Therefore, if the CA is not directed to the debtor, then the CAMP 205 determines whether the "confirmed consumer contact" ("CCC") has been established with the debtor in operation 1220. If so, then there is no need to contact the third party because the CCC has been established. Therefore, the CAMP 205 "blocks" the CA by responding to the query in operation 1255 that the CA cannot be made (because it would result in a violation). However, if the CCC has not been established for the debtor in operation 1220, then the CAMP 205 uses the appropriate contact rules governing the number of CAs for a third party in operation 1225. Accordingly, under certain government regulations, a third party may not be contacted more than 6 times per week across all channels, and may not be contacted more than 3 times per week on one specific channel. Other regulations or internal policies may have different limits as to these values.

Returning to operation 1215, if the CA is, instead, known to be directed to the debtor, then the CAMP 205 again determines whether the debtor has been contacted previously (i.e., the CCC status indicates the debtor has been contacted) in operation 1230. If the CCC status indicates the debtor has not been contacted, then the CAMP 205 applies the appropriate non-CCC status contact rules in operation 1240. For instance, under various regulations, contacts to a debtor are limited to no more than 6 per week for all channel types, and no more than 3 per week for a single channel type. On the other hand, if the CCC status indicates the debtor has been contacted, then the CAMP 205 applies the appropriate CCC status contact rules in operation 1235. Under various regulations, the debtor may be contacted no more than 3 times per week for all channel types, and no more than 2 times per week for a single channel.

Once the CAMP has identified the appropriate contact rules, the CAMP 205 applies the appropriate rules to determine whether the CA is authorized or not to be made in Operation 1245. This depends on the number of attempts indicated in the CAR for the account for that week. If contact is allowed, then the CAMP 205 updates the CAR 206 to reflect the CA in Operation 1250. In addition, the CAMP 205 responds to the query indicating the CA can be made in Operation 1255. As evident, there are typically at least three separate sets of contact rules that may exists, depending on whether the CA is for a third party when a debtor has not been contacted previously, a debtor that has not been contacted previously, or for a debtor that can been contacted previously.

Determination of CCC Status

The CCC status indicates whether the debtor has been successfully contacted for debt collection purposes and if so, indicates how frequently a CA may be made to the debtor. If the CCC status has been established for a debtor, then presumably no further CAs should be made to a third party to attempt to locate the whereabouts of the debtor. Further, once the CCC status is established for a debtor, the number of allowable CAs per week to the debtor may be reduced.

Accordingly, in particular instances, CCC is achieved for a debtor when a right party contact has been established with the debtor via a voice call. For example, establishing CCC for a debtor may require an agent confirming with an answering party of a voice call that he or she is the debtor. Such acknowledgement may be sufficient for a debt collector to establish that the telephone number is indeed associated with a debtor and can be used to contact the debtor in the future. In other instances, CCC may be obtained via other channel types, such as an email, text, or letter, if a confirmatory response is received.

In various embodiments, a CCC status indicator may apply to each contact channel type. For example, a street address may have a CCC status establishing the street address has been confirmed associated with a debtor, but a telephone number listed for that same debtor may not have a CCC status because the telephone number has not yet been established as associated with the debtor. In particular embodiments, an overall CCC status may be defined by processing the status of the various channel types. That is, the overall CCC status for a debtor may be established only once all the listed channel types are known to be current and accurate for the debtor. In other embodiments, the overall CCC status may be established if at least one address for a channel type is known to be current. In other embodiments, the overall CCC may be limited for a particular subset of channel types.

In some instances, the CCC status established for a debtor may be 'lost' if the address used for a channel type is later found to be obsolete. For example, a cellular or landline telephone number that was previously established as connected to a debtor may be used to originate a telephone call to the debtor and result in the call reaching an announcement informing the contact center that the number has been changed, or is no longer in service. Or, the person answering the call may inform the agent that the number is a re-assigned number and is no longer associated with the debtor. In another example, a query to a third party service provider for address verification may indicate current contact address information previously confirmed as associated with a debtor is now obsolete. Any of these situations may cause the CCC status for the debtor to be altered to reflect that CCC is not established for the debtor. In addition, any change to the CCC status of a debtor should further note the information and basis as to why the CCC status was "lost" or "reset" for the debtor. The CCC status can be manually updated by an administrator using the concepts and techniques disclosed herein.

In situations where a telephone number is reported as obsolete to the CAMS, the CAMS in various embodiments may return an indication in a subsequent query that the number for the debtor is no longer current and deny authorization to call that number. Similarly, a postal address that is found to be obsolete (e.g., via returned mail, indicating the addressee is unknown) should be reported as such to the CAMS. Similar procedures may be defined for updating the CAMS for other situations (e.g., email returned as having an unknown domain name, etc.)

Figure 13:
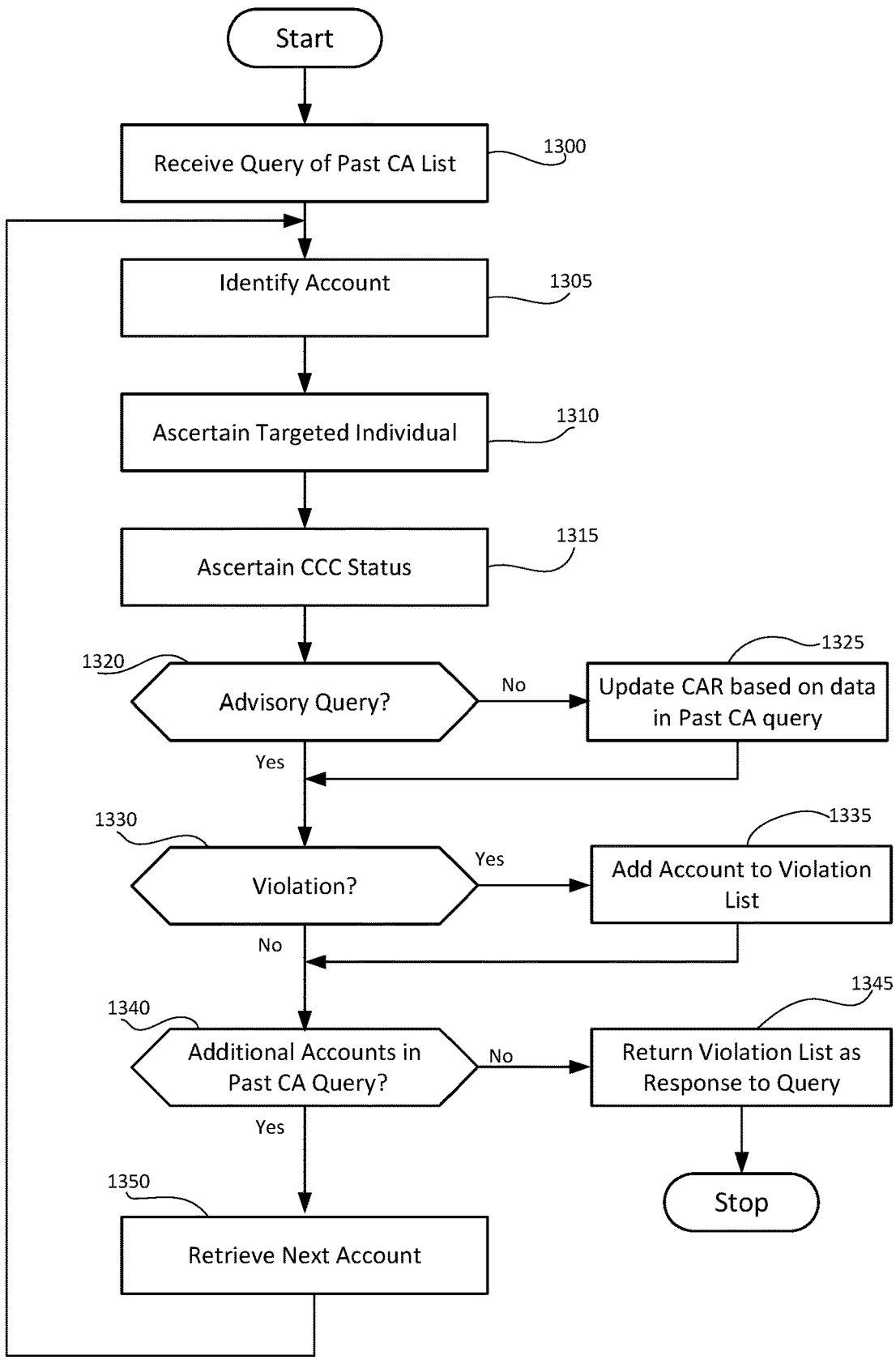
FIG. 13 illustrates one embodiment of a process flow for processing a list in the CAMP comprising a plurality of accounts.

FIG. 13—Processing a Past-CA Query

One embodiment of a processing flow performed by the CAMS for processing a query for one or more accounts (a list comprising a plurality of accounts) for a Past-CA is shown in FIG. 13. The process flow begins with operation 1300 where the CAMP 205 identifies the query as being of the type "Past-CA." If the query indicates a list, then in particular embodiments each account in the list is processed according to the process flow shown in FIG. 13 as will be seen. Next, the CAMP 205 identifies an account identified in the Past-CA query in operation 1305. The account may be identified in various ways, including an explicit account identifier.

Next, the CAMP 205 ascertains the individual targeted in the CA for the account in operation 1310. The debtor associated with the account is not always the individual targeted. However, frequently, the targeted individual is the debtor associated with the account. This is particularly true if a CCC has been established for the debtor, which is checked by the CAMP 205 in operation 1315. These two operations may occur in a different order. However, in either case, it is necessary to ascertain both pieces of information so that the applicable communication limits can be identified and used in determining whether a violation has occurred.

At this point, the CAMP 205 updates the CAR 206 based on the information found in the PAST-CA list for the account in operation 1320. This particular operation may involve the CAMP 205 updating the CAR 206 to record that a CA was made for the account or updating the CAR 206 to remove a CA that was supposed to be made for the account but for some reason was not.

The CAMP 205 then determines whether a violation has occurred in operation 1325. If a violation has occurred, then the account may be added to an exceptions or violation list in operation 1330. The process then continues with the CAMP 205 determining in operation 1335 whether there are additional accounts to be processed. If the query is for a single account, or if all accounts in a list have been processed, then the results of the query may be returned in operation 1340. In particular instances, the CAMP 205 may return the exceptions list as the results of the Past-CA query. While in other instances, the CAMP 205 may send other or additional information indicating the accounts that did not involve a violation based on the CA detailed in the Past-CA query. Based on information in the query, the results may be sent to the originator or another entity, or both. If there are additional accounts to process in operation 1335, then the next account is retrieved in operation 1345, and the process repeats.

Figure 14:
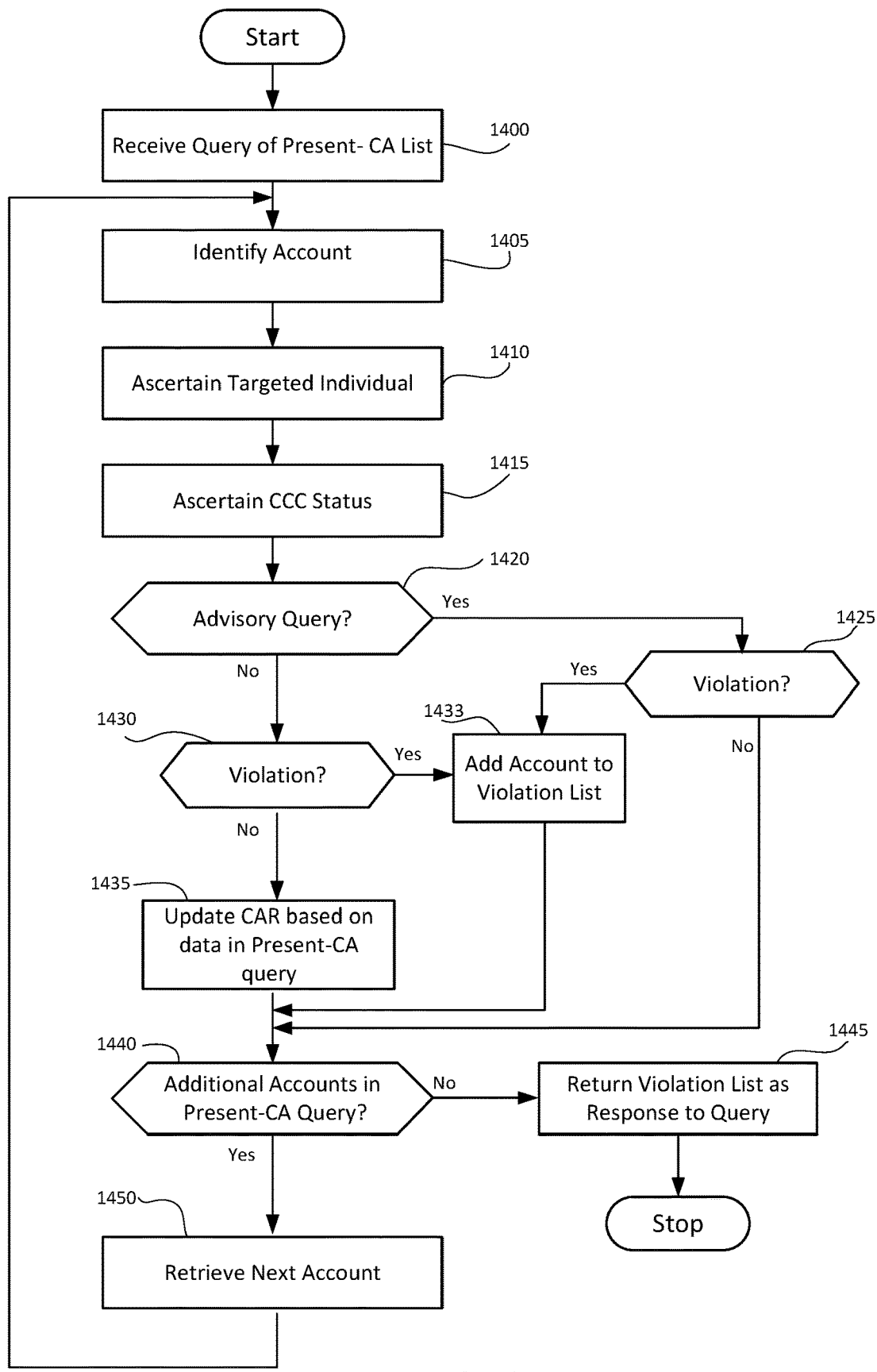
FIG. 14 illustrate one embodiment of a process flow for processing a Present-CA list in the CAMP comprising an advisory query indication.

FIG. 14—Processing a Present-CA Query

FIG. 14 illustrates the processing of a Present-CA query. The processing is similar to that of a Past-CA query, but with some slight modifications. The process begins with the CAMP 205 receiving a query which is identified as a Present-CA list in operation 1400. The account is identified in operation 1405, typically with an explicit account identifier. The CAMP 205 ascertains the individual to be contacted in operation 1410, which may or may not be the debtor associated with the account. Next, the CAMP 205 ascertains the CCC status for the debtor associated with the account in operation 1415. This information is necessary to determine whether a violation has occurred.

The CAMP 205 then determines whether making the CA to the account as indicated in the Present-CA query would result in a violation in Operation 1420. If it would result in a violation, then the CAMP 205 adds the account to an exceptions list in operation 1425. In this particular embodiment, since making the CA to the account would result in a violation, the CAMPS 205 does not update the CAR 206 to reflect the CA for the account. In addition, because the CA would result in a violation, the CA should not actually be made to the account in many instances.

At this point, if making the CA to the account would not result in a violation, then the CAMP 205 determines whether the Present-CA query is an advisory query in operation 1430. If the Present-CA query is an advisory query, then, again, the CAMP 205 does not update the CAR 206 to reflect the CA being made to the account based on the Present-CA query.

If, however, the CAMP determines the Present-CA query is not an advisory query in operation 1430, then the CAR is updated in operation 1435 for the account based on the CA detailed in the Present-CA query for the account. As a result, the CAR now reflects that the CA detailed in the Present-CA has been made to the account, although the actual CA made not be made until the Present-CA query has been processed and a list of authorized accounts is provided to a CMS to originate the CAs.

Next, a test is made in operation 1440 to determination if there are additional accounts to be processed (i.e., if the query indicated a list, as opposed to a single account). If so, the next account is retrieved in operation 1450, and the process repeats. If there are no more accounts in operation 1440, then the results of the query are returned in operation 1445 to the query originator and/or some third party as a response. Again, the results may include various information such as the accounts that are authorized to have the CAs detailed in the Present-CA query made for the accounts and/or the accounts not authorized to have the CAs detailed in the Present-CA query made for the accounts (e.g., the exceptions list).

It is noted that in particular embodiments, an override indicator can indicate that the CAR should be updated, even if an error would occur. In addition, the processing flow of FIG. 14 can be adapted by one skilled in art for processing Scheduled-CA queries. This would largely involve replacing the "Present-CA" label with a "Scheduled-CA" label in the process flow.

Figure 15:
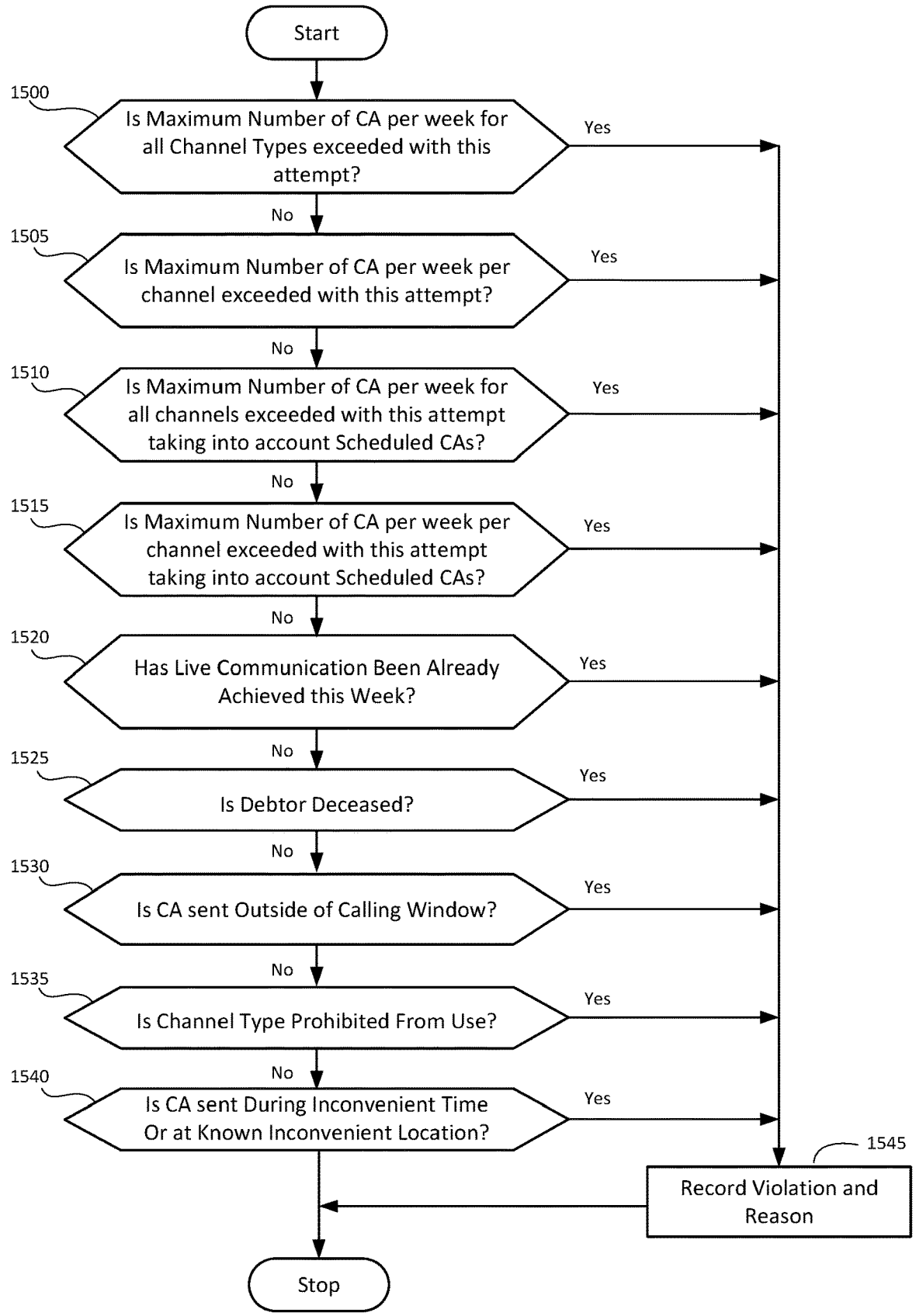
FIG. 15 illustrates one embodiment of a process flow for determining whether a violation has occurred when processing a query.

FIG. 15—Determination of a Violation

The process flows in FIGS. 13 and 14 at various operations involve determining whether a violation occurs as a result of updating an account in the CAR 206. One embodiment of a process flow for determining whether a violation occurs is shown in FIG. 15. It should be apparent that a variety of tests may be performed to determine if a violation occurs. The process flow in FIG. 15 shows a number of tests that result in a violation, which once a violation is determined to have occurred, it is recorded and is further processing is ended. However, in other embodiments, all of the applicable tests are performed (as opposed to ending subsequent processing after a test identifies a violation), so that all possible of violations are reported in the response. However, the process flow in FIG. 15 is sufficient to illustrate the possible types of tests that may occur. In various embodiments, additional or fewer tests may be performed. In some cases, a particular test may be appropriate for a particular type of query. Further, the examples provided presume some commonly used values for cumulative CAs, which may be different using different values in different embodiments.

The initial test shown in operation 1500 involves checking whether updating the account in the CAR 206 would cause a violation based on exceeding a limit on the number of CAs for the current week across all channel types. In some embodiments, the Rules may limit no more than three CAs to a debtor (once CCC has been established) across all channel types. Thus, this test may ascertain how many CAs have occurred up to this day of the current week, and whether the limit is exceeded with the current CA.

Another test shown in operation 1505 involves determining whether a maximum number of CAs per week have been exceeded using this particular channel. For example, in some embodiments, there may be a limit of two call attempts per week to a debtor. If the query would cause e.g., a third call attempt to be made in the current week, this would result in a violation. If so, a violation would be recorded.

Another test shown in operation 1510 involves determining whether a violation would occur for the current CA taking into account future, scheduled CAs for that account later that week. For example, there may be a total of three CAs allowed per week for an account. If there had been a CA on Monday and Tuesday, and a scheduled CA on Friday, then making a CA today on Wednesday would not be a violation in and of itself. However, it would cause the scheduled CA on Friday to be a violation. To preserve the ability of sending the scheduled CA on Friday, the attempt on Wednesday should be treated as a violation, so it does not occur.

Another test shown in operation 1515 involves determining whether a live communication has already been achieved with the debtor in the current week. In some embodiments, once contact is achieved with the debtor, then no further attempts should be made for that week. This Rule may not be applicable in all embodiments, but it is another way in which a violation may occur.

Another test shown in operation 1520 involves determining whether the debtor is deceased. If the debtor is deceased, then no attempts at contacting the debtor should be made. However, attempts may be made to contact the debtor's representative or executor.

Another test shown in operation 1525 involves application of other rules and regulations which may prohibit or otherwise limit communications with the targeted individual. For example, in many instances, communication attempts using certain channels, such as voice, should not be initiated outside an allowable calling window, which is typically between 8:00 a.m. and 9:00 p.m. based on the local time of the targeted individual. If so, the communication should be delayed and initiated during an available calling window. In some embodiments, the debtor may have indicated consent to receiving calls outside of the normal calling window. For example, a debtor who works the night shift may prefer to receive calls after 9:00 p.m. and may object to receiving them in the morning, before noon.

Another test shown in operation 1530 involves the use of a prohibited channel. The targeted party may have formally requested that certain channels of communication not be used. For example, the targeted party may have requested their cell phone number not be used or their work email address not be used. There may be any number of restrictions indicated by a targeted party. Once communicated, the originator of the CA should attempt to honor such restrictions as appropriate.

Similarly, another form of violation can occur if the CA is sent to the targeted party during an inconvenient time or location as shown in operation 1535. The targeted party may inform the originator that certain times are inconvenient.

The targeted party may also inform the CA originator that the party is located in an inconvenient location at certain times. For example, the targeted party may be in a place of worship at certain times/days of the week. Or, the targeted party may be presently receiving medical care in a hospital, or at a funeral. Upon learning of such a condition, the CA should be terminated, and if know in advance that the condition exists, the CA should not be initiated.

As can be appreciated, there are a number of potential tests that may be performed which can result in preventing a CA from occurring. One or more of these conditions may be indicated in a violation file for that account as shown in operation 1540 and sent to the query originator.

Exemplary Use Cases

As evident from the above, there is flexibility as to how the CAMS can be used for coordinating CAs for a particular channel type in a contact center environment. The following represent potential embodiments of use cases for various applications.

1) Processing a Voice Calling List

A voice calling list (e.g., communication list of telephone numbers) may be provided from a contact list data store 210 to the CAMS each day as a Present-CAs list to be processed. This list may be a list of wireline and/or wireless telephone numbers, and may have been previously scrubbed for wireline/wireless numbers by another system or by another platform or service provider as a value-added service. Scrubbing is frequently done to identify which numbers are wireless, since such numbers may be processed differently for regulatory purposes, e.g., communication attempts for wireless numbers may need to be made via a non-automatic telephone dialing system per the Telephone Consumer Protection Act requirements. In other embodiments, the numbers may be scrubbed against other databases, such as an enterprise, state, or federal do-not-call list. It is also possible in particular embodiments that the CAMS may perform such value added services, although such a capability is not a required in every embodiment.

The Present-CAs list processing involves the CAMP 205 checking each indicated account in the list against the CAR 206 to determine whether a voice/text communication attempt would exceed the allowable number of attempts for the account. This may involve checking the aggregate number of attempts across all channel types, the number of attempts for that particular channel type, and/or any future scheduled attempts that may preclude the CA. For example, once contact with a debtor is established, no more than 3 communication attempts/week across all channels are allowed. Thus, if a letter has been sent to an account that week, then no more than 2 voice call attempts to that same account are possible that week in order to maintain compliance.

The CAMP 205 processes the accounts indicated in the Present-CAs list to eliminate or flag any records in the list where a CA would result in a violation. The allowable accounts (i.e., those which can be contacted without encountering a violation) are then updated in the CAR 206 reflecting an attempt (that will be made shortly). This assumes the query is not in an advisory query mode, in which case, the accounts are not updated. The list of allowable accounts (optionally) may then be provided to a List Optimizer 213 that optimizes the calling records with respect to priority of time and likelihood of successful outcome on an hourly basis.

Though use of a List Optimizer 213 is optional, it presence can be accommodated by directing the results of the CAMP 205 processing to it, rather than the CMS. For instance, in particular embodiments, the List Optimizer 213 functions to receive the calling list of allowable accounts and prioritize the list with respect to each hour of operation. Each hour, a new prioritized list is provided to the CMS (e.g., the dialer), where the priority is optimized for that hour. Accounts that cannot be called during that hour are either flagged as such, or removed from the list, so that no calls are made to the accounts during the hour resulting in a violation. In some embodiments, the List Optimizer 213 may be embodied as the CallTech™ product available from Noble Systems Corporation.

The calling list of allowable accounts is then transmitted (optionally) by the List Optimizer 213 to a List Manager 214, or directly to a control host 215 that coordinates with a predictive dialer 250 or manual dialing solution 255. In particular embodiments, the List Manager 214 provides the functions that are found in Noble Systems Corporation's OnQ™ product. Again, the use of the List Manager 214 is optional. The List Manager may define which records are to be obtained for which campaigns, including what serial order the campaigns should be executed. The campaigns may also be performed in parallel, with a specified criteria for how records from each campaign are obtained. Further list processing functions may include the start/stop times for each campaign, which days of the week they should be performed, how many agents should be assigned for each campaign, etc. Although the above description is provided in the context of the list being a voice calling list for originating voice calls, similar coordination may occur if the list is for originating SMS texts instead.

After the calling list of allowable accounts has been processed by the combination of the host 215 and dialer 250 (acting as a call handler), it is expected that in some circumstances a portion of the records in the list will not have been processed. Further, it is expected that some accounts will not have been contacted. Therefore, at the end of the processing cycle, or on a periodic basis, updated call results are transmitted in various embodiments from the host 215 to the CAMP 205 as a Past-CAs file for the CAMP to update the CAR 206 to reflect the accounts that were actually dialed and their outcome. This presumes that the accounts in the list were marked in the CAR 206 as having been contacted. If so, then the updates from the host 215 to the CAMP 205 identify which accounts were not attempted so that the CAR 206 can be corrected for those accounts. If the accounts in the list were not marked as having been contacted prior to sending the list to the host 215, then the host 215 may send updates of the accounts which were contacted to the CAMP 205 to update the CAR 206.

In addition, another approach is to provide the voice calling list to List Optimizer 213 first, bypassing the CAMS. Under this approach, calls are originated to accounts found on the list in a conventional manner, and the results are transmitted to the CAMS as a Past-CAs file to update the CAR 206. Either approach results with an updated and accurate CAR 206. However, sending the calling list to the host 215 without first verifying with the CAR 206 whether the CAs are authorized for the accounts found on the list can result in voice calls being made to accounts in violation of the allowable number of attempts. Further, if the CAMS is only updated after the fact, it is possible that other communications occurring the same day to the same account may also result in a violation.

2) Processing a Mailing List

A debt collector may generate mailings using a third-party vendor, which involves providing a mailing list to the vendor to generate the letters. This mailing list results in the third-party vendor generating and postmarking letters for delivery later that day or shortly thereafter. The debt collector may then simply present the CAMS with a Past Attempts CA list to update the CAR for attempts that actually occurred. This process, however, would not block any mailing attempts to an account once the weekly limit is reached. Thus, it is possible that any particular mailing to an account could result in a violation.

Alternatively, the debt collector could generate a Present-CA list of the planned mailings and submit it to the CAMS before the mailing list is used to originate communications. After processing, the scrubbed list identifies which accounts can (and cannot) be contacted. The debt collector would then use this list of allowable accounts and only provide the allowable accounts to the mailing vendor to generate the postal mailings. If the mailing vendor is 100% successful, then no corrections are required to the CAR. If the mailing vendor is unable to generate and originate all the mailings, then a Past-CAs list could be generated and used to update/correct the CAR in the CAMP for those mailings which did not originate. This approach minimizes the possibility of violations occurring.

In most instances, "calling window" limitations are not applicable to postal mailings. That is to say, it does not matter when a letter for an account is physically provided to the U.S. postal service relative to the associated debtor's time zone. (A calling window defines a time period in which a communication can be initiated.) However, in other embodiments, the letters may be required to be deposited with the postal service within a calling window based on the targeted individuals' locations and corresponding time zones. Although the postal service is used as the service provider, the same could be said of alternative providers (e.g., UPS, FedEx, etc.)

3) Processing an Email List

A challenge with using email systems is that under various Rules in some instances, the sending of an email must comport with the "calling window" of the targeted individual (i.e., the debtor). This requires the email system to know what time zone the debtor is in. A determination of a debtor's time zone can be derived from knowing the geographical location of the debtor. For purposes herein, the examples are predicated on the debtor being located in the U.S., but the principles disclosed herein can be applied to non-U.S. based locations.

In various embodiments, an email system sends an email list to the CAMP and receives a response indicating which accounts on the email list are authorized to receive an email. This could be based on, e.g., a Present-CA list. Accordingly, the email system would then need to ensure that the proper calling window is observed for each authorized account based on an ascertained location of the targeted individual or account. While in other instances, the email system would ensure the proper calling window is observed by sending emails for the authorized accounts within a "safe window" of 11:00 a.m. and 6:00 p.m. (Eastern Time zone). This "safe window" guarantees that an allowable calling window is observed regardless of the time zone where the debtor is located in the continental U.S. because each of the emails will be received between 8:00 a.m. and 9:00 p.m. with respect to the local time of the targeted party.

In various embodiments, an email that is sent is considered a communication attempt. However, in some instances, an email that is "bounced" (i.e., was undeliverable) is not be viewed as a communication attempt. Accordingly, emails indicated as "bounced" can be compiled into a Past-CA List (indicating a negative value) to correct the CAR in the CAMS. In this way, the CAMS is able to maintain an accurate record of communication attempts for each account. In other instances, a failed communication attempt is still considered as a communications attempt, and no such updates to the CAR occur.

In another embodiment, an enterprise communication system sends the recipient list along with the email contents to the CAMS and the CAMS then checks for call attempt limitations for each account and actually sends the emails in accordance with the allowable calling windows for the respective accounts. This requires the CAMS to have the ability to originate emails, which would essentially represent a CAMS integrated with the CMS.

4) Value Added Processing

The CAMP provides a convenient platform for interfacing with other modules for providing value added processing functions, including performing predictive modeling functions. These capabilities are not mandated by the Rules, and hence are separate from the core capability of the CAMS in various embodiments. Thus, such processing functions are described as being executed by CAMP, but are optional. Potential capabilities could include:

a) Ascertain for a particular account whether the CA should be made to the account's wireline telephone number or wireless telephone number.

b) Ascertain for a particular account whether the CA should be made to the account's telephone number via voice or SMS text.

c) Ascertain for a particular account whether a reassigned number check should occur.

d) Perform wireline/wireless/litigator scrubbing on the ingested voice calling list.

In addition, the CAMP could be utilized in various embodiments as a platform for providing other modeling processes that are not related to tracking communication attempts.

Administrator Interface

The administrator interface allows an administrator to perform the same core account functions as are provided via the API to other systems for processing queries for an individual account or list of accounts. The administrator may access the CAMS using a front-end client on a workstation or server accessing the API. In one embodiment, this may be an access control server ("ACS") providing various functions necessary for the administrator to access the CAMS. These processing functions may include:

a) Login. This allows the administrator to login in a secure manner and identify the administrator type with respect to granted authority level (there may be various levels of authority).

b) Associate appropriate authorizations to the administrator type. A "regular administrator" can e.g., review information in the CAR (read only). A "super-user administrator" can read, access, and write information to the CAR.

c) Edit Account level information. For each of the fields in an account (see below), the super-user administrator may have rights to review and edit the value in the field.

d) Verify account level information. The administrator can enter an account number and/or debtor identifier and review the current status of various fields for an account or debtor, including:

i. Total communication attempts. This refers to verifying the total attempts made to the debtor for a specified week. This could be for all accounts of the debtor or for a specific account of the debtor. The administrator may view CA information in a Calendar format, showing the number of contact attempts each day and the associated channel type. A weekly total can be indicated on the Calendar, along with any violations (i.e., excessive attempts). Another option allows the administrator to review CAs to third parties associated with the debtor (e.g., a third party who may be able to provide location information of the debtor). In particular embodiments, the total attempts can be limited based on channel type, address, or other information.

ii. Communication attempts per address or telephone number. This refers to verifying the number of total attempts made for the current week to a particular telephone number or address (channel type). This may be for a debtor or a third party.

iii. CA date/time. This refers to verifying the date and time of each CA for the current week. This may be displayed on the Calendar, or may be indicated in a separate window after accessing the Calendar.

iv. Confirmed Consumer Contact ("CCC") status. This indicates whether an initial live communication has occurred with the debtor for a particular debt collector. Once this occurs, CCC has occurred and may be applicable for all accounts associated with the debt collector, or it may only be applicable on a per-account basis.

v. Time/place/manner restrictions. This includes any custom restrictions indicated by a debtor, such as calling windows or inconvenient times/channels.

vi. Live/deceased status of debtor. This indicates whether a debtor has died or is alive.

vii. Service member status. This indicates whether a debtor is an active member of the armed forces.

viii. Consent status. This indicates whether a debtor has made any special consent agreements regarding how to be contacted, including waiver of default communication restrictions.

ix. Live communication indicator. This indicates whether a live communication has occurred with a debtor during the current week. If so, then no further communication attempts should be made for the remainder of the week to that debtor. This parameter may override the other rules governing the number of allowable attempts per week.

x. Cease all communication flag. This indicates whether all forms of communication to an account should be terminated. A debtor may declare bankruptcy, may have died, or revoked consent. Sub-values may indicate ceasing all non-postal-based forms of communication, or all forms including postal-based communications.

xi. Work email usage consent. This indicates that a debtor has authorized use of a work-related email for email-based communications.

Each of these may be indicated via flags, status indicators, markers, and/or any other means known to those skilled in the art. In various embodiments, these may be fields within an account record or may be referenced via a pointer to another, linked data structure.

The administrator may have direct access via facility 277 in FIG. 2A to the CAMS 200 or may have indirect access via facility 278 to the ACS 280, which in turn communicates with the CAMS over facility 276. Direct access may be offered to users with super-privileges, while indirect access may be offered to regular or remotely located users.

CAMS Input Processing, Processing Options, and Output Re-Direction

In various embodiments, a query received at the CAMS, whether from a CMS or an administrator via the ACS, results in a response returned to the originator (by default). In particular embodiments, no redirection of the results is possible. In other words, only the entity originating the query receives the processing results.

However, in other embodiments, the results of processing a query by the CAMS may be redirected or copied to one or more entities besides the originator. For example, the CAMS may receive a Present-CA list to process to identify the accounts on the list that a CA can be made to and/or the accounts on the list that a CA cannot be made to. The results may be directed to an administrator for manual review and/or to another system for other processing. For instance, the results may be sent to a List Optimizer to optimize how the CAs are to be made to the accounts found on the list. If a List Optimizer is not used, then the results may be sent to a predictive dialer, a manual dialing system, or some other CMS. This redirection is indicated in particular embodiments by a "Redirection Indicator" ("ReDI") in the query to the CAMS. For instance, the presence of this indicator may indicate an address or other form of identification for another entity to redirect the results to. The CAMS may be configured to allow a ReDI in a query and may verify that the indicated address is authorized. For instance, each originating entity may be associated with a table indicating whether a ReDI can be indicated in the query and a list of authorized addresses to which the response can be directed to.

In addition, depending on the embodiment, a query may indicate other processing options. For instance, one process option a query may indicated is an "Advisory Query Mode" that may be identified by using an Advisory Processing Mode ("APM") flag. The APM flag may indicate whether the CAR is to be updated after checking if the account can be contacted. For instance, for a Present-CR query, if the CAR is not to be updated, then the processing of the query is more of an advisory function or simulation function, consistent with a CA not actually occurring. Here, the Present-CA query is referred to as an advisory function because it asks the question "What would be the result if the query were processed?" In such situations, the result reports back whether a violation would occur for the account if the CA was actually made, but without actually updating the CAR. If the CAR is to be updated (in which case the APM flag would not be set), then the processing of the Present-CA query is consistent with actually initiating the CA, wherein the CAR is updated and a violation, if occurred, is returned.

Thus, a Present-CA list could be submitted by an administrator in an advisory query mode to check what accounts could or could not be contacted, without actually updating the CAR. If the results were acceptable to an administrator, then the same or a subset of the Present-CA list could be resubmitted to the CAMS for processing (without indicating an advisory processing mode) to then actually update the CAR. In this way, the administrator could view the simulated results prior to causing the CAs to actually occur.

In the case of processing a Scheduled-CA file, a similar processing option could allow the CAMS to process the list of accounts without actually updating the CAR so that potential violations could be viewed by an administrator. These options could also be defined for processing a Past-CA file. This would allow a determination of what violations occurred, without actually updating the CAR. However, if the CAs actually occurred, then at some point the CAR should be updated to reflect the CAs.

Report Generation

Account Level

For each identified account in a group of debtors or for all accounts of all debtors, the account level reports may indicate:
  a) Total weekly CAs and an indicator whether the weekly limit was exceeded and/or why.
  b) Total channel specific CAs and an indicator of whether the weekly limit was exceeded and/or why.
  c) Reserved CAs for a debtor or account (each channel address and date) and an indicator of whether the reserved CAs would exceed the weekly limit if all reserved CAs were fulfilled.
  d) View an account's or debtor's Calendar in a graphical calendar format.
  e) Identify accounts or debtors which have a violation occurring within a defined time period.

List Level Exceptions

When a Past-CA list is processed by the CAMP to update the CAR, each communication attempt in the list results in an update to the CAR, regardless of whether the communication was authorized (e.g., no violation occurred). The update may be incrementing a count (indicating a CA occurred) or decrementing the count (indicating a CA in the CAR did not, in fact, occur).

The response of processing a Past-CA list may also result in generating an exception result (e.g., list) indicating which accounts encountered a violation. For example, incrementing a CA for an account may exceed the weekly number of allowed attempts (either cumulatively or for that particular channel type). Here, a violation may be reported in an exception result along with a reason indicated. In addition, attempting to decrement a CA for an account where the value is currently indicated as zero may also be reported in an exception result. Furthermore, decrementing a CA resulting in the removal of a violation may also be reported in an exception result. For example, an account having 3 attempts recorded in the CAR as having occur in a week for a same channel type may constitute a violation (assuming only 2 attempts are allowed). However, if it were determined that one of the attempts did not actually occur, and a Past-CA update is made to remove/reduce that CA, then the update would remove the violation for that account.

The processing of each account in a Present-CA list first determines whether the CA is allowable for that account. For those accounts for which the CA is not allowable (e.g., a violation occurs), an exception result (e.g., list) is generated. This exception result can be applied to the original Present-CA list to remove the unauthorized accounts from the list, thus in effect, "scrubbing" the accounts from the list. This "scrubbed" Present-CA list can then be safely processed by a CMS with respect to generating the actual CAs without causing a violation. For example, a Present-CA list may be provided to the CAMS, and the resulting exception result indicates no violations. Hence, the entire Present-CA list can be processed by a CMS without causing a violation. On the other hand, if a certain number of exceptions are reported, then those accounts can be "removed" from the Present-CA list to obtain a list that can then be sent to the CMS. Another option would be to submit the Present-CA list using the advisory query function to ascertain which accounts can be contacted. However, because an advisory query does not actually update the CAR, a subsequent Past Attempt list would have to be submitted to update the CAR after attempts were actually made.

For each Scheduled-CA list processed, the exception list indicates those accounts in which if a CA were scheduled, would result in a violation. This may be indicated by flagging each record individually, or by generating a separate list of those accounts resulting in a violation and/or a list of those accounts which do not result in a violation.

Data Elements/Structures

A variety of data elements may be associated with an account/debtor record. The structure of the data elements can be in various forms, and may be part of the account record or referenced by a pointer to a separate data structure. Some of the data elements, their meaning, and usage is indicated below.

Account Information

Account level information may include any of the following:
  a) Name of individual being contacted.
  b) Type of individual being contacted. (debtor, personal representative, or third-party contact)
  c) Debtor's name. Name of debtor (not necessarily same as the individual being contacted).
  d) Status of debtor. Whether the debtor is alive or deceased. If debtor is deceased, then the date of death, if known, may be indicated.
  e) Channel type:
    i) Destination address—this could be, e.g., a street address, email address, telephone number, etc. There may be multiple values for an account, based on the various channel types that may be used. Each destination address may be flagged as confirmed, unconfirmed, or obsolete. A destination address that is of unknown status is "unconfirmed." If known to be good, then its status is "confirmed.' If known to be not good, then its status is "obsolete."
    ii) Maximum communication attempts/week/destination address. This usually has a default value of 3 per week overall and 2 per week for each channel, if CCC status is established. However, these values may be waived or another set of values may be used.
  f) Service member status. This may be a yes/no indication of whether the debtor is a service member (i.e., active in the armed forces).

Confirmed Consumer Contact Status ("CCC status")

This flag indicates whether a confirmed consumer contact has occurred. For instance, the CCC status may be a "yes/no" indicator. The exact definition of whether the consumer (debtor) has been contacted may vary in different embodiments. For instance, the value can be set either by processing accounts found in a Past-CAs file, such as in the form of batch processing or receiving a command in a query from a CMS or administrator. If the CCC is reset from "yes" to "no," then additional information may be provided as to what destination address is believed to be obsolete and why. For example, a telephone number may have reached an out of service intercept announcement, a call record may reflect a disposition code entered by an agent indicating a telephone number is obsolete, a special intercept tone may have been detected, an email may have bounced back as an unknown domain name, etc. This value may be read by some entities/users and written by other entities/users.

The process flow for resetting the CCC value for voice calls may involve processing updates based on prior voice calls. This may involve a call handler, for example, processing a calling list (on a daily basis), originating calls to numbers on the list, and agents updating call records by indicating call disposition results. At the end of day processing, the call handler may send the call list results as a Past-CA file with the appropriate call disposition results to the CAMS. The CAMS updates the CAR and resets the CCC status for each account as appropriate. (It is expected that the CAMS would be custom programmed to extract the relevant fields in the call list results to update the CAR.)

In other instances, the administrator may manually update the CCC if, for example, a postal letter was returned. Alternatively a list of all returned letters could be used to generate a Past-CA list, which could be processed to correct the CAR.

Live Contact Status.

This flag indicates whether a live contact (e.g. RPC) has occurred with the debtor during the current week. For instance, the live contact status may be a "yes/no" indicator. In various embodiments, the status is automatically reset to "no" at the beginning of each week. In particular embodiments, the status is set to "yes" based on the processing of a voice call that has reached a right party contact ("RPC"). The account for which the RPC occurred may be indicated in a Past-CA file submitted to the CAMS. For example, an agent dispositioning a call as a RPC. In one embodiment, once the live contact status value is set, then no further contacts are allowed to be made for that account for the rest of the week. The CAR is updated to reflect this status. A live party status being set to "yes" may also cause the CCC to be set to "yes," if that has not already occurred. Similarly, a CCC occurring may also cause the live contact status to be set as well.

Inconvenient Location.

There are number of per se inconvenient locations, such as medical facilities, houses of worship, funeral homes, and daycare locations. In many cases, when a debtor is at one of these inconvenient locations, it is not readily known by the debt collector prior to originating a communication that the debtor is in a per se inconvenient location. However, in some cases, particularly in the case of a daycare location, a debtor may be at this location consistently during a common time window. For example, a debtor may pick up a child at daycare each workday between 4:30 and 5:00 p.m. This time window may be recorded by the debt collector as an inconvenient time. Thus, these per se locations may have an associated time window and/or day of week that is recorded as an inconvenient time for a debtor.

A 30 minute time window (e.g., Day of Week/Time of Day) may be indicated in particular embodiments when known by the debt collector. However, other windows of time may be used. This information may be communicated by the debtor, e.g., to an agent. For instance, an agent may encounter a call with a debtor at a time the debtor is at a daycare location and the agent may inquire what times, as well as which days of week, the debtor is usually there. The information obtained by the agent may then be used to ascertain times when it is presumed the debtor is in an inconvenient location to receive calls.

I. List Processing Events
Overview

Many of the examples presented above involve sending a query to the CAMS from either a CMS or by an administrator using an administration computer. For instance, the CAMS may return the results to the originator and/or send a copy of the results to another entity. Depending on the embodiment, the list to be processed by the CAMS is either "pushed" or sent to the CAMS in some manner or is "pulled" by the CAMS to be processed. In other words, the CAMS in various embodiments is configured to process a query on a list obtained from an external entity. Such capabilities can facilitate a more automated workflow for enterprises that desire to avoid manual workarounds.

When the CAMS retrieves a particular list to be processed, this can be referred to as a "List Processing Event." A series of List Processing Events ("LPE") may be defined to occur in a particular sequence and the results may be referred to as a "List Processing Cycle" ("LPC"). This may also be thought of as a "script" in that it defines a number of actions which are to occur in a logical sequence. In many instances, a LPC allows an autonomous workflow to occur, typically within a 24 hour processing cycle, so that the CAMS can coordinate among a plurality of CMSs each day.

A brief example of one application can illustrate the concepts of a LPE and LPC. A financial institution may maintain customer information in a customer relationship management system ("CRMS"). In this context, the CRMS can be any type of system maintaining business information for the financial institution. Frequently, there may be several such systems storing information for credit card accounts, mortgage information, etc. The financial institution may make use of a CRMS each day to identify accounts (e.g., credit card accounts) that have a certain late-date in payment, or days past due. The business practice is to notify each of these accounts via a letter and also to follow up with an email communication. The sending of the letter is viewed as critical or necessary, and the sending of the email is viewed as desirable. That is, the email communication should be sent if it does not cause a violation of a Rule. The business practice is to do these on the same day.

The financial institution may desire to automate the sending of these letters and emails in a single LPC. The CAMS is configured, each day, to retrieve a list of the past due accounts from the CRMS. It processes the list, which represents a mailing list, so that each account is updated to reflect that a letter is presently planned to be sent to that account that day. Thus, the CAMP updates the CAR to reflect a communication attempt to those accounts which are authorized (e.g., where there is no violation). The list of accounts which are unauthorized (e.g., would result in a violation) are identified separately. These unauthorized accounts may be removed from the original mailing list to create a modified, authorized, mailing list or a "scrubbed" version of original mailing list.

The retrieval and processing of the scrubbed mailing list with respect to the letter campaign may be the first LPE. Next, the CAMS processes the scrubbed mailing list with respect to the email campaign. Thus, the scrubbed mailing list now represents an email list that has been further scrubbed to remove any accounts that would result in a violation by sending an email to the accounts. This is the second LPE. After the second LPE, no more list processing events occur, so these two LPEs make up the LPC.

Here, the CAMS is configured to execute the LPC each day, and each LPE is defined sufficiently to accomplish the desired results. The LPE are typically processed in a serial manner, but in some cases may be processed independently, in parallel. The above example illustrates two LPEs occurring in serial manner. Furthermore, in this example, it is desirable that only those accounts which were sent a letter should also receive an email notification. If a letter was not authorized and not originated for an account, then an email should also not be sent out to that debtor. Thus, the results of the first LPE are fed into the second LPE, so that the execution of second LPE is dependent on the first. Together, they define the LPC.

The exact number of operations performed in an LPE may vary. It is possible, for example, to define a set of operations as a single LPE or as two LPEs in series. As long as the LPE involves processing of some form of a list, it can be a LPE in its own right. For example, returning to the above example, the first operation involve retrieving the original mailing list. This may involve retrieving and storing that list in the CAMS. Next, the mailing list is processed as a Present-CA, and the unauthorized accounts are removed, to generate a scrubbed mailing list. That list is then sent to the mailing system. Next, the list is processed again in the CAMS as a Past-CA list to reflect the email communications actually occurred. Each step involving the processing of a list, storing of a list, sending of a list, etc. could be potentially defined as a LPE. On the other hand, the LPE could combine a number of steps which are logically related as a single LPE. Thus, there is some flexibility as how many LPEs are required in a LPC.

Figure 16:
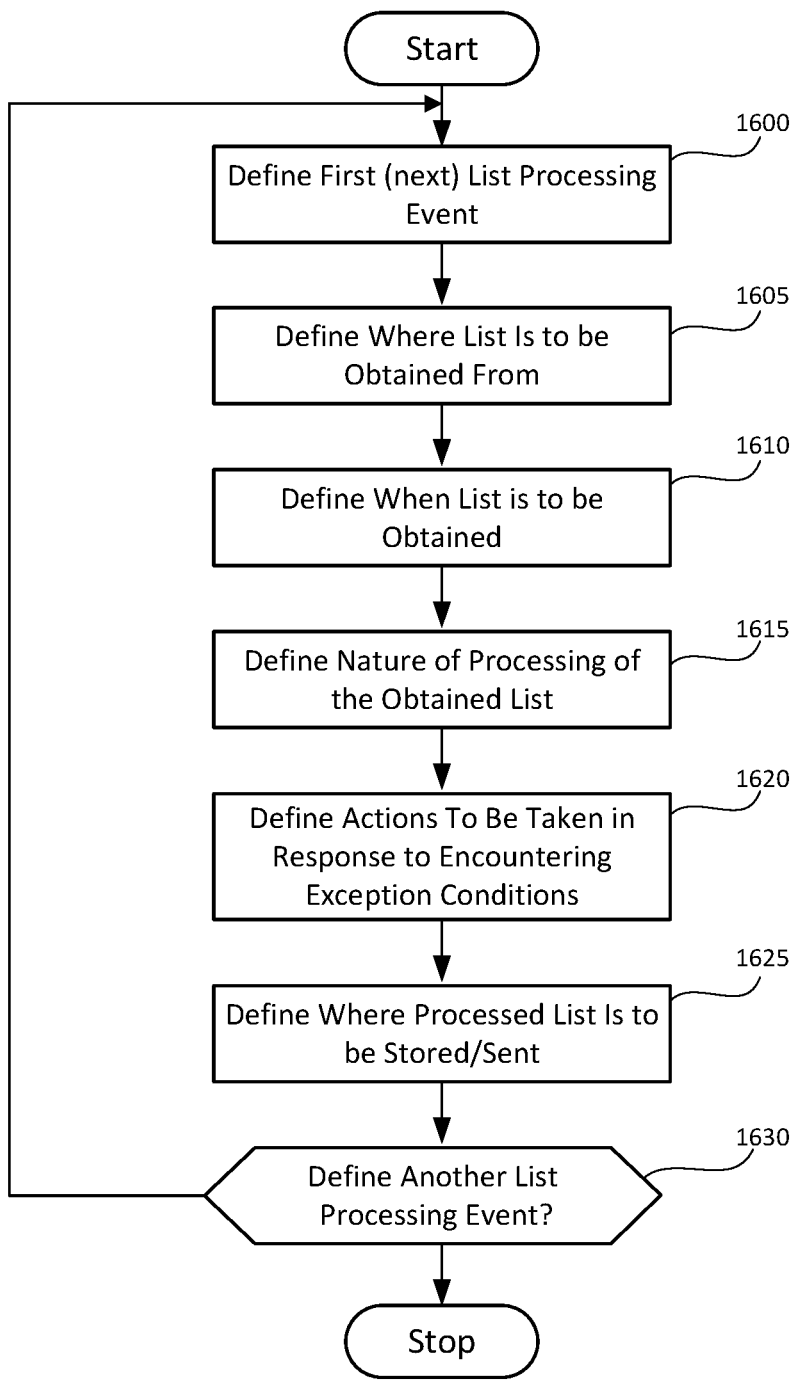
FIGS. 16-17 illustrate different embodiments of process flows associated with List Processing Events and List Processing Cycles.

FIG. 16—Defining an LPE and LPC

One embodiment of a process flow for defining a LPC in the CAMP is shown in FIG. 16. Most of the process involves defining the LPE, as the LPC is merely a series of LPEs. This flow represents one embodiment of the steps that an administrator may perform in order to define an LPC is the CAMS. In a high level summary, this indicates:

a) what information is to be processed;
b) where the information is to be obtained;
c) when the information is to be obtained;
d) the nature of the processing to occur on the information;
e) how exception conditions are to be handled; and
f) where the information is to be stored.

Turning to FIG. 16, the process begins in operation 1600 by defining the first LPE (or next LPE, if a prior LPE has already been defined). The next operations may occur in various order. Each LPE may have a name, and one naming scheme is simply to refer to them in order, as e.g., "LPE 1", "LPE 2", etc.

Information has to be provided that defines where the CAMP obtains the communication list ("List") from in operation 1605. The administrator may use various techniques for indicating a source of the list, such as a URL, address, domain name, port number, device name, etc. The source information indicates where the CAMP should request the list from. The source entity may be a CMS, an ACS, or some other external system, such as the aforementioned CRMS. In various embodiments, the processing of the list does not depend on the type of entity providing the list, as long as the format and structure is in a compatible format. Although the name of the source does not typically define the channel type or source per se, the name may reflect the purpose of the communication. Thus, calling a source "Email System #1" implies the source is an email system and the list is an email list.

As can be expected, a contact center originating communications has to obtain the original list for each processing cycle from some entity. Thus, the beginning of the first LPE requires obtaining the list from some external entity, typically from whatever system (such as a CRMS for example) that is generating the accounts to be contacted for that processing cycle.

Next, the CAMP is instructed when to obtain the list in operation 1610. This may be indicated in terms of an absolute or relative time. For example, returning to the aforementioned example, if the CRMS is configured to identify the past due accounts each day by 6:00 a.m., then the CAMP may be configured to obtain the list from the CRMS by, e.g., 7:00 a.m. Obviously, issues would arise if the CAMP was instructed to obtain the list from the CRMS prior to the CRMS having generated it. If the CRMS delays generating the list so that it is not available by 7:00 a.m., then an error condition arises. Thus, the CAMP is informed of the time at which it should obtain the list from the identified source.

In other embodiments, the CAMP may be instructed to obtain the list at a relative time, e.g., such as soon as a prior LPE has completed. A relative time may indicate that a given LPE can occur as soon as a particular prior LPE completes or a list is generated. For example, the mailing list may be "scrubbed" and once completed, the scrubbed list may then be sent to a CMS. The sending of the list to the CMS may occur as soon as the list has been "scrubbed" (i.e., the scrubbed list is created).

In other embodiments, the CAMP may be instructed to wait for an indication from a particular originating system indicating that the list is completed or from an administrator responding to an authorization request. Other variations are possible.

The CAMP has to be informed as to how to process the list in operation 1615. Recall that a query can request processing a single account or a list of accounts in various ways. It is possible that the processing could be to merely "read" the CAR values for each account. Or, the processing could be to update the CAR based on accounts found on a Past-CA list, a Present-CA list, or a Scheduled-CA list. The CAMP needs to know for each account indicated in the list, how the CAR is to be processed with respect to each record in the list (including, updating the CAR if the query is to update the account).

All the information that could be conveyed in a query may be defined at this stage. In essence, the CAMP is told the nature of the query, without receiving the external query. Thus, elements that may indicate that the query is to be processed in an advisory query mode could be indicated at this step.

In addition to processing the Past-CA, Present-CA, and Scheduled-CA lists, the CAMP may be configured to perform some additional value added processing based on manipulating lists. This typically involves manipulating a list relative to the results from updating the CAR. For example, a Present-CA list may be processed to update accounts which are authorized and identify those accounts which are not authorized. It may be desirable to "pare" down the original list after processing the Present-CA list to produce a modified Present-CA (or "scrubbed" Present-CA list) that represents only those accounts which have been authorized and updated. Or, it may be desirable to extract only those accounts in a Present-CA list which are not authorized, without updating the CAR.

The results of processing a list may be stored in cache in the CAMP as a temporary file. This may be retained temporarily so that another LPE may retrieve that list and perform further processing. The results could also be permanently stored, send to a reporting system, logged, etc. Thus, for example, receiving a Present-CA list may be scrubbed so that the resulting list of only authorized account is given a new name (e.g., "Authorized_Mailing_List"). This list may be stored in cache by one LPE and then used by a second LPE to be sent to a mailing system.

Because processing a list may result in various exception conditions occurring, the CAMP is further configured to perform certain actions upon encountering various exception conditions in operation 1620. For example, some error conditions may be fundamental and cause the LPE to terminate, and also prevent the LPC from completing. For example, the CAMP may be configured to retrieve a list for processing. Upon analyzing the list, the CAMP determines that the processing cannot occur because the structure of the account data in the list is unreadable. Under this exception condition, the LPE processing would be terminated, as well as the LPC. If a first LPE cannot produce a list, then any subsequent LPE could not process a non-existent list. An administrator may be notified that the LPE/LPC could not complete.

On the other hand, the CAMP may process an account in a list, and determine that the CAR cannot be updated because there already have been the maximum number of allowed attempts for that account. Thus, that account cannot be updated as desired because of a violation, and that account is flagged as an exception condition, and added to an exception list. In this case, the LPE can continue, as this type of exception does not prevent the authorized accounts to be reported. Further, the LPC can continue as well, since there is still a list generated, even if that list is null.

Thus, for each of the various exceptions that can be encountered, the appropriate action to be taken is defined in operation 1620. An exception may involve processing an account and determining the CAR cannot be update because it would result in a violation (or the CAR was updated and it did result in a violation). These accounts, representing the exception processing results, may be grouped together. For example, all the accounts from the list that result in a violation may be grouped into an "exception list." This may be stored in the cache of the CAMP memory. The exception list may be returned as the output of the LPC or used as input by another LPE in the same LPC.

Finally, the CAMP has to be configured in operation 1625 to send/store the results of the list processing. The output of the processing may be returned to the specific CMS, CRMS, external system, reporting system, etc. The output may be directed to a URL, port, domain name, device name, memory location, queue list, file, database, stack, etc. The results may also be stored in cache on the CAMP for subsequent use by another LPE. Typically, however, the last LPE in the LPC will send the results external to the CAMP.

Further, the output may not be a single set of information, but may comprise multiple, distinct sets of information. For example, a Present-CA list may have been processed by the CAMP so that the accounts which could be updated were updated, and those accounts which were not able to be updated, were not updated and gathered into an "exception list."

The CAMP may be further instructed to modify the Present-CA list to generate a modified Present-CA list that excludes all the accounts which were not updated. Thus, the CAMP has produced two lists—a modified Present-CA list (of accounts that are authorized to be contacted) and an exception list (of accounts that are not authorized). The CAMP may send the modified Present-CA list to a CMS and the exception list to a reporting system. Returning to the above example, the original Present-CA list may represent those accounts to which letters were sent. The CAMS system upon processing the list may identify a few accounts that should not be sent letters. Those accounts are removed from the original list, and the resulting list may then be sent to the mailing CMS. The accounts that resulted in a violation are reported to an administrator.

At this point in the process flow, information has been defined that configures the CAMP to know which file to retrieve, when to retrieve it, how to process it, what additional processing to perform, and where to send the results.

At this point, another LPE may be defined in operation 1630. If so, the process repeats at operation 1600. Otherwise the process ends.

Figure 17:
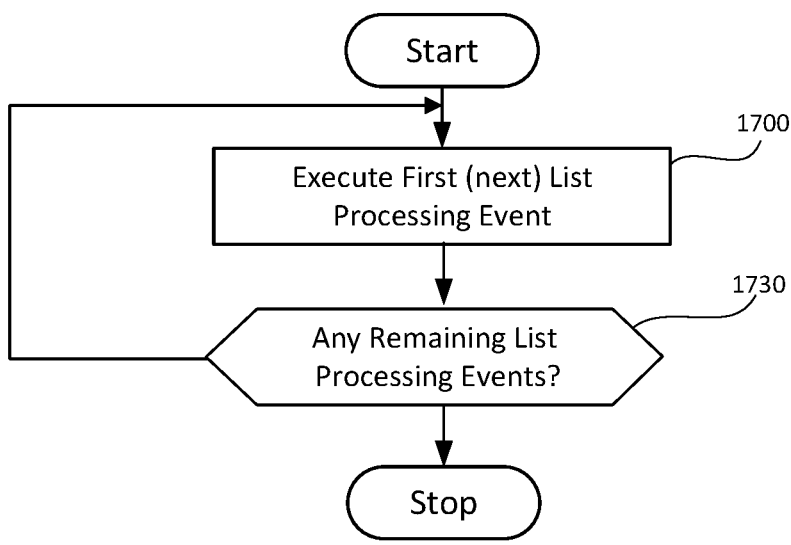

The process flow of FIG. 16 indicates the types of information given to the CAMP to define the processing of a LPE. The process flow does not represent the processing of the LPE itself. The processing of each LPE depends on what actions were defined to be taken in operation 1620. At a high level, the execution of the LPC is shown in FIG. 17, which begins with processing the first LPE in operation 1700, and if any further LPEs are determined to be remaining in operation 1730, then the next LPE is executed in operation 1700, and so forth. The processing of each LPE varies according to how the accounts are to be updated, where the results are stored, whether the results are further processed, and where the final results are conveyed to.

Text Editor for Defining an LPC

The ACS may provide an administrator with a graphical editor for creating, editing, and reviewing an LPC via graphical icons and/or text. Once created, the ACS can then transfer this information to the CAMP. The results of one such embodiment is illustrated in FIG. 18. These are shown as providing information indicating:

a) Get List From—indicating the source of the list;
b) When to Get—indicating when to retrieve and process the list;
c) What to Do—indicating the processing to be performed; and
d) Where to Send—indicating where the results are to be sent.

Turning to FIG. 18, the first LPE #1 1810 shows that a list called "Daily Mailing List" is obtained from a system called "CRMS system." This may be a CRMS which contains information about individuals to be contacted. In other embodiments, this may be a debt collection management system, etc. This list is obtained in the "Get List From" information in step 1. The daily mailing list is retrieved from the CRMS. Further, the list is obtained at 7:00 a.m., which is after the time period the CRMS normally has generated the "Daily Mailing List" file. This is the "When to Get" the information.

The "What to Do" indicates the "Daily Mailing List" is processed as a Present-CA list in the CAMP. Furthermore, the processing creates two new lists generated from the Daily Mailing List, which are those accounts authorized to receive the mailing (called the "Scrubbed Daily Mailing List") and those accounts not authorized to receive the mailing (called the "Daily Mailing List Exceptions"). These two lists are stored in the CAMP cache and the "Scrubbed Daily Mailing List" is transmitted to a system called "Mail_system," which is the system that generates the letters. That is the "Where to Send" information. Presumably, the system is configured to originate the mailings in response to receiving the list.

List Processing Event #2 1820 then begins by retrieving the "Scrubbed Daily Mailing List" from the cache memory in the CAMP. This is done whenever LPE #1 is completed. The list represents communications that are about to be sent, so the list is processed as a Present-CA account. Next, the processing creates two new lists generated from the Scrubbed Daily Mailing List, which are those accounts authorized to receive an email (called the "Scrubbed Daily Email List") and those accounts not authorized to receive an email (called the "Daily Email List Exceptions"). These two lists are stored in the CAMP cache and the "Scrubbed Daily Email List" is transmitted to a system called "Email_system, which is an email system that originates the emails to those individuals who will be receiving a letter mailing.

In LPE #3 1830, this will perform a "true-up" to report any emails which "bounced-back" for some reason. The process begins with getting a list called "Daily Bounced Back Email List" from the system called "Email_system." This presumes that the email system generates a list of any emails sent, which had bounced-back. This list is obtained at 5:00 p.m., which presumably provides sufficient time for the email system to send the emails, receive any rejections, and compile the list.

The "Daily Bounced Back Email List" represents those emails which were not successfully sent. Recall that the accounts were updated in LPE #2 in anticipation of the emails being sent to everyone on the list. Thus, this exception list represents those accounts which will receive a letter, but which will not receive a corresponding email informing them about the letter. The CAR needs to be updated to reflect this, so this list is processed as a Past-CA List, to "true-up" the CAR for these accounts. Finally, the list is sent to a "Report_system" to report the error.

It should be evident that there are a number of alternative and variations on the definition of the LPEs in this LPC. For instance, some processing steps could occur in a different LPE. For example, the transferring of the "Scrubbed Daily Mailing List" to the Mail_system in LPE #1 could have occurred, instead as one of the initial steps in the processing in LPE #2.

Exemplary Computer Processing Device

Figure 19:
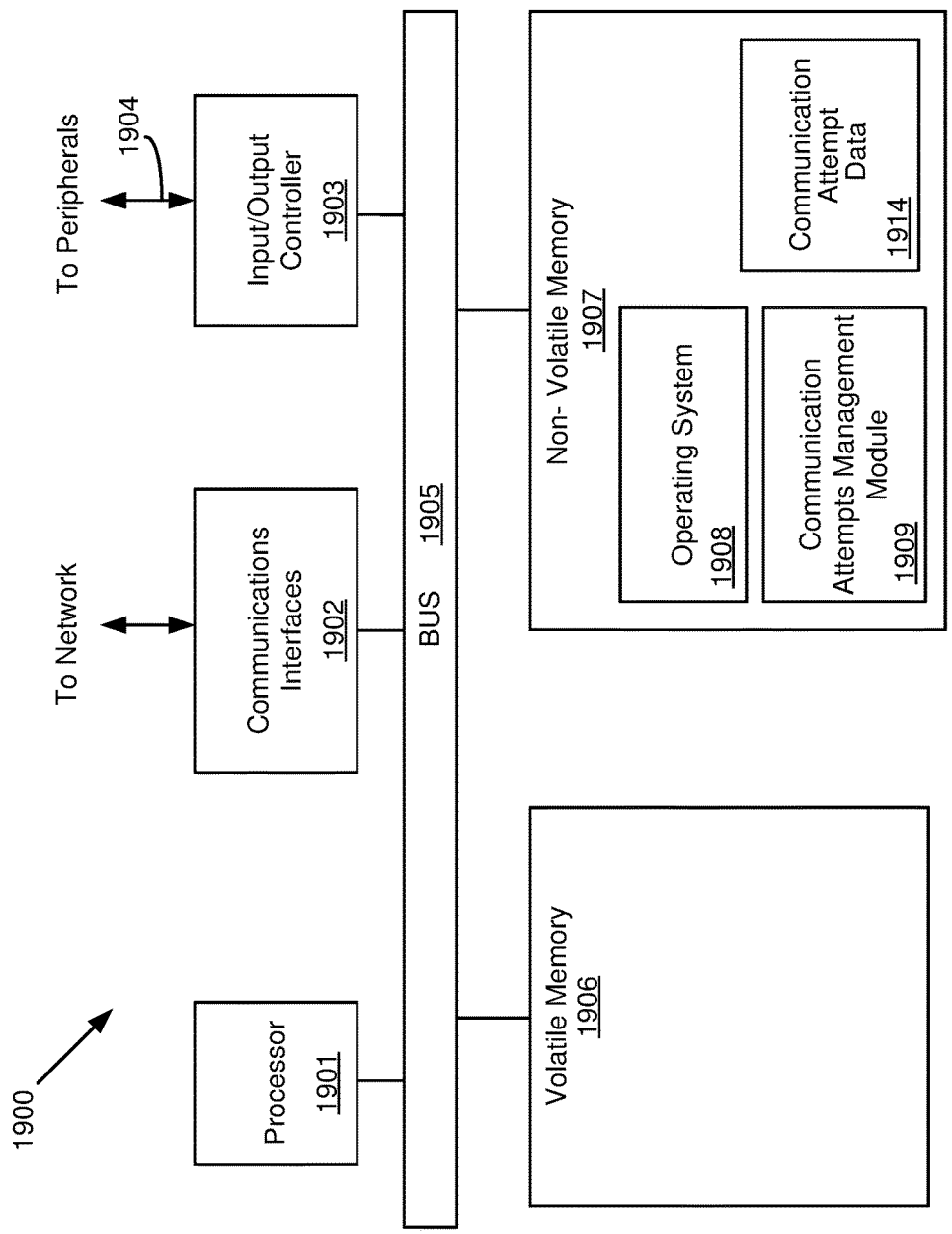
FIG. 19 illustrates an exemplary schematic diagram of a processing system that may be used to practice the technologies disclosed herein according to various embodiments.

FIG. 19 is an exemplary schematic diagram of a computer processing system that may be used in various embodiments of various architectures of the CAMS, including for any of the components or systems shown in the in prior figures, including FIGS. 2A-2B, to practice the concepts, processes, and technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein, as long as each is specially programmed to perform the processes disclosed herein. The computer processing system may also be a specially configured system, designed to optimize the operation of the component in the contact center based in part on the specialized software configured to perform the functions disclosed herein. This may be the case for the various types of CMS and CAMP as well as other aspects of the CAMS.

In the case of certain types of CMS, such as dialers, these are specialized processing components which typically include additional specific hardware/software for controlling interfaces for voice call origination. This may involve adapting the processing component for interfacing with various voice protocol standards, including TDMA access (such as in the form of ISDN primary rate interface) or one of the VoIP protocols, such as SIP. In addition, specialized processing modules are incorporated in the dialers, such as predictive dialers, to identify various unique frequency patterns or cause codes, so as to allow accurate dispositioning of a call. This includes information provided back to the call originator via the specialized signaling protocols (both audio and message based) as to various conditions encountered during a call. Hence, these CMS components, such as predictive dialers, are often much more than a generic computer processing system, both in terms of their functionality and scalability.

As shown in FIG. 19, the processing system 1900, which in one embodiment may represent the CAMP or CAMS, may include one or more computing processors 1901 that may communicate with other elements within the processing system 1900 via a bus 1905. The computing processor 1901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1900 may also include one or more communications interfaces 1902 for communicating data via a network with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1903 may also communicate with one or more input devices or peripherals using an interface such as, but not limited to: a keyboard, a mouse, a touch screen/display input, microphone, pointing device, etc. The input/output controller 1903 may also communicate with output devices or peripherals, such as displays, printers, speakers, headsets, banner displays, etc.

The computing processor 1901 may be configured to execute instructions stored in volatile memory 1906, non-volatile memory 1907, or other forms of computer readable storage media accessible to the processor 1901. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1907 may store program code and data, which also may be loaded into the volatile memory 1906 at execution time. For example, the non-volatile memory 1907 may store one or more modules 1909 that may perform the above-mentioned process flows, including those modules for managing communication attempts, processing queries, interacting with a CMS, and/or operating system code 1908 containing instructions for performing the process and/or functions associated with the technologies disclosed herein. The module(s) 1909 may also access, generate, or store related data 1914, including, for example, the data described above in conjunction with the CAR, in the non-volatile memory 1907, as well as in the volatile memory 1906. The volatile memory 1906 and/or non-volatile memory 1907 may be used to store other information including, but not limited to: records, applications, programs, scripts, source code, object code, byte code, compiled code, interpreted code, machine code, executable instructions, or the like. These may be executed or processed by, for example, the computing processor 1901 and may form a part of, or may interact with, the module(s) 1909.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Figure 20:
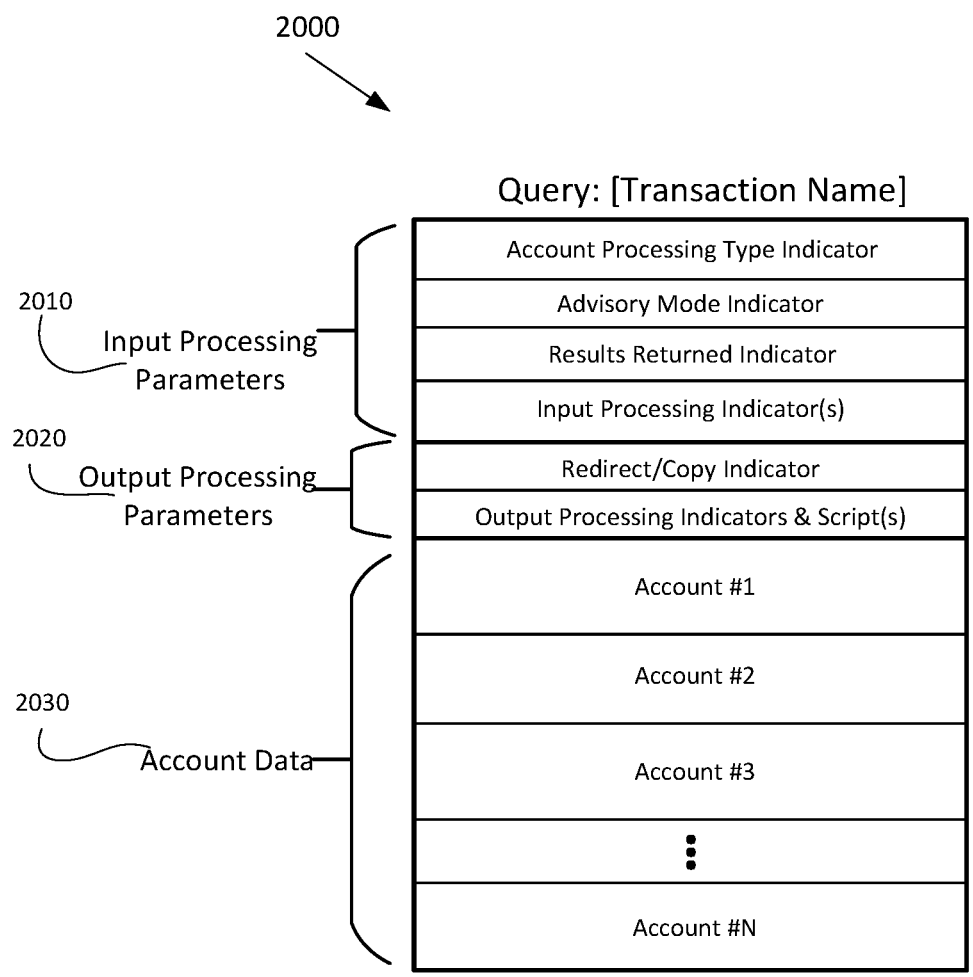
FIG. 20 illustrates one embodiment of a query message format.
Figure 21:
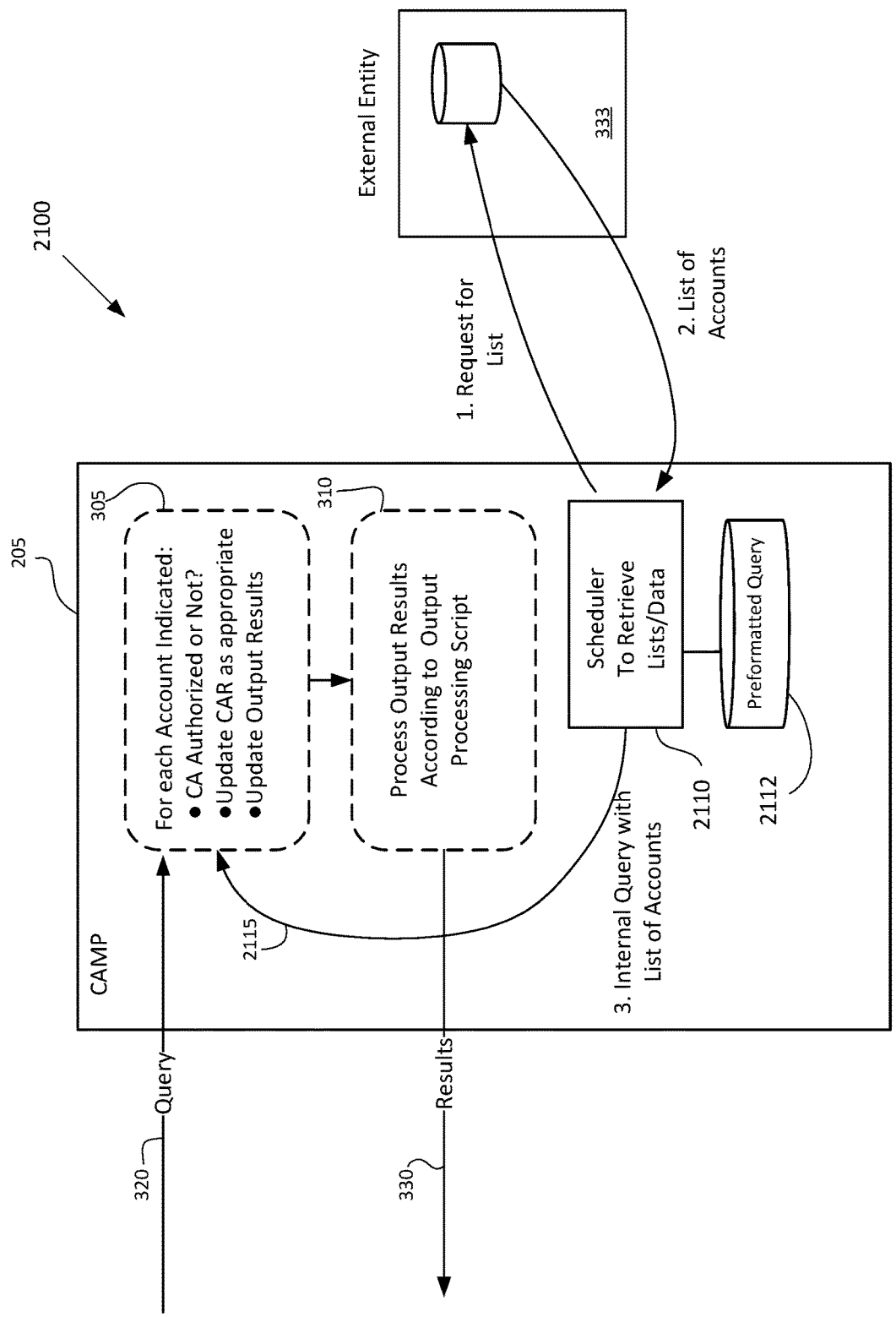
FIG. 21 is a flowchart illustrating a scheduling module for retrieving account data and other information from an external entity used by the CAMS in accordance with various embodiments of the present invention.

Query Structure and Processing—FIGS. 20 and 21

FIG. 20 represents one embodiment of a query message 2000, thought it should be recognized that many other formats, structures, and associated procedures are possible. Those skilled in the art will recognized various other protocols and structures could be incorporated, such as using an XML based methodology for defining the structure/contents of the query. The query message 2000 in this embodiment is associated with a name or identifier, which often reflects the nature of the list of accounts included, or a referenced external list of accounts. The name (or identifier) should be unique for each query, and can be structured to include, e.g., an originating entity address, which should also be unique, concatenated with a purpose of the query, or name of the list.

The message format is divided into three portions: input processing parameters 2010, output processing parameters 2020, and account data 2030. The input processing parameters 2010 provide information related to processing of the query as input. The output processing parameters 2020 provide information related to processing the results of the query. The account data 2030 is processed as directed in the input/output parameters. This embodiment illustrates the account data as part of the query message, but in other embodiments the account may simply refer to where the CAMS can obtain the list of accounts. Thus, the account data itself may not be in the message as shown, particularly if the account data comprises a number of individual accounts (i.e., a list).

Although not shown, other information may be included in a query, such as the originating entity address, the destination address to which the query is directed to, and other protocol mechanisms required to ensure reliable delivery in an error-free method. These aspects are not disclosed, as they are not directly related to how the query is processed by the CAMS. However, those skilled in the art will recognize that other protocols mechanisms are involved or may be used in conveying a query from an originator to the CAMS.

Global Versus Account-Specific Indicators

A global indicator is associated with all the accounts associated with a query, which may involve one or more accounts. An account-specific indicator applies only to a particular account it references. Hence, the same processing can be obtained for a query by:

using a global indicator value or including the same indicator value as the global indicator value but as an account-specific indicator for each account in the query.

If there is both a global indicator and an account-specific indicator present in a query, then the account-specific indicator should be used to process only that account. Essentially, the account-specific indicator overrides a global indicator for that particular account. In various embodiments, the use of both global and account-specific indicators may be discouraged and defined as an error condition.

An error exists when information is lacking to determine how an account in a query should be processed. This can occur if there is no global indicator and one or more accounts lack an account-specific indicator. In many instances, it is preferable to have a query where all the accounts are to be processed in the same manner and in these instances, a global indicator should be used. Many of the input processing parameters indicated in a query are global parameters.

Query Name

A query is given a name or identifier, which typically references the transaction in some unique manner in the CAMS. This may reflect the processing associated with the list. The query name (a.k.a. identifier) is used throughout the CAMS, and therefore should be unique. For example, processing a query may result in an output file provided to a CMS. That CMS may receive multiple output files from the CAMS daily. Thus, referencing the query and the output using the query name requires a unique name to allow these lists to be distinguished. Furthermore, because various errors and workflows are in reference to a particular query, the query name is also useful for establishing the proper context in these situations.

Input Processing Parameters

Account Processing Type Indicator ("APT Indicator")

Generally speaking, a query comprises one or more accounts that are to be processed by the CAMP to update the CAR. The updating of the CAR may reflect a past-CA, a present-CA, or a scheduled-CA for the indicated accounts. In various embodiments, an Account Processing Type ("APT") indicator is provided to indicate how processing is to be applied to the accounts in the query. That is to say, the APT indicates whether an account is to be updated as a Past-CA, Present-CA, or Scheduled-CA. This is sometime referred to also as a "query type" indicator.

In various instances, the APT indicator is a global value that applies to all accounts in the query. While in other instances, each account may be associated with its own APT indicator (i.e., as an account-specific indicator) that pertains just to that account. In this case, each account may be processed independently. Thus, this approach may be used when a list has a mix of past-CAs, present-CAs, or scheduled-CAs.

Furthermore, if an account-specific APT indicator is present, it typically overrides an APT global value. Therefore, if a global APT indicator is present for a list, then all of the accounts for the list are processed in the same manner unless an individual account has an account-specific APT indicator. In this case, the account is processed according to the account-specific indicator.

Advisory Mode ("AM") Indicator

The AM indicator determines whether the CAR will be updated when processing one or more accounts. If the AM indicator is set to indicate the query is to be processed in advisory mode (i.e., as an advisory query), then the CAR should not be updated as part of the processing. Thus, the advisory mode can be thought of as processing a query and providing results, but without updating the CAR. In general, an advisory mode query answers the question: "What would happen if this query was processed?

The AM indicator is typically used as a global value that is applicable for all the accounts in a query. However, it could also be used as an account-specific value in particular embodiments, although usage in this manner may lead to potential errors with respect to the CAR since some accounts would result in updating the CAR and others would not.

Results Returned Indicator

The results returned indicator ("RRI" or "RR" indicator) indicates, in part, which of the results from a list processing are to be returned. The results are typically returned as a list, which is common if multiple accounts are processed. For example, the results for a query may comprise the accounts in the query which are not authorized to be contacted (in violation), are authorized to be contacted (not in violation), or both.

The RR indicator is typically used as a global value that applies to all accounts in the query. A typical application is when requesting a list of accounts to be checked for purposes of initiating a CA. Thus, a RRI could indicate:

1. Return only Accounts for which the update would result in a violation. This is sometimes referred to as "Return Unauthorized Accounts." The CAMS processes each account in the query by determining whether updating the account as requested would result in a violation. In other words, this asks: is a CA authorized for that channel type and the account indicated? The accounts that are unauthorized may be placed in an "exceptions list" or "unauthorized accounts list" and when the last account is processed, the exception list is returned. In particular embodiments, an error code may also be returned along with each account indicating the type of violation.
2. Return only Accounts for which the update does not result in a violation. This is sometimes referred to as "Return Authorized Accounts." The CAMS processes each account in the query and determines whether a CA to that account would be authorized for that channel type. The accounts that are authorized are placed in an "authorized accounts list" and returned.
3. Return all Accounts, regardless of whether the update results in a violation. This is sometime referred to as "Return All Accounts." The CAMS processes each account, and based on the results, flags each account as having been authorized or not. In one embodiment, the returned list comprises the original order of accounts, wherein each account is flagged appropriately. In another embodiment, the returned list comprises a group corresponding to the unauthorized accounts list and another group corresponding to the authorized accounts list. In yet another embodiment, two separate lists are returned—the authorized accounts list and the unauthorized accounts list.

In various embodiments, the lists may be returned when all accounts in the query are processed. In other embodiments, portions of the list may be batched and returned.

Input Processing Indicator

The input processing ("IP") indicator is used to determine how the query is to be processed. Typically, the query is processed by the CAMS upon receipt, but there may be instances where the processing is to be delayed or scheduled for a certain time. The IP indicator can specify a time delay in seconds/minutes/hours for delaying the processing of the query, or it can specify a time at which processing should commence.

In particular instances, the IP indicator may indicate certain contingent events that should occur prior to processing the query. For example, the originator of the query may indicate that an external system should first confirm certain information is current. This embodiment may be useful when the query originator does not attach the accounts in the query, but instead references a source of a file comprising the accounts to be used in the query. Thus, an administrator may initiate a query, specifying a location in a CRMS for the file, and specify that the CAMS must first receive an indication from the CRMS that the file is ready and current, before retrieving the file and using it in the query processing.

In addition, in particular instances, if a query does not include the accounts to be processed, information as to how to obtain the account data may be included in the IP indicator. For instance, the information may be a URL, URI, address, port number, domain name, etc. which is used to obtain the account data. If the IP parameter is not present, or if it indicates a null value, then the query is typically processed immediately upon receipt and the account data is presumed to be included in the query.

Output Processing Parameters

In normal operation, a query that is initiated by an originator is received by the CAMS and processed accordingly. This involves examining the accounts indicated in the query, updating the CAR for each account, and tracking the results for each account.

Typically, tracking the results involve determining whether an individual account is authorized or not to receive a communication. This tracking can occur in different ways, including copying authorized accounts into an authorized account list and the unauthorized accounts to an exceptions list (e.g., unauthorized accounts list). These lists may be then stored in cache, or some other memory.

The output processing involves providing these results to the appropriate entities. This typically involves providing the authorized and/or unauthorized accounts lists to one or more entities. Typically, the response is provided to the query originator, but other entities may receive the results. There are various options as to what is provided, to whom it is provided, when it is provided, and how it is provided. Furthermore, if errors occur, there is flexibility in defining what entities are informed of the error. These options are summarized below:

What to provide—this indicates what results are desired. This may include requesting the authorized accounts list, the unauthorized accounts list, or both.

Whom it is to be provided to—this indicates whether the results are provided to the query originator, to a CMS, some other entity, or some combination thereof.

When it is to be provided—this indicates whether the results are provided immediately, sometime later, or contingent on some other event occurring.

How it is to be provided—this indicates what structure the results are to be provided in. Frequently, a common format is used for a list or the account information, but the CAMS can format it differently for a particular destination.

How to handle errors—this indicates what entity is to be notified of an error condition. Because a number of entities may be involved in a workflow, notification of errors may depend on when the error occurred in the workflow.

Output Processing Parameters

Redirection/Copy Indicator

The redirection/copy ("R/C") indicator defines to the CAMS who is to receive the results of the query. It can default to providing results to the originator, which can be expressed as a null value. It can also direct the results, instead, to another entity, or provide a copy of the results to another entity (in addition to the originator). In the former instance, redirecting the results proceeds in the results being sent to another entity other than the originator. While copying the results proceeds in a copy of the results being sent to another entity different than the originator in addition to the results being sent to the originator.

The copy of the results sent to another entity may have a slightly different structure than the results sent to the originator. That is because a response to a query may include certain information that is tailored to the originator. For example, a query may include certain transaction identification information that must be included in the results in order for the originator to correlate the results to that query. However, when sending a copy of the results to another entity, since that entity did not initiate the query, the transaction identification information will not be recognized. Thus, the structure of the results sent to a third party entity ("3PE") component or system may be slightly modified. The use of the term "third party entity" simply means that the entity is not the originator of the query. This other entity could be a CMS or some other system, such as a CRMS. The use of the term "third party" should not be interpreted as requiring any type of ownership of the entity relative to the CAMS. In addition, a 3PE may not be expecting results from a query and so sending the results to the 3PE may require first sending a notification in order for the 3PE to properly allocate resources.

Furthermore, other considerations may need to be considered when sending the results of a query. The following capabilities reflect various parameters or capabilities that may be defined in the CAMS in order to redirect response information.

For instance, in various embodiments, the R/C indicator can typically has three values. A first value of null that defines a default condition in which the results are returned to the originating entity (so called "default response" or "default query response"). In this case, no redirection of the results to a 3PE is required. A second value of "redirect" that defines the results are returned, instead, to a specified 3PE address or identifier. In this case, the originating entity does not receive the results. A third value of "copy" that defines a copy of the results are returned to a specified 3PE address or identifier, in addition to the returning results to the originator.

Accordingly, the copy of the results may be structured differently than the normally returned results. Furthermore, copies of the results may be returned to a multiple number of 3PEs. Accordingly, in some embodiments, multiple values may be provided in the R/C indicator in order to send multiple copies of the results to multiple entities.

Results Format Indicator ("RFI" or "RF" indicator)

The RF indicator defines the structure template to be used for providing the results. A default value indicates the results are provided as they normally are in a response to the originator. Another value may be used to indicate a format without the corresponding query correlation data, which may be used when providing a copy of the results. The results may be thought of as being provided as a notification (not a response to a query) to the indicated entity. Accordingly, in particular embodiments, the CAMS is configured to have the corresponding template definitions of how each value defines the structure of the results. Thus, the CAMS can be configured to provide results in a variety of forms to different entities for the same query.

Output Processing Script Operations

In various embodiments, an output processing script ("OPS") may be defined for each entity receiving the results of a query including the originator, although the OPS is typically used when sending redirected or copied results to a 3PE. Generally speaking, each redirected or copied results typically requires a destination address ("DA") that may be indicated in various ways. For instance, a query may include a DA that should be used to direct the redirected or copied results. While in other instances, the query may include a name that the CAMS (or some other entity) then maps to a DA. The destination address may be a URL, port number, domain name, etc.

Accordingly, the OPS indicates a sequence of operations, in which some may be optional, that must be completed before the results of a query can be sent. Therefore, typically the last operation in the sequence is sending the results. If a script contains no conditional operations (i.e., a null script), then the results are sent immediately upon availability.

Each 3PE may have its own OPS indicating when the results are to be sent, how they are to be sent, and what preconditions are necessary for the results to be sent. The OPS may be defined for the originating entity, but frequently the script for the originating entity is set to null values so that a default operation is performed. Otherwise, a non-default OPS may be defined for handling sending the results to the originating entity.

The OPS script operations indicated below are exemplary, and additional operations may added by one skilled in the art. These operations are expected to occur in a serial and/or linear manner. The operations include:

a) Send. The send operation causes the query results to be immediately sent. If the operation is not listed in the script, then the last operation in the script will cause the results to be sent by default. Hence, this operation indicates the end of the script for the redirection or copying of the query results. There may be no parameters associated with this operation. If this is the only operation in the OPS script, then no conditions have to be met prior to sending the results. The absence of any parameters indicates the requested results indicated in the query are to be sent. In some embodiments, a parameter may identify output that was generated, but not requested. For example, a query may request processing a list to identify authorized accounts, but the processing of the list may also generate a list of unauthorized accounts. Since the unauthorized accounts were not required, they normally would be discarded. However, it is possible to send a copy of the unauthorized accounts to a 3PE.

b) Notify. This operation provides a notification message to a specified 3PE informing it of the availability of results. A parameter may be included in this operation to specify the destination address and query name, so that the 3PE knows the context of the notification. Typically, the 3PE that is notified is the entity that is to receive the results. However, it may be possible to include multiple notification statements so that a variety of entities can be informed when results are available.

c) Conditional Event. This operation identifies a condition that must complete in order for the OPS to complete. Typically, a trigger or event completion is provided by a 3PE that reflects a predicate condition has occurred. The parameters in this operation indicates the 3PE address and the message to be received. A typical application is to provide a notification of the availability of the results to a 3PE and then upon an acknowledgement response from the 3PE, provide the results to the 3PE.

d) Delay. This operation delays executing a next operation in the script by the indicated time. The waiting time can be indicated in seconds/minutes/hours or can be indicated as a specified time such as 1:00 p.m. Typically, this operation would never be the last operation in a script.

These script operations are typically specified in a serial manner that requires their serial performance. For example, the sequence of "notify," "conditional event," and "send" could be used to cause the CAMS to perform the following sequence upon completion of processing a query:

1) Notify a specified 3PE that a particular query has been processed and the results are available.
2) Require the CAMS to receive a particular message from the specified 3PE acknowledging that it is ready to receive the results.
3) Send the results to the destination indicated after receiving the particular message.

Failure Handling

In many instances, a failure by the CAMS in processing a query or directing results to the originator or a 3PE or a copy of results to a 3PE may need to be reported. In particular embodiments, if the failure is in processing the query, then the failure handing procedure defined in the input processing parameters is followed. Similarly, in particular embodiments, if the failure is in directing results or a copy of results to a particular entity, then the failure handling procedure in the output processing parameters is followed. Here, a parameter typically indicates the failure handling procedure to apply when a failure occurs and the procedure typically defines a set of entities/addresses to which the failure is (e.g., error code(s) are) reported. For example, if a failure occurs in directing a copy of the results to a 3PE, then the failure handling procedure may indicate the originating entity, the 3PE, an error logging system, and an administrator are informed of the failure by sending each an applicable error code and other supporting information to identify what query the failure occurred for.

Examples of Use Cases

Examples of using pseudocode are provided below. The structure of the code is self-explanatory to those skilled in the art, but should not be interpreted as limiting how information can be conveyed. Those skilled in the art will recognize a variety of structures, programming languages and techniques that can be used to convey the information illustrated below. The code is structured to illustrate the query name set off from the input processing parameters, which is again set off from the output processing parameters. The account data is not shown in these examples. Blank lines represent null actions, and provide groupings of related functions in the pseudocode to facilitate human review.

Scenario 1—Scrubbing a List and then Originating Communication Attempts

This scenario pertains to processing a daily calling list (but equally applies to an email list, mailing list, etc.). The list is "scrubbed" by the CAMS so that only authorized accounts remain on the list. A dialing system, such as a predictive dialer or manual dialing system, is then informed the list is available and the list is then sent to the dialing system (or more generically, the CMS) only after the dialing system indicates it is ready to starting originating CAs for the list. The daily calling list may be originated by a CMRS or by an administrator that provides the CAMS with the list in the form of a query. The list is submitted as shown below:

1. Query: Process Daily Calling List
2.
3. Account Processing Type=Present-CA
4. Advisory Mode=no
5. Results Returned=authorized accounts
6. Input Processing: Delay=0
7.
8. Redirect/Copy=provide copy to CMS #1.
9. Output Processing Script CMS #1:
10. Notify: CMS #1
11. Conditional Event: CMS #1 indicating it is ready
12. Send Output Line 1 indicates receipt of a query given the name "Process Daily Calling List." Line 2 is intended to be blank. Line 3 is the beginning of the input processing parameters and the Account Processing Type indicates that the accounts are to be updated as Present-CA data. The query is not in advisory mode as indicated in line 4, so the updates to the CAR will occur, if appropriate. Line 5 indicates the results to return comprise only of the accounts that are authorized to be contacted. Line 6 indicates the query is to be acted upon immediately, e.g., without any delay.

The output processing parameters begin in line 8, with an indication that the output results (i.e., the authorized accounts) are to be provided as a copy to CMS #1. Note that in this embodiment, the results are still to be provided to the originating entity. The CAMP should have an address maintained for CMS #1 to direct the copy of the results to. Next, line 9 indicates the beginning of an output processing script for how the output is provided to CMS #1. First, a notification message is sent to CMS #1 as shown in line 10. Although not shown, a message could be identified as well. Next, the CAMP is to wait for the occurrence of an event before proceeding, which is indicated in line 11 as a message from CMS #1 indicating it is ready. Although not shown, additional information may be provided indicating a message format, address, port number, etc. Next, once the message is received from CMS #1, the CAMP is to send the output as reflected in line 12. The Send Output is used to indicate that this is the last operation in the script, consequently in various embodiments each script should end with this operation. In some embodiments, this may be a default action at the end of the script if not indicated.

Scenario 2—Scrubbing a List, Originating Letter Mailings and then Texts

This scenario pertains to processing a mailing list and then sending an email to each of the individuals to whom the letter was sent. The purpose may be to send an email to inform each intended recipient of the letter that they will be receiving in the mail shortly. The list is first "scrubbed" so that only authorized accounts remain on the list, and the results are sent to the mailing system. Then, later in the day, a copy of the same accounts are sent to an emailing system, but in a slightly different format.

The daily mailing list may be originated by a CMRS or by an administrator that provides the CAMS the list in the form of a query. The list is submitted as shown below:

1. Query: Process Mailing List
2.
3. Account Processing Type=Present-CA
4. Advisory Mode=no
5. Results Returned=authorized accounts 6. Input Processing: Delay=0
7.
8. Redirect/Copy: Redirect Output to CMS #1, Provide Copy to CMS #2.
9. Output Processing Script CMS #1:
10. Send
11. Output Processing Script CMS #2:
12. Result Structure: Format #23
13. Delay: until 2:00 p.m.
14. Send Output The query is named "Process Mailing List" as indicated in line 1. The input processing parameters begin in line 3 with the account processing type indicating that the accounts are to be processed as Present-CA data. The query is not in an advisory mode as shown in line 4. Next, the results to be returned comprise only of the authorized accounts, as indicated in line 5. The processing is to occur without delay as indicated in line 6.

The output processing parameters begin in line 8 and indicate that the output is to be redirected to CMS #1 and a copy is to be provided to CMS #2. The output processing script for the output to CMS #1 begins on line 9. Its sole operation is shown in line 10 which is to send the output as soon as it is available. The output processing script for the copy to be provided to CMS #2 begins on line 11. The structure to be used is defined by a structure known as "Format #23" indicated in line 12. The sending of the results is to wait until 2:00 p.m. as shown in lines 13 and 14.

Administration

In various embodiments, the administrator, via the ACS, can set, read, and review the above parameters as appropriate. This includes:

a. Defining names to associated addresses. If a "redirect" or "copy" indication is provided in a query, the destination address may be indicated via a name, which maps to an address of the system/device. The administrator can define/edit the name to address mapping. In many instances, the use of a name in the code may be easier for a human to recognize the function of the device.
b. Failure Handling. The administrator can define for each originating entity a list of addresses where failure notifications are to be sent.
c. Response Triggers. The administrator can define a message received from a specified destination address that when received, sets a flag that allows the results from a prior query to be transmitted.

Internal Query Generation in Conjunction with a List Processing Event

The CAMS may be configured to periodically retrieve information from an external entity. For example, the CAMS may retrieve an initial list to process or interim results from a CMS. One common application is for the CAMS to retrieve results intraday from a CMS that are then used to update account statuses in the CAR. For example, the CAMS may periodically retrieve information during the day about right party connects so that accounts' CCC statuses may be updated. Further, information about reassigned numbers, obsolete numbers, changes in consent, inconvenient channels, etc. that were obtained from debtors may be updated in the CAR in a timely manner.

The process previously described in conjunction with FIG. 18 may be used in various embodiments. However, other embodiments may involve incorporating a portion of the process described in conjunction with FIG. 18 and replacing the process steps described in steps 3 and 4 for each LPE.

Turning to FIG. 21, an architecture 2100 is shown whereby a scheduler 2110 in the CAMP 205 is used to retrieve lists from an external entity 333 that can be based on certain criteria or times. In various embodiments, this architecture 2100 implements the functions described in steps 1 and 2 in FIG. 18 and allows the scheduler to request a list of accounts in step 1 of FIG. 21 and obtain a list of accounts to be processed in step 2 of FIG. 21. For instance, in particular embodiments, the scheduler is configured to maintain a preformatted query in a database 2112. This preformatted query is used in conjunction with the account data retrieved in step 2 of FIG. 21 to generate as an internal query 2115 in step 3 that is submitted to the query processing module 305 as if it were received externally. This allows the aforementioned query processing rules and capabilities to be utilized at step 3 of the process described in conjunction with FIG. 18.

Here, the originating entity in this case is the CAMP itself, and a special address could be used that the CAMP recognizes as a self-originated query. The structure of the internal query 2115 could be similar and processed as if it were an externally received query 320. Thus, any error reporting would be reported back to the CAMP, and it would be configured as to how to address the particular error. The results could also be processed by the output processing module 310 and the results 330 copied for sending to the appropriate indicated entities as indicated.

Figure 22:
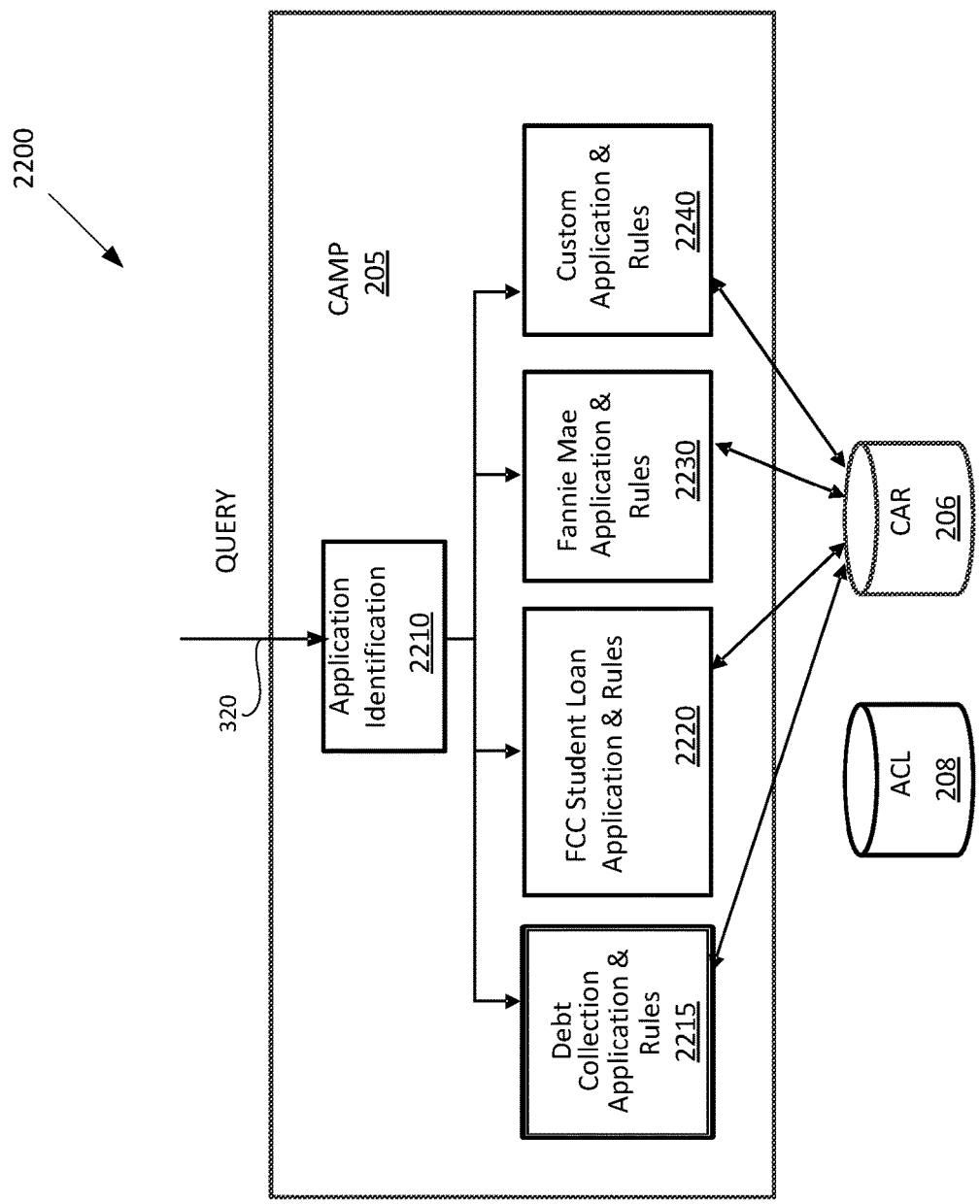
FIG. 22 illustrates an architecture representation of distinguishing the application of various rules governing the query processing according to various embodiments.

FIG. 22—Other Application Specific Communication Attempt Modules

The above discussion of the CAMS is directed to processing queries to limit communication attempts by a CMS according to a set of Rules. However, the CAMS can be used in other applications involving managing communication attempts, many of which do not necessarily involve a debt collection context.

For example, regulations promulgated by the Federal Communications Commission ("FCC") of the Department of Education may apply in the collection of government-backed debt, such as certain types of student loans, and these regulations may limit CAs for voice calls and text messages to no more than three in a thirty day period (a so called "3/30"). Thus, these regulations require the application of a distinct set of limits and logic for processing voice and text CAs to a debtor and the CAMS may be used for this application by an enterprise.

In other instances, other rules and limits may be applicable. For instance, an enterprise may define internal policies regarding the number of contact attempts that may be made to an account that are not necessarily mandated by regulation. While in another instance, an enterprise may desire to ensure that a certain number of CAs are made for one or more accounts during a defined time period. Here, the enterprise may accomplish ensuring a certain number of CAs are made for each account by submitting the accounts in a Scheduled-CA list and reserving multiple times for CAs for the accounts in the future. Once a CA encounters reaching the individual, then the future Scheduled-CAs could be cancelled.

For example, if a homeowner is late in submitting mortgage payments and there is a risk of default, the loan servicer may institute a process to inform the homeowner that involves initiating CAs several times a week, each week, until the homeowner is contacted. This process can be accomplished by defining a series of Scheduled-CA in the future to the homeowner. In order to ensure a minimum number of attempts are made, an indication can be provided to the CAMS of the relevant time period, how many CAs are to occur during the time period, when those CAs are to occur during the time period, and whether to repeat the CAs for a subsequent time period. For example, a minimum number of attempts could be specified as:

- Place 3 calls per week, on Monday, Wednesday, and Friday, for each week until the targeted individual is contacted.
- Place 5 calls at random days (from Monday-Friday) within 21 days.
- Place 4 calls (any day of the week) within a 30 day window beginning on the specified date.
- Place one call every 5 days, until the individual is contacted, but for no more than 50 days.

The indication of X attempts over Y days may require information of how the attempts are to be distributed. Depending on the embodiment, it may be required that each attempt is made on a different day or it may be acceptable for all X attempts to occur on the same day. Thus, various distribution schemes may be implemented to distribute the attempts during the period. It should be noted that a distribution scheme is used for creating a list of scheduled attempts in the CAMS and is separate and distinct from scheduling the origination of the attempts themselves in the CMS. That is to say, reflecting the scheduled CAs in the CAR does not by itself ensure that the CAs will actually be made, but ensures that no violations will occur when (if) they are made.

A relatively simple approach to scheduling attempts for an account is to have the CMS (or some other entity) simply submit a request for the account for every day desired to reserve the scheduled-CAs. Thus, if four calls are required to be made to an account within 30 days, the CMS could submit a scheduled-CA query to the CAMS indicating four instances for same account with each instance involving a particular date within the 30 day window. This places the intelligence and decision making of when to schedule the days for the CAs on the entity submitting the query and not the CAMS. The CAMS can then report back when the times are reserved, and the CMS can then originate the CAs at those times with minimal risk of violations occurring. In other embodiments, the CAMS could have the intelligence and decision making ability such the requesting entity just indicates the number of attempts within a certain time period, beginning and ending on specified dates.

In particular embodiments, modules for handling CAs govern by various requirements may be implemented in parallel with one another, as depicted in FIG. 22. The CAMP 205 may have different modules 2215, 2220, 2230, 2240, which in this embodiment, implement rules of various regulatory agencies or custom rules of the enterprise. These different modules handle different queries that are discriminated by the applications they are directed to. An application identifier module 2210 may be used to determine which application module 2215, 2220, 2230, 2240 is to process a particular query 320 and forward the query to the particular application module as appropriate. In this case, an address from which the query is received may be associated with a particular application module that allows the application identifier module to identify the appropriate application module. Or, an identifier of a particular application module may be provided in the query. In this manner, different application modules can co-exist in the CAMS.

In particular embodiments, the CAR may be configured to treat the multiple accounts for an individual as distinct as separate or in a common manner with respect to the various CAs made for the accounts. For example, Rule Set A may allow 3 CAs per week to an account associated with an individual. While Rule Set B may allow 2 CA per week to a different account associated with the same individual. The enterprise may define these to be separate and distinct accounts, so that determining whether there is a violation with respect to Rule Set B does not take into accounts any CAs made involving Rule Set A.

However, in other instances, the enterprise may recognize that the same individual is affiliated with both accounts, and this individual does not necessarily perceive communications from the enterprise to be distinct. That is say, whether the individual receives communications covered by Rule Set B or Rule Set B, he or she may view receiving communications covered by either of these rule sets as cumulative. Therefore, the enterprise may wish to integrate or coordinate such attempts.

CONCLUSION

The concepts and technologies disclosed herein allow legacy communication management systems, which are not designed to facilitate managing of communications attempts, to be managed with future rules. The design of the CAMS, with its various query structures, accommodates both legacy and future designed systems, in various combinations, allowing an enterprise to manage communication attempts across various distinct and disparate systems. The flexibility afforded by the CAMs also allows automated processing to occur, again taking into account various systems which may not be upgraded to allow management of the communication attempts. The flexibility afforded by the CAMS allows any type of list-oriented communication management system to be managed, including voice, text, email, and postal mail systems. Attempting to incorporate such capabilities in existing CMS systems, which were not designed to do so, would be difficult and impede the performance of the CMS.

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for managing voice telephone calls originated by a predictive dialer in a contact center, comprising:
   a communication attempt management system ("CAMS") comprising a first processor and a memory, wherein the first processor is configured to:
   receive a communications list comprising a plurality of records, each record comprising identification data of an account involving a debt, a telephone number of an individual associated with the account and responsible for the debt, wherein each record reflects a planned communication attempt to be made by the predictive dialer to the telephone number within the next twenty-four hours;
   retrieve from the memory communication attempt occurrence data for a past time period comprising an integral number of contiguous prior days for each account identified in the plurality of records;
   determine for each account identified in the plurality of records in the communications list whether a number of communication attempts, including non-voice communication attempts, made to the individual associated with the account meets or exceeds a communication attempt threshold for the past time period;

update the communication attempt occurrence data in the memory for each account identified in the plurality of records in which the number of communication attempts does not meet or exceed the communication attempt threshold during the past time period to reflect the occurrence of the planned communication attempt;

generate a modified communications list comprising a subset of the plurality of records, wherein the number of communication attempts for each account identified by the records in the subset does not meet or exceed the communication attempt threshold; and transmit the modified communications list to the predictive dialer; and the predictive dialer comprising a second processor configured to:

receive the modified communications list from the CAMS;

select a particular record from the subset of the plurality of records, the particular record comprising a particular telephone number and associated with a particular account;

originate a voice call to the particular telephone number; and connect the voice call to an agent in response to the voice call being answered.

2. The system of claim 1,
wherein the second processor of the predictive dialer is further configured to:
receive input indicating the individual associated with the particular account was contacted, and
provide an indication to the CAMS reflecting the individual was contacted; and
wherein the CAMS is further configured to:
modify an indicator associated with the particular account reflecting the individual was contacted in response to receiving the indication from the predictive dialer.

3. The system of claim 1,
wherein the second processor of the predictive dialer is further configured to:
generate a second list comprising a subset of the modified communications list comprising records identifying accounts for which calls were not attempted;
provide the second list to the CAMS; and
wherein the CAMS is further configured to:
receive the second list from the predictive dialer; and
decrement a value of the communication attempt occurrence data in the memory for each account identified in the records of the second list.

4. The system of claim 1, wherein the communication attempt occurrence data of the particular account associated with the particular record reflects a communication attempt occurring during the past time period of at least one from the group of a SMS text message, an email message, and a postal mailing.

5. The system of claim 1, further comprising:
a computer used by a supervisor of the agent, where the computer is configured to:
provide a request for viewing a calendar-oriented graphical user interface including the past time period for the particular account;
receive from the CAMS communication attempt data associated with the particular account; and
display to the supervisor on the calendar-oriented graphical user interface the communication attempt data reflecting voice and non-voice communication attempts made to the particular account during the past time period.

6. The system of claim 1, wherein the integral number of contiguous prior days is six.

7. A non-transitory computer readable medium storing instructions that when executed by a computer processor cause the computer processor to:

receive a communications list comprising a plurality of records, each record comprising identification data of an account involving a debt, a telephone number of an individual associated with the account, wherein each record reflects a planned communication attempt to be made by a predictive dialer to the telephone number within the next twenty-four hours;

retrieve communication attempt occurrence data for a past time period comprising an integral number of contiguous prior days stored in a memory for each account identified in the plurality of records;

determine for each account identified in the plurality of records whether a number of communication attempts, including non-voice communication attempts, made to the individual associated with the account during the current week meets or exceeds a communication attempt threshold for the past time period;

update the communication attempt occurrence data in the memory for each account identified in the plurality of records in which the number of communication attempts does not meet or exceed the communication attempt threshold during the past time period to reflect the occurrence of the planned communication attempt;

generate a modified communications list comprising a subset of the plurality of records, wherein the number of communication attempts for each account identified by the records in the subset does not meet or exceed the communication attempt threshold; and transmit the modified communications list to the predictive dialer, wherein the predictive dialer is configured to process the modified communications list to originate a telephone call to the telephone number of each record in the subset of the plurality of records.

8. The non-transitory computer readable medium of claim 7, wherein the instructions when executed further cause the computer processor to:

receive input from the predictive dialer reflecting an agent contacted a particular individual associated with a particular account of a particular record of the modified communications list;

update the communication attempt occurrence data of the particular account reflecting the particular individual was contacted, a date when the particular individual was contacted, and a voice channel was used to contact the particular individual; and modify an indicator of the particular account reflecting the particular individual was contacted in response to receiving the input from the predictive dialer.

9. The non-transitory computer readable medium of claim 7, wherein the instructions when executed further cause the computer processor to:

receive a second list comprising a subset of records found in the modified communications list for which communication attempts were not attempted by the predictive dialer; and decrement a value of the communication attempt occurrence data in the memory for each account identified by the records in the second list.

10. The non-transitory computer readable medium of claim 7, wherein the communication attempt occurrence data of a particular account updated in the memory reflects a communication attempt comprising at least one from the group of a SMS text message, an email message, and a postal mailing.

11. The non-transitory computer readable medium of claim 7, wherein the instructions when executed further cause the computer processor to:
   receive a request from a computer to view a calendar-oriented graphical user interface comprising the past time period for an indicated account;
   retrieve from the memory a subset of the communication attempt occurrence data used to generate the calendar-oriented graphical user interface; and
   provide the calendar-oriented graphical user interface to the computer to display a calendar, wherein the calendar reflects voice and non-voice communication attempts made to the indicated account during the past time period.

12. The non-transitory computer readable medium of claim 7, wherein the integral number of contiguous prior days is six.

13. A method for managing a predictive dialer originating calls to a plurality of accounts, the method comprising:
   receiving a communications list comprising a plurality of records at a computer processing system distinct from the predictive dialer, wherein each record of the plurality of records comprises identification data of an account involving a debt and a telephone number of an individual associated with the account, and each record reflects a planned communication attempt to the account to be made by the predictive dialer to the telephone number within the next twenty-four hours;
   retrieving by the computer processing system for each account identified in the plurality of records from a memory communication attempt occurrence data for a past time period comprising an integral number of contiguous prior days, wherein the communication attempt occurrence data comprises at least one non-voice communication attempt to the individual associated with the account;
   determining by the computer processing system for each account identified in the plurality of records whether a communication attempt threshold for the past time period will be exceeded by completing the planned communication attempt;
   updating the communication attempt occurrence data to reflect an occurrence of the planned communication attempt for each account identified in the plurality of records in which the communication attempt threshold is not exceeded as a result of updating the communication attempt occurrence data for the account;
   generating a modified communications list comprising a subset of the plurality of records, wherein the communication attempt occurrence data for each of the accounts identified in the subset does not exceed the communication attempt threshold; and
   transmitting the modified communications list to the predictive dialer, wherein the predictive dialer processes the modified communications list to originate a telephone call to the telephone number of at least one record of the modified communications list.

14. The method of claim 13, further comprising:
   receiving input from the predictive dialer reflecting an agent contacted a particular individual associated with a particular account identified for a particular record of the modified communication list;
   updating the communication attempt occurrence data for the particular account in the memory reflecting the particular individual was contacted, a date when the particular individual was contacted, and a channel type reflecting a voice call was made to the particular individual; and
   modifying a confirmed consumer contact ("CCC") status indicator associated with the particular account reflecting the particular individual was contacted in response to receiving the input from the predictive dialer that the particular individual was contacted.

15. The method of claim 13, further comprising:
   receiving at the computer processing system a second list comprising a subset of records from the modified communications list for which communication attempts were not attempted by the predictive dialer; and
   decrementing a number of the weekly communication attempt occurrence data for each account identified by the records on the second list in the memory reflecting no attempt was made to contact a particular individual associated with the account.

16. The method of claim 13, further comprising:
   receiving a request from a computer to view a calendar comprising a calendar-oriented graphical user interface comprising the past time period for an indicated account;
   retrieving from the memory a subset of the communication attempt occurrence data for the indicated account for communication attempts occurring during the past time period; and
   providing the calendar to the computer for display on the calendar-oriented graphical user interface, wherein the calendar reflects voice and non-voice communication attempts made to the indicated account during the past time period.

17. The method of claim 13, further comprising:
   determining whether a communication attempt threshold for the indicated account is exceeded by a number of voice communication attempts and text communication attempts during the past time period to the indicated account; and
   after determining the communication attempt threshold for the indicated account is exceeded by the number voice communication attempts and text communication attempts during the past time period to the indicated account, indicate a violation on a date of the calendar for the computer for display on the calendar-oriented graphical user interface.

18. The method of claim 13, wherein determining whether the communication attempt threshold will be exceeded by completing the planned communication attempt comprises:
   comparing a sum of voice and non-voice communication attempts during the past time period with the communication attempt threshold.

19. A non-transitory computer readable medium storing instructions that when executed by a computer processor cause the computer processor to:
   receive a communications list comprising a plurality of records, each record comprising identification data of an account involving a debt, a telephone number of an individual associated with the account, wherein each record reflects a planned communication attempt to be made by a predictive dialer to the telephone number within the next twenty-four hours;

retrieve communication attempt occurrence data for a past time period comprising an integral number of contiguous prior days stored in a memory for each account identified in the plurality of records;

determine for each account identified in the plurality of records whether a confirmed consumer contact involving a voice communication occurred within a past time period comprising an integral number of contiguous prior days;

generate a modified communications list comprising a subset of the plurality of records, wherein each of the plurality of records in the subset is associated with a corresponding account that did not involve the voice communication occurring within the past time period; and transmit the modified communications list to the predictive dialer, wherein the predictive dialer is configured to processes the modified communications list to originate a telephone call to the telephone number of each record in the subset of the plurality of records.

20. The non-transitory computer readable medium of claim 19, wherein the integral number of contiguous prior days is six or seven.

\* \* \* \* \*